(12) United States Patent
Lomasney et al.

(10) Patent No.: US 12,344,956 B2
(45) Date of Patent: Jul. 1, 2025

(54) TUBULAR ARTICLES WITH ELECTRODEPOSITED COATINGS, AND SYSTEMS AND METHODS FOR PRODUCING THE SAME

(71) Applicant: MODUMETAL, Inc., Snohomish, WA (US)

(72) Inventors: Christina A. Lomasney, Seattle, WA (US); Guohua Li, Bothell, WA (US); Nicholas Angelo, Buckley, WA (US)

(73) Assignee: MODUMETAL, INC., Snohomish, WA (US)

( * ) Notice: Subject to any disclaimer, the term of this patent is extended or adjusted under 35 U.S.C. 154(b) by 309 days.

(21) Appl. No.: 17/678,841

(22) Filed: Feb. 23, 2022

(65) Prior Publication Data

US 2022/0396893 A1 Dec. 15, 2022

Related U.S. Application Data

(62) Division of application No. 16/606,723, filed as application No. PCT/US2018/028704 on Apr. 20, 2018, now Pat. No. 11,286,575.

(Continued)

(51) Int. Cl.
*C25D 7/04* (2006.01)
*C25D 17/00* (2006.01)
(Continued)

(52) U.S. Cl.
CPC ............. *C25D 7/04* (2013.01); *C25D 17/005* (2013.01); *C25D 17/08* (2013.01); *C25D 17/12* (2013.01);
(Continued)

(58) Field of Classification Search
CPC ........ C25D 7/04; C25D 17/005; C25D 17/08; C25D 17/12; F16L 57/04; F16L 57/06; F16L 57/08
(Continued)

(56) References Cited

U.S. PATENT DOCUMENTS 1,733,404 A ‡ 10/1929 Fahrenwald ............. C25D 7/04
205/132
1,982,009 A ‡ 11/1934 McKinney ............... C25D 7/04
204/272

(Continued)

FOREIGN PATENT DOCUMENTS

| CA | 2 559 152 A1 | 10/2005 |
|---|---|---|
| GB | 667227 | 2/1952 |
| KR | 10-2015-0132043 A | 11/2015 |

OTHER PUBLICATIONS

Dulal et al., "Characterisation of Co—Ni(Cu)/Cu multilayers deposited from a citrate electrolyte in a flow channel cell," *Electrochimica Acta* 49:2041-2049, 2004.

(Continued)

*Primary Examiner* — David R Deal
(74) *Attorney, Agent, or Firm* — Seed IP Law Group LLP

(57) ABSTRACT

Provided herein are tubular articles comprising electrodeposited nano- or microlaminate coatings, which have improved heat, wear, and corrosion resistance. The present disclosure further provides apparatuses, systems, and methods for the electrodeposition of such coatings on tubular workpieces using fixed or dynamic electrical contact points.

19 Claims, 19 Drawing Sheets

Related U.S. Application Data

(60) Provisional application No. 62/488,645, filed on Apr. 21, 2017.

(51) Int. Cl.
  *C25D 17/08* (2006.01)
  *C25D 17/12* (2006.01)
  *F16L 57/04* (2006.01)
  *F16L 57/06* (2006.01)
  *F16L 58/08* (2006.01)

(52) U.S. Cl.
  CPC .............. *F16L 57/04* (2013.01); *F16L 57/06* (2013.01); *F16L 58/08* (2013.01)

(58) Field of Classification Search
  USPC .......................................................... 138/146
  See application file for complete search history.

(56) References Cited

U.S. PATENT DOCUMENTS

| | | | | |
|---|---|---|---|---|
| 2,428,033 A ‡ | 9/1947 | Nachtman | ............. | C25D 5/627 205/140 |
| 2,436,316 A ‡ | 2/1948 | Lum | ........................ | C25D 3/58 205/240 |
| 2,470,775 A ‡ | 5/1949 | Ceresa | ..................... | C25D 5/18 205/255 |
| 2,558,090 A ‡ | 6/1951 | Jernstedt | ................ | C25D 5/611 204/205 |
| 2,642,654 A ‡ | 6/1953 | Ahrens | .................. | C25D 15/00 205/109 |
| 2,678,909 A ‡ | 5/1954 | Jernstedt | ................ | C25D 5/627 205/291 |
| 2,694,743 A ‡ | 11/1954 | Bakst | .................. | H01M 50/414 429/234 |
| 2,706,170 A ‡ | 4/1955 | Marchese | ............... | C25D 1/00 204/DIG. 8 |
| 2,891,309 A ‡ | 6/1959 | Fenster | .................... | C25D 5/44 72/364 |
| 3,090,733 A ‡ | 5/1963 | Brown | .................... | C25D 5/623 428/656 |
| 3,255,781 A ‡ | 6/1966 | Gillespie, Jr. | ......... | B29C 48/151 138/140 |
| 3,282,810 A ‡ | 11/1966 | Marie | ....................... | C25D 5/14 205/180 |
| 3,355,374 A | 11/1967 | Brewer et al. | | |
| 3,359,469 A ‡ | 12/1967 | Levy | .................. | G03B 27/6214 361/234 |
| 3,362,851 A ‡ | 1/1968 | Thomas | .............. | C23C 18/1882 257/E21.174 |
| 3,429,787 A | 2/1969 | Weinreich | | |
| 3,483,113 A ‡ | 12/1969 | Carter | .................. | C25D 7/0635 204/224 |
| 3,549,505 A ‡ | 12/1970 | Hanusa | ................. | B22F 3/1137 205/183 |
| 3,616,286 A ‡ | 10/1971 | Aylward | .................. | C25D 17/002 205/104 |
| 3,633,520 A ‡ | 1/1972 | Stiglich, Jr. | ............ | F41H 5/0421 109/82 |
| 3,669,865 A | 6/1972 | Semienko et al. | | |
| 3,673,073 A ‡ | 6/1972 | Tobey | ..................... | C25D 7/04 204/226 |
| 3,716,464 A ‡ | 2/1973 | Kovac | ..................... | C25D 5/18 205/255 |
| 3,753,664 A ‡ | 8/1973 | Klingenmaier | .......... | C25D 3/20 428/926 |
| 3,759,799 A ‡ | 9/1973 | Reinke | ................... | B41C 1/142 101/127 |
| 3,787,244 A ‡ | 1/1974 | Schulmeister | ...... | H01M 4/8853 427/115 |
| 3,866,289 A ‡ | 2/1975 | Brown | .................... | C25D 5/623 428/668 |
| 3,941,674 A | 5/1976 | Vanmunster | | |
| 3,994,694 A ‡ | 11/1976 | Clauss | .................. | C25D 5/627 205/113 |
| 3,996,114 A ‡ | 12/1976 | Ehrsam | .................. | C25D 15/02 205/109 |
| 4,053,371 A ‡ | 10/1977 | Towsley | ..................... | C25B 1/46 205/75 |
| 4,105,526 A ‡ | 8/1978 | Lewellen, Jr. | ......... | C25D 17/20 204/213 |
| 4,107,003 A ‡ | 8/1978 | Anselrode | ................ | C25D 1/08 205/114 |
| 4,125,447 A ‡ | 11/1978 | Bachert | ..................... | C25D 7/04 204/222 |
| 4,191,617 A ‡ | 3/1980 | Hurley | ..................... | C25D 5/10 205/255 |
| 4,204,918 A ‡ | 5/1980 | McIntyre | ................ | C25D 7/00 205/150 |
| 4,216,272 A ‡ | 8/1980 | Clauss | .................. | C23F 13/02 205/176 |
| 4,246,057 A ‡ | 1/1981 | Janowski | ............... | B29C 63/10 138/146 |
| 4,269,672 A ‡ | 5/1981 | Inoue | ....................... | C25D 5/04 205/96 |
| 4,284,688 A ‡ | 8/1981 | Stucheli | ................ | F01D 25/007 420/451 |
| 4,314,893 A ‡ | 2/1982 | Clauss | .................. | C23F 13/02 205/148 |
| 4,405,427 A ‡ | 9/1983 | Byrd | ..................... | C09D 5/4484 204/477 |
| 4,422,907 A ‡ | 12/1983 | Birkmaier | ............... | C23C 18/22 205/205 |
| 4,461,680 A ‡ | 7/1984 | Lashmore | ............. | C25D 5/627 204/DIG. 9 |
| 4,464,232 A ‡ | 8/1984 | Wakano | ................. | C25D 5/028 205/221 |
| 4,510,209 A ‡ | 4/1985 | Hada | ....................... | C25D 5/10 428/926 |
| 4,519,878 A ‡ | 5/1985 | Hara | ....................... | C25D 5/08 205/176 |
| 4,529,492 A ‡ | 7/1985 | Buchholz | ............... | C25D 13/14 204/479 |
| 4,540,472 A ‡ | 9/1985 | Johnson | ................. | C25D 3/565 205/245 |
| 4,543,300 A ‡ | 9/1985 | Hara | ....................... | C25D 3/565 428/659 |
| 4,543,803 A ‡ | 10/1985 | Keyasko | ............... | C25D 5/627 63/3 |
| 4,591,418 A ‡ | 5/1986 | Snyder | ................ | C23C 14/0641 427/419.7 |
| 4,592,808 A ‡ | 6/1986 | Doubt | ..................... | C23C 18/28 427/259 |
| 4,597,836 A ‡ | 7/1986 | Schaer | ..................... | C25D 1/00 428/626 |
| 4,613,388 A | 9/1986 | Walter et al. | | |
| 4,620,661 A ‡ | 11/1986 | Slatterly | ................ | H01L 21/50 427/125 |
| 4,652,348 A ‡ | 3/1987 | Yahalom | ................. | C25D 5/617 204/DIG. 9 |
| 4,666,567 A ‡ | 5/1987 | Loch | ..................... | C25D 21/12 204/DIG. 9 |
| 4,670,356 A ‡ | 6/1987 | Sato | .................. | G11B 11/10586 428/819.1 |
| 4,678,552 A ‡ | 7/1987 | Chen | ....................... | C25F 5/00 205/717 |
| 4,678,721 A ‡ | 7/1987 | den Broeder | ............ | G11B 5/66 428/641 |
| 4,702,802 A ‡ | 10/1987 | Umino | ................... | C25D 3/565 205/245 |
| H543 H ‡ | 11/1988 | Chen | ....................... | C25D 5/14 428/666 |
| 4,795,735 A ‡ | 1/1989 | Liu | ......................... | B01J 20/20 95/143 |
| 4,834,845 A ‡ | 5/1989 | Muko | ................... | C25D 7/0614 205/148 |
| 4,839,214 A ‡ | 6/1989 | Oda | ........................ | F04F 13/00 428/116 |

(56) References Cited

U.S. PATENT DOCUMENTS

| | | | | | |
|---|---|---|---|---|---|
| 4,869,971 | A | ‡ | 9/1989 | Nee | C25D 5/10 205/240 |
| 4,885,215 | A | ‡ | 12/1989 | Yoshioka | C25D 5/36 138/146 |
| 4,904,542 | A | ‡ | 2/1990 | Mroczkowski | C23C 30/00 428/629 |
| 4,904,543 | A | ‡ | 2/1990 | Sakakima | C23C 14/5806 204/192.2 |
| 4,909,917 | A | ‡ | 3/1990 | Harrison | C25D 7/04 204/199 |
| 4,923,574 | A | ‡ | 5/1990 | Cohen | G11B 5/725 205/252 |
| 4,975,337 | A | ‡ | 12/1990 | Hyner | C25D 5/10 205/180 |
| 4,978,431 | A | | 12/1990 | Brannan et al. | |
| 5,043,230 | A | ‡ | 8/1991 | Jagannathan | C25D 3/565 428/656 |
| 5,045,356 | A | ‡ | 9/1991 | Uemura | C04B 35/83 427/249.4 |
| 5,056,936 | A | ‡ | 10/1991 | Mahrus | F16C 9/04 384/294 |
| 5,059,493 | A | ‡ | 10/1991 | Takahata | C25D 5/10 428/936 |
| 5,073,237 | A | ‡ | 12/1991 | Bacher | C25D 1/10 205/112 |
| 5,079,039 | A | ‡ | 1/1992 | Heraud | C04B 37/005 427/419.7 |
| 5,096,564 | A | ‡ | 3/1992 | Jowitt | C25D 13/14 204/625 |
| 5,156,729 | A | ‡ | 10/1992 | Mahrus | C25D 7/10 205/241 |
| 5,156,899 | A | ‡ | 10/1992 | Kistrup | D06M 11/83 442/379 |
| 5,158,653 | A | ‡ | 10/1992 | Lashmore | C25D 5/12 204/192.15 |
| 5,190,637 | A | ‡ | 3/1993 | Guckel | G03F 7/094 205/125 |
| 5,228,967 | A | ‡ | 7/1993 | Crites | C25D 17/001 204/229.8 |
| 5,234,562 | A | | 8/1993 | Uenishi et al. | |
| 5,268,235 | A | ‡ | 12/1993 | Lashmore | C25D 5/10 428/457 |
| 5,300,165 | A | ‡ | 4/1994 | Sugikawa | H01M 8/0239 442/379 |
| 5,320,719 | A | ‡ | 6/1994 | Lasbmore | C25D 5/50 205/228 |
| 5,326,454 | A | ‡ | 7/1994 | Engelhaupt | C25D 5/48 205/67 |
| 5,352,266 | A | ‡ | 10/1994 | Erb | C25D 3/12 205/104 |
| 5,364,523 | A | ‡ | 11/1994 | Tanaka | C25D 7/10 205/128 |
| 5,378,583 | A | ‡ | 1/1995 | Guckel | G03F 7/00 430/269 |
| 5,413,874 | A | ‡ | 5/1995 | Moysan, III | C23C 28/00 205/255 |
| 5,431,800 | A | ‡ | 7/1995 | Kirchhoff | G01N 27/30 204/290.01 |
| 5,461,769 | A | ‡ | 10/1995 | McGregor | B33Y 80/00 219/121.16 |
| 5,472,795 | A | ‡ | 12/1995 | Atita | B32B 18/00 428/635 |
| 5,489,488 | A | ‡ | 2/1996 | Asai | H01F 41/26 205/255 |
| 5,500,600 | A | ‡ | 3/1996 | Moyes | H05K 9/0069 324/642 |
| 5,547,096 | A | ‡ | 4/1996 | Kleyn | B60K 15/03177 220/62.16 |
| 5,527,445 | A | ‡ | 6/1996 | Palumbo | C25D 7/04 205/104 |
| 5,545,435 | A | ‡ | 8/1996 | Steffier | C04B 35/62884 427/255.6 |
| 5,620,800 | A | ‡ | 4/1997 | De Leeuw | H01B 1/128 428/209 |
| 5,660,704 | A | ‡ | 8/1997 | Murase | C25D 15/02 205/109 |
| 5,679,232 | A | ‡ | 10/1997 | Fedor | C25D 7/0614 29/17.2 |
| 5,738,951 | A | ‡ | 4/1998 | Goujard | C04B 35/565 428/688 |
| 5,742,471 | A | ‡ | 4/1998 | Barbee, Jr. | H01G 4/10 361/321.1 |
| 5,775,402 | A | | 7/1998 | Sachs et al. | |
| 5,783,259 | A | ‡ | 7/1998 | McDonald | B29C 33/3842 427/455 |
| 5,798,033 | A | ‡ | 8/1998 | Uemiya | C25D 1/08 205/164 |
| 5,800,930 | A | ‡ | 9/1998 | Chen | C25D 5/605 205/104 |
| 5,828,526 | A | ‡ | 10/1998 | Kagawa | G11B 5/3903 324/252 |
| 5,912,069 | A | ‡ | 6/1999 | Yializis | B32B 15/08 428/411.1 |
| 5,930,085 | A | ‡ | 7/1999 | Kitade | G11B 5/00 |
| 5,942,096 | A | ‡ | 8/1999 | Ruzicka | C25D 7/0685 204/290.14 |
| 5,952,111 | A | ‡ | 9/1999 | Sugg | C23C 28/322 428/670 |
| 5,958,604 | A | | 9/1999 | Riabkov et al. | |
| 6,036,832 | A | ‡ | 3/2000 | Knol | C25D 1/08 205/75 |
| 6,036,833 | A | ‡ | 3/2000 | Tang | C25D 3/562 205/103 |
| 6,071,398 | A | ‡ | 6/2000 | Martin | C25D 5/627 205/920 |
| 6,143,424 | A | ‡ | 11/2000 | Jonte | C25D 5/14 428/623 |
| 6,143,430 | A | ‡ | 11/2000 | Miyasaka | C23C 28/025 148/264 |
| 6,193,858 | B1 | ‡ | 2/2001 | Hradil | B01J 8/245 204/278 |
| 6,200,452 | B1 | | 3/2001 | Angelini | |
| 6,203,936 | B1 | ‡ | 3/2001 | Cisar | H01M 8/0206 205/213 |
| 6,212,078 | B1 | ‡ | 4/2001 | Hunt | H05K 1/162 428/209 |
| 6,214,473 | B1 | ‡ | 4/2001 | Hunt | C23C 16/402 428/472 |
| 6,284,357 | B1 | ‡ | 9/2001 | Lackey | C04B 35/80 427/249.1 |
| 6,312,579 | B1 | ‡ | 11/2001 | Bank | C25D 7/10 205/104 |
| 6,344,123 | B1 | ‡ | 2/2002 | Bhatnagar | C25D 5/18 205/97 |
| 6,355,153 | B1 | ‡ | 3/2002 | Uzoh | C25D 5/22 205/640 |
| 6,398,937 | B1 | | 6/2002 | Menini et al. | |
| 6,409,907 | B1 | ‡ | 6/2002 | Braun | B82Y 20/00 205/317 |
| 6,415,942 | B1 | ‡ | 7/2002 | Fenton | B60K 15/077 137/574 |
| 6,461,678 | B1 | ‡ | 10/2002 | Chen | C23C 18/1608 427/98.5 |
| 6,466,417 | B1 | ‡ | 10/2002 | Gill | B82Y 25/00 360/3 |
| 6,468,672 | B1 | ‡ | 10/2002 | Donovan, III | C25D 5/14 428/626 |
| 6,482,298 | B1 | | 11/2002 | Bhatnagar | |
| 6,537,683 | B1 | ‡ | 3/2003 | Staschko | C25D 7/10 205/252 |
| 6,547,944 | B2 | ‡ | 4/2003 | Schreiber | C25D 1/006 205/104 |
| 6,592,739 | B1 | ‡ | 7/2003 | Sonoda | C25D 5/028 205/141 |
| 6,725,916 | B2 | | 4/2004 | Gray et al. | |
| 6,739,028 | B2 | ‡ | 5/2004 | Sievenpiper | H05K 1/162 29/841 |

(56) References Cited

U.S. PATENT DOCUMENTS

| | | | |
|---|---|---|---|
| 6,777,831 B2 ‡ | 8/2004 | Gutierrez, Jr. | C25D 5/611 |
| | | | 323/224 |
| 6,800,121 B2 ‡ | 10/2004 | Shahin | C23C 18/36 |
| | | | 427/443.1 |
| 6,884,499 B2 ‡ | 4/2005 | Penich | C23C 30/005 |
| | | | 51/307 |
| 6,902,827 B2 ‡ | 6/2005 | Kelly | C23C 28/023 |
| | | | 205/104 |
| 6,908,667 B2 ‡ | 6/2005 | Christ | C04B 41/52 |
| | | | 188/205 |
| 6,923,898 B2 | 8/2005 | Yoshimura et al. | |
| 6,979,490 B2 ‡ | 12/2005 | Steffier | C04B 35/62894 |
| | | | 428/297.4 |
| 7,285,202 B2 ‡ | 10/2007 | Rumpf | C25D 7/04 |
| | | | 205/131 |
| 7,581,933 B2 ‡ | 9/2009 | Bruce | C23C 28/321 |
| | | | 415/217.1 |
| 7,632,590 B2 ‡ | 12/2009 | Punsalan | H01M 8/04197 |
| | | | 429/406 |
| 7,736,753 B2 ‡ | 6/2010 | Deligianni | H01F 41/26 |
| | | | 428/548 |
| 8,084,564 B2 | 12/2011 | Kano et al. | |
| 8,128,752 B2 | 3/2012 | Kim | |
| 8,152,985 B2 ‡ | 4/2012 | Macary | C23C 18/1834 |
| | | | 205/205 |
| 8,177,945 B2 | 5/2012 | Arvin et al. | |
| 8,192,608 B2 ‡ | 6/2012 | Matthews | C25D 21/12 |
| | | | 204/229.5 |
| 8,253,035 B2 ‡ | 8/2012 | Matsumoto | C25D 5/56 |
| | | | 205/137 |
| 8,293,077 B2 ‡ | 10/2012 | Vacheron | C25D 11/02 |
| | | | 204/201 |
| 8,585,875 B2 ‡ | 11/2013 | Cummings | C25D 21/12 |
| | | | 204/229.4 |
| 8,617,456 B1 | 12/2013 | Pechenik et al. | |
| 8,814,437 B2 ‡ | 8/2014 | Braun | F16C 33/46 |
| | | | 29/898.067 |
| 8,871,065 B2 ‡ | 10/2014 | Vacheron | C25D 21/10 |
| | | | 204/198 |
| 8,916,001 B2 | 12/2014 | Pryce Lewis et al. | |
| 9,005,420 B2 ‡ | 4/2015 | Tomantschger | C25D 21/14 |
| | | | 205/148 |
| 9,056,405 B2 | 6/2015 | Sato et al. | |
| 9,080,692 B2 ‡ | 7/2015 | Tomomori | C25D 5/617 |
| 9,108,506 B2 ‡ | 8/2015 | Whitaker | C25D 5/617 |
| 9,115,439 B2 ‡ | 8/2015 | Whitaker | F41H 5/0478 |
| 9,234,294 B2 ‡ | 1/2016 | Whitaker | C25D 3/665 |
| 9,273,932 B2 ‡ | 3/2016 | Whitaker | C25D 7/00 |
| 9,732,433 B2 ‡ | 8/2017 | Caldwell | C25D 5/56 |
| 9,758,891 B2 ‡ | 9/2017 | Bao | C25D 1/00 |
| 9,783,907 B2 | 10/2017 | Cai et al. | |
| 9,938,629 B2 ‡ | 4/2018 | Whitaker | C25D 3/20 |
| 10,041,185 B2 ‡ | 8/2018 | Sukenari | C25D 17/06 |
| 10,253,419 B2 ‡ | 4/2019 | Lomasney | C25D 5/18 |
| 10,266,957 B2 ‡ | 4/2019 | Sugawara | C25D 5/623 |
| 10,472,727 B2 ‡ | 11/2019 | Lomasney | C25D 7/0607 |
| 10,513,791 B2 ‡ | 12/2019 | Lomasney | C25D 3/562 |
| 10,544,510 B2 ‡ | 1/2020 | Lomasney | C25D 5/18 |
| 10,662,542 B2 ‡ | 5/2020 | Caldwell | C25D 3/58 |
| 10,689,773 B2 | 6/2020 | Whitaker et al. | |
| 10,695,797 B2 ‡ | 6/2020 | Andreae | B05D 7/222 |
| 10,781,524 B2 | 9/2020 | Whitaker et al. | |
| 10,808,322 B2 | 10/2020 | Whitaker et al. | |
| 10,844,504 B2 | 11/2020 | Sklar | |
| 10,851,464 B1 | 12/2020 | Kobayashi et al. | |
| 10,961,635 B2 | 3/2021 | Whitaker | |
| 11,118,280 B2 | 9/2021 | Lomasney et al. | |
| 11,168,408 B2 | 11/2021 | Sklar | |
| 11,180,864 B2 | 11/2021 | Lomasney | |
| 11,242,613 B2 | 2/2022 | Lomasney | |
| 11,286,575 B2 | 3/2022 | Lomasney et al. | |
| 11,293,272 B2 | 4/2022 | Lomasney | |
| 11,365,488 B2 | 6/2022 | Morgan et al. | |
| 11,519,093 B2 | 12/2022 | Lomasney et al. | |
| 11,560,629 B2 | 1/2023 | Whitaker et al. | |
| 2001/0003384 A1 | 6/2001 | Morita | |
| 2001/0037944 A1 ‡ | 11/2001 | Sanada | C25D 17/20 |
| | | | 204/279 |
| 2002/0011419 A1 | 1/2002 | Arao et al. | |
| 2002/0079229 A1* | 6/2002 | Yoshimura | H01F 41/026 |
| | | | 205/137 |
| 2002/0100858 A1 ‡ | 8/2002 | Weber | B29C 33/04 |
| | | | 249/80 |
| 2002/0179449 A1 ‡ | 12/2002 | Domeier | B29C 33/3857 |
| | | | 29/527.3 |
| 2003/0134142 A1 ‡ | 7/2003 | Ivey | B32B 15/016 |
| | | | 205/104 |
| 2003/0234181 A1 ‡ | 12/2003 | Palumbo | C25D 5/617 |
| | | | 205/76 |
| 2003/0236163 A1 ‡ | 12/2003 | Chaturvedi | B01J 35/06 |
| | | | 502/308 |
| 2004/0027715 A1 ‡ | 2/2004 | Hixson-Goldsmith | |
| | | | G11B 5/3163 |
| | | | 360/110 |
| 2004/0031691 A1 ‡ | 2/2004 | Kelly | C23C 28/023 |
| | | | 428/596 |
| 2004/0067314 A1 ‡ | 4/2004 | Joshi | C23C 18/54 |
| | | | 106/287.18 |
| 2004/0154925 A1 ‡ | 8/2004 | Podlaha | C25D 5/625 |
| | | | 205/104 |
| 2004/0178076 A1 ‡ | 9/2004 | Stonas | C25D 1/00 |
| | | | 205/74 |
| 2004/0211672 A1 ‡ | 10/2004 | Ishigami | C25D 5/18 |
| | | | 205/181 |
| 2004/0232005 A1 | 11/2004 | Hubel | |
| 2004/0234683 A1 | 11/2004 | Tanaka et al. | |
| 2004/0239836 A1 ‡ | 12/2004 | Chase | H04M 1/0214 |
| | | | 349/98 |
| 2005/0002228 A1 ‡ | 1/2005 | Dieny | B82Y 25/00 |
| | | | 257/E27.005 |
| 2005/0109433 A1 ‡ | 5/2005 | Danger | C22C 38/24 |
| | | | 148/533 |
| 2005/0205425 A1 ‡ | 9/2005 | Palumbo | C25D 5/06 |
| | | | 204/508 |
| 2005/0221100 A1 ‡ | 10/2005 | Kirihara | C30B 5/00 |
| | | | 428/457 |
| 2005/0279640 A1 ‡ | 12/2005 | Shimoyama | H01L 23/49816 |
| | | | 205/252 |
| 2006/0065533 A1 | 3/2006 | Inoue et al. | |
| 2006/0135281 A1 ‡ | 6/2006 | Palumbo | A01K 87/00 |
| | | | 473/316 |
| 2006/0135282 A1 ‡ | 6/2006 | Palumbo | B82Y 30/00 |
| | | | 473/316 |
| 2006/0201817 A1 ‡ | 9/2006 | Guggemos | C25D 17/005 |
| | | | 204/198 |
| 2006/0243597 A1 ‡ | 11/2006 | Matefi-Tempfli | C25D 5/10 |
| | | | 204/242 |
| 2006/0269770 A1 ‡ | 11/2006 | Cox | C25D 5/022 |
| | | | 428/614 |
| 2006/0272949 A1 ‡ | 12/2006 | Detor | C25D 5/611 |
| | | | 205/238 |
| 2006/0286348 A1 ‡ | 12/2006 | Sauer | C23C 18/2013 |
| | | | 428/141 |
| 2007/0158204 A1 ‡ | 7/2007 | Taylor | C25D 5/617 |
| | | | 205/300 |
| 2007/0269648 A1 ‡ | 11/2007 | Schuh | C25D 3/56 |
| | | | 428/323 |
| 2007/0278105 A1 ‡ | 12/2007 | Ettel | C25D 17/008 |
| | | | 204/280 |
| 2008/0063866 A1 | 3/2008 | Allen et al. | |
| 2008/0093221 A1 ‡ | 4/2008 | Basol | H01L 31/0322 |
| | | | 257/E31.027 |
| 2008/0102360 A1 ‡ | 5/2008 | Stimits | H01M 10/285 |
| | | | 205/240 |
| 2008/0226976 A1 ‡ | 9/2008 | Stimits | H01M 4/662 |
| | | | 205/240 |
| 2008/0245669 A1 ‡ | 10/2008 | Yoshioka | C25D 21/04 |
| | | | 205/210 |

(56) References Cited

U.S. PATENT DOCUMENTS

| | | | |
|---|---|---|---|
| 2008/0271995 A1 ‡ | 11/2008 | Savastiouk | H05K 3/423 205/148 |
| 2008/0283236 A1 | 11/2008 | Akers et al. | |
| 2009/0004465 A1 ‡ | 1/2009 | Kano | C23C 18/30 427/532 |
| 2009/0084933 A1 | 4/2009 | Appleby et al. | |
| 2009/0101511 A1 ‡ | 4/2009 | Lochtman | C25D 17/005 205/137 |
| 2009/0114530 A1 | 5/2009 | Noda et al. | |
| 2009/0130424 A1 ‡ | 5/2009 | Tholen | B28B 3/00 264/44 |
| 2009/0130425 A1 ‡ | 5/2009 | Whitaker | B32B 5/16 428/312.8 |
| 2009/0139870 A1 | 6/2009 | Nagai et al. | |
| 2009/0155617 A1 ‡ | 6/2009 | Kim | B82Y 25/00 428/629 |
| 2009/0283410 A1 ‡ | 11/2009 | Sklar | C25D 3/562 205/255 |
| 2010/0078330 A1 | 4/2010 | Hyodo | |
| 2010/0116675 A1 | 5/2010 | Sklar et al. | |
| 2010/0187117 A1 ‡ | 7/2010 | Lingenfelter | C08K 3/105 205/50 |
| 2010/0304063 A1 ‡ | 12/2010 | McCrea | B32B 15/16 428/35.8 |
| 2010/0304179 A1 ‡ | 12/2010 | Facchini | C22C 19/07 428/615 |
| 2010/0319757 A1 ‡ | 12/2010 | Oetting | H01L 31/0392 136/252 |
| 2011/0111296 A1 | 5/2011 | Berdichevsky et al. | |
| 2011/0162970 A1 ‡ | 7/2011 | Sato | C25D 13/22 204/229.8 |
| 2011/0180413 A1 ‡ | 7/2011 | Whitaker | C25D 17/10 205/170 |
| 2011/0186582 A1 ‡ | 8/2011 | Whitaker | B22F 7/004 220/563 |
| 2011/0256356 A1 ‡ | 10/2011 | Tomantschger | C25D 17/008 977/734 |
| 2011/0277313 A1 ‡ | 11/2011 | Soracco | A63B 60/00 29/592 |
| 2012/0118745 A1 ‡ | 5/2012 | Bao | C25D 1/00 205/67 |
| 2012/0135270 A1 ‡ | 5/2012 | Wilbuer | C25D 5/12 428/656 |
| 2012/0231574 A1 ‡ | 9/2012 | Wang | C25D 7/0621 204/267 |
| 2012/0282417 A1 ‡ | 11/2012 | Garcia | C23C 18/1641 427/443.1 |
| 2013/0052343 A1 ‡ | 2/2013 | Dieny | H01F 10/3272 264/219 |
| 2013/0071755 A1 ‡ | 3/2013 | Oguro | H01M 4/0452 205/104 |
| 2013/0075264 A1 ‡ | 3/2013 | Cummings | C25D 21/12 204/229.4 |
| 2013/0130057 A1 ‡ | 5/2013 | Caldwell | C25D 5/56 428/626 |
| 2013/0186852 A1 ‡ | 7/2013 | Dietrich | H01L 21/02 427/256 |
| 2013/0220831 A1 ‡ | 8/2013 | Vidaurre Heiremans | C25D 21/10 204/233 |
| 2013/0224008 A1 ‡ | 8/2013 | Cheung | F01D 25/162 415/208.1 |
| 2013/0323473 A1 ‡ | 12/2013 | Dietsch | B29C 64/106 427/407.1 |
| 2014/0163717 A1 ‡ | 6/2014 | Das | B33Y 70/00 700/119 |
| 2014/0178637 A1 | 6/2014 | Rajagopalan et al. | |
| 2014/0231266 A1 ‡ | 8/2014 | Sherrer | B29C 70/882 164/94 |
| 2014/0272458 A1 | 9/2014 | Ruan et al. | |
| 2015/0315716 A1 ‡ | 11/2015 | Whitaker | C25D 5/10 428/548 |
| 2015/0322588 A1 ‡ | 11/2015 | Lomasney | C25D 5/18 428/447 |
| 2016/0002790 A1 ‡ | 1/2016 | Whitaker | C25D 5/605 428/626 |
| 2016/0002803 A1 ‡ | 1/2016 | Sklar | C25D 3/54 428/634 |
| 2016/0002806 A1 ‡ | 1/2016 | Lomasney | F16L 9/02 138/145 |
| 2016/0002813 A1 ‡ | 1/2016 | Lomasney | C25D 3/34 204/229.4 |
| 2016/0024663 A1 ‡ | 1/2016 | Lomasney | C25D 5/605 205/177 |
| 2016/0027425 A1 | 1/2016 | Cook et al. | |
| 2016/0047980 A1 | 2/2016 | Page et al. | |
| 2016/0145850 A1 ‡ | 5/2016 | Cook | C23C 26/00 52/651.01 |
| 2016/0159488 A1 ‡ | 6/2016 | Roach | B29D 22/00 427/443.1 |
| 2016/0160863 A1 ‡ | 6/2016 | Roach | B32B 27/281 416/193 |
| 2016/0214283 A1 | 7/2016 | Schick et al. | |
| 2016/0298251 A1 | 10/2016 | Kimoto et al. | |
| 2017/0191177 A1 ‡ | 7/2017 | Whitaker | B22F 10/18 |
| 2017/0191179 A1 ‡ | 7/2017 | Sklar | C25D 5/18 |
| 2017/0275775 A1 | 9/2017 | Guadarrama Calderon et al. | |
| 2018/0016694 A1 ‡ | 1/2018 | Bao | C25D 3/665 |
| 2018/0066375 A1 ‡ | 3/2018 | Morgan | C25D 5/14 |
| 2018/0071980 A1 ‡ | 3/2018 | Lomasney | B29C 64/147 |
| 2018/0245229 A1 ‡ | 8/2018 | Whitaker | C25D 17/10 |
| 2019/0309430 A1 ‡ | 10/2019 | Sklar | C25D 5/611 |
| 2019/0360116 A1 ‡ | 11/2019 | Collinson | G01N 27/42 |
| 2020/0115998 A1 ‡ | 4/2020 | Lomasney | F04B 53/14 |
| 2020/0173032 A1 ‡ | 6/2020 | Lomasney | B32B 3/20 |
| 2020/0283923 A1 | 9/2020 | Lomasney | |
| 2020/0354846 A1 | 11/2020 | Whitaker et al. | |
| 2021/0054522 A1 | 2/2021 | Lomasney et al. | |
| 2021/0071303 A1 | 3/2021 | Whitaker et al. | |
| 2022/0081798 A1 | 3/2022 | Collinson et al. | |
| 2022/0154357 A1 | 5/2022 | Lomasney | |
| 2022/0396893 A1 | 12/2022 | Lomasney et al. | |

OTHER PUBLICATIONS

Kalantary et al., "Compositionally modulated alloy synthesis by electrochemical deposition," *National UK Corrosion Conference of the Institute of Corrosion*, 15th:223-234, Jan. 1, 1995.

Kalantary et al., "The Production of Compositionally Modulated Alloys by Simulated High Speed Electrodeposition From a Single Solution," *Electrochimica Acta* 40(11):1609-1616, 1995.

Nabiyouni et al., "Growth, characterization and magnetoresistive study of electrodeposited Ni/Cu and Co—Ni/Cu multilayers," *Journal of Crystal Growth* 275:e1259-e1262, 2005.

\* cited by examiner

‡ imported from a related application

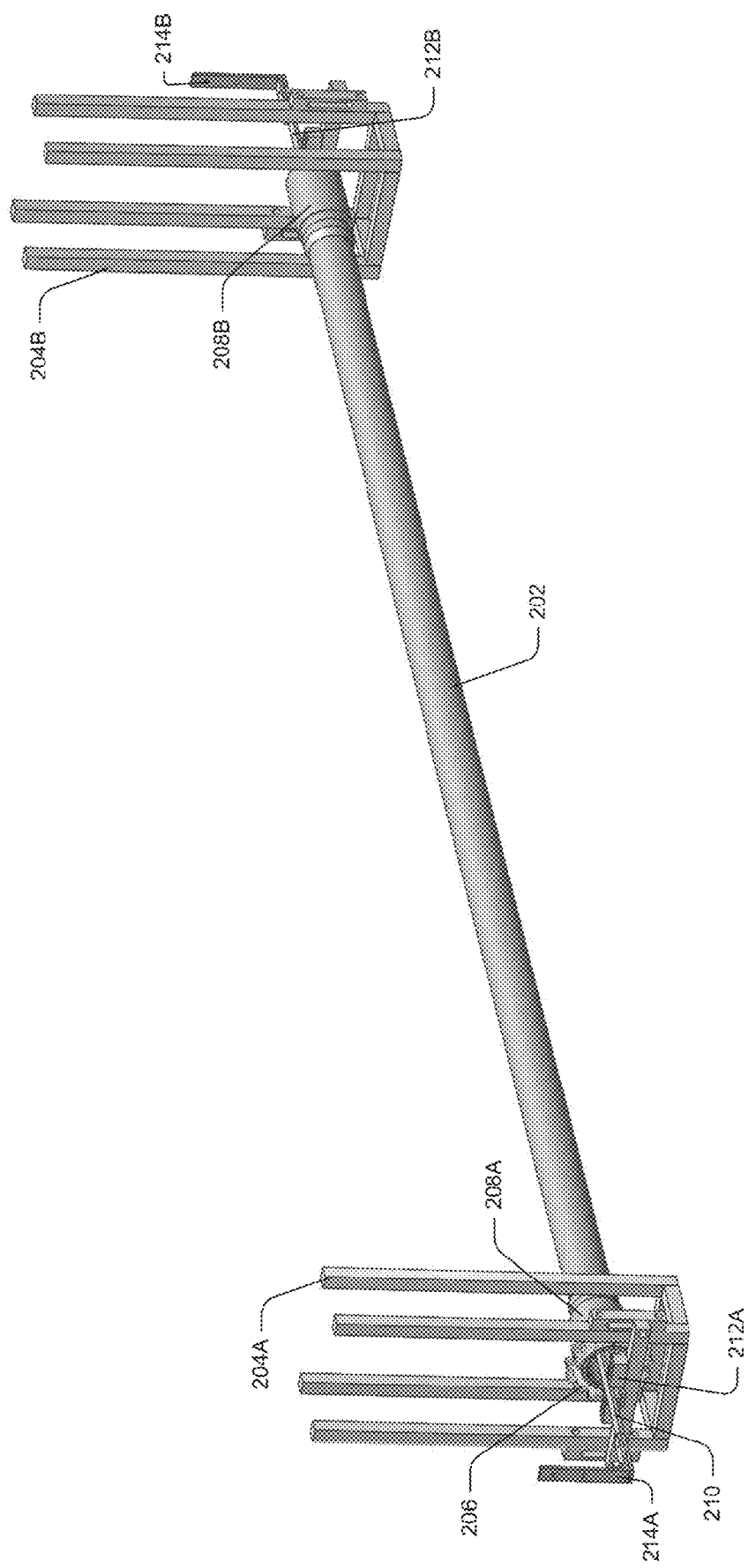

TUBULAR ARTICLES WITH ELECTRODEPOSITED COATINGS, AND SYSTEMS AND METHODS FOR PRODUCING THE SAME

BACKGROUND

Technical Field

The present disclosure generally relates to tubular articles comprising electrodeposited coatings on tubular workpieces, and more specifically to compositionally modulated (e.g., concentration of metals in an alloy, etc.) or structurally modulated (e.g., layer thickness, layer density, etc.), nano- or microlaminate coatings on tubular workpieces, as well as apparatuses, systems, and methods for the electrodeposition of the same.

Background

Nanolaminate coatings on materials have become more widely studied in laboratory environments and at laboratory scale over the past several decades for their potential to provide desirable performance characteristics.

While the potential application of nanolaminate coatings on materials in numerous areas, including civil infrastructure, automotive, aerospace, and electronics have been attempted, the desired coatings are generally not available on large scale substrates with complex geometries or capable of being produced at commercially viable rates. Electrodepositing multilayer nanolaminate coatings on tubular substrates has not been fully realized due to a lack of processes and systems for their production. Instead, polymer liners are generally used to temporarily improve heat, wear, and corrosion resistance. However, such polymer liners have temperature limitations and limited wear performance, and therefore provide only limited protection to the underlying tubular substrate.

Moreover, typical rack processing techniques require that the workpiece be mounted on a fixture, which is then lowered into a plating solution and connected to an electrical power source. Electrodeposition techniques typically require large contact areas between the electrical power source and the workpiece. As such, electrodeposition racks must be capable of securing a workpiece as well as providing a low impedance current path that makes good electrical contact with the workpiece. Sometimes pins, wires, rods, alligator clips, screws, or clamps are used to provide the necessary electrical contacts. However, these contact areas are generally fixed during the electrodeposition process, and minimize or eliminate the availability or circulation of electrolyte under the electrical contacts. Therefore, when removed, such contacts leave marked-off areas of the coated workpiece (i.e., locations on the article where no coating or substantially no coating is present). Marked-off areas, particularly on a surface that will be in contact with a corrosive substance or that will be used in a high wear environment, may compromise the overall integrity of the coating and can significantly reduce the heat, wear, or corrosion resistance of the coated article.

There has been much effort in the field to improve heat, wear, and corrosion resistant coatings for tubular substrates. While some progress has been made, a need exists for improved nanolaminate coatings for tubular substrates, and methods of making and using the same, that provide such improvements. The present disclosure addresses these issues and provides related improvements with significant advantages.

SUMMARY

In various aspects, the present disclosure provides a tubular article, comprising: a tubular workpiece having an interior surface, an exterior surface and a length of at least one meter (m); and nanolaminate coatings comprising: a first nanolaminate coating on the interior surface; and a second nanolaminate coating on the exterior surface, the first and second nanolaminate coatings covering substantially 100% of the interior surface and the exterior surface, respectively.

In other aspects, the present disclosure provides a tubular article, comprising: a tubular workpiece having an interior surface and an exterior surface; and nanolaminate coatings comprising: a first nanolaminate coating on the interior surface; and a second nanolaminate coating on the exterior surface, the second nanolaminate coating having a thickness that is less than a thickness of the first nanolaminate coating.

In some embodiments, the tubular article further comprises a first threaded portion of the tubular workpiece; and a third nanolaminate coating on the first threaded portion, the third nanolaminate coating having a thickness that is less than the thickness of the first nanolaminate coating.

In further aspects, the present disclosure provides a tubular article, comprising: a tubular workpiece having an interior surface and an exterior surface, the tubular workpiece comprising a first threaded portion and nanolaminate coatings comprising: a first nanolaminate coating on the interior surface; a second nanolaminate coating on the exterior surface; and a third nanolaminate coating on the first threaded portion, the third nanolaminate coating having a thickness that is less than a thickness of the first nanolaminate coating and a thickness of the second nanolaminate coating.

In embodiments, the thickness of the first nanolaminate coating and the thickness of the second nanolaminate coating are substantially the same. In other embodiments, the first nanolaminate coating has a thickness that is greater than a thickness of the second nanolaminate coating. In further embodiments, the interior surface and the exterior surface are substantially 100% covered by the nanolaminate coatings.

In embodiments, the tubular workpiece is a connector for joining two oil country tubular goods (OCTG), an OCTG, or a line pipe. In some embodiments, the tubular article is resistant to $H_2S$-induced sulfide stress cracking under sour service environments having a $H_2S$ partial pressure greater than 0.05 psi (0.3 kPa) when tested according to NACE TM0175 or ASTM E399. In some embodiments, the tubular article is resistant to cracking when subjected to tensile load of 80% of the yield strength of the tubular article in sulfide stress cracking environment for 720 hours according to National Association of Corrosion Engineers (NACE) TM0177 standardized testing in a service environment with a pH ranging from about 3 to about 7; the nanolaminate coatings do not lose more than 25% of its mass when subjected to NACE TM0193-2016 standardized testing with 15% HCl at 75 degrees Celsius for 6 hours; the tubular article is resistant to cracking of the nanolaminate coating when exposed to autoclave environments per NACE standard TM0175 or American Society for Testing and Materials (ASTM) E399 standardized testing for high sour gas conditions; the tubular article is resistance to pitting wherein individual pits are not deeper than 10% of the nanolaminate coating when tested according to ASTM G48 testing standards; or the tubular workpiece is resistant to hydrogen sulfide-induces stress cracking or pitting in excess of 10% of a thickness of the first or second nanolaminate coating in a service environment with a pH ranging from about 3 to about 7.

In embodiments, the first nanolaminate coating and the second nanolaminate coating each comprise a series of alternating layers. In some embodiments, the third nanolaminate coating comprises a series of alternating layers. In embodiments, the series of alternating layers comprises: a first layer comprising at least one electrodepositable species independently selected from Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr; and a second layer comprising at least one electrodepositable species independently selected from Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr. In some embodiments, the first layer comprises each electrodepositable species of the at least one electrodepositable species in a concentration of at least 0.01% (w/w); and the second layer comprises each electrodepositable species of the at least one electrodepositable species in a concentration of at least 0.01% (w/w).

Aspects of the present disclosure include an apparatus comprising: a rack comprising: at least one support structure configured to support a tubular workpiece having a substantially cylindrical shape, a hollow cavity defined by an inner surface having a first surface area, an outer surface having a second surface area, and a longitudinal axis; and a contact point assembly configured to rotate the tubular workpiece or enable electrical contact with the tubular workpiece; and an interior anode supported by the rack, the interior anode having an exterior surface, the interior anode configured to be positioned substantially along the longitudinal axis or an axis substantially parallel to the longitudinal axis within the hollow cavity of the tubular workpiece, such that the exterior surface of the interior anode is positioned a predetermined distance from the inner surface of the tubular workpiece.

In some embodiments, an apparatus further comprises a conductive bus supported by the rack, the conductive bus configured to be in electrical contact with the tubular workpiece via the contact point assembly, such that the tubular workpiece is free to rotate while maintaining electrical contact with the conductive bus. In some embodiments, the contact point assembly comprises a gear, the gear comprising a threaded portion, and the conductive bus being configured to be in electrical contact with the tubular workpiece via the gear.

In further aspects, the present disclosure provides an apparatus comprising: a rack configured to support a tubular workpiece, wherein the tubular workpiece is substantially cylindrical, and comprises: a longitudinal axis; a hollow cavity defined by an inner surface having a first surface area; and an outer surface having a second surface area, the rack comprising: a conductive bus; a dynamic contact point assembly electrically coupled to the conductive bus, such that the tubular workpiece and the conductive bus are in electrical contact via the dynamic contact point assembly during rotation of the tubular workpiece; a drive roller that is substantially cylindrical in shape, the drive roller configured to maintain physical contact with the tubular workpiece; and a driven roller that is substantially cylindrical in shape, the driven roller configured to maintain physical contact with the tubular workpiece.

In embodiments, the dynamic contact point assembly includes a conductive roller assembly comprising a conductive roller that is configured to be in electrical contact with the tubular workpiece. In further embodiments, the conductive bus is configured to maintain electrical contact with the outer surface of the tubular workpiece.

In some embodiments, an apparatus further comprises an interior anode having an exterior surface, the interior anode configured to be positioned along the longitudinal axis of the tubular workpiece or an axis substantially parallel to the longitudinal axis within the hollow cavity of the tubular workpiece such that the exterior surface of the interior anode is positioned a predetermined distance from the inner surface of the tubular workpiece. In yet further embodiments, the interior anode is columnar or tubular, the interior anode having a diameter that is smaller than an inner diameter of the tubular workpiece. In some embodiments, the exterior surface of the interior anode is corrugated. In some embodiments, the interior anode has a hollow cavity. In some embodiments, the interior anode has a plurality of holes that extend laterally through the interior anode.

In some embodiments, an apparatus further comprises an exterior anode having a length that is less than or equal to a length of the tubular workpiece, the exterior anode being adjacent to the tubular workpiece at a second predetermined distance from an exterior surface of the tubular workpiece In further embodiments, an apparatus further comprises shielding or thieving positioned adjacent to the tubular workpiece. In some such embodiments, the tubular workpiece has a first threaded portion; at least a portion of the shielding or thieving is positioned adjacent to the first threaded portion between the tubular workpiece and the interior anode or the exterior anode.

Aspects of the present disclosure further include an electroplating system comprising: a tubular workpiece having a substantially cylindrical shape, a hollow cavity defined by an inner surface of the tubular workpiece, and a longitudinal axis; and an apparatus described herein.

In some embodiments, an electroplating system further comprises an electrolyte bath. In further embodiments, an electroplating system further comprises a process tank that, in operation, houses the rack and the electrolyte bath. In yet further embodiments, an electroplating system further comprises an electrolyte distribution tube positioned adjacent to the interior anode within the hollow cavity of the tubular workpiece.

In embodiments, an electroplating system further comprises a power supply electrically coupled to the interior anode; and a power supply controller that, in operation, controls at least one of a current and a voltage applied to the tubular workpiece. In some embodiments, the power supply controller, in operation, controls a current density applied to the tubular workpiece, wherein the current density varies over time.

In other aspects, the present disclosure provides a method for producing a nanolaminate coating on a tubular workpiece comprising: introducing a tubular workpiece that is substantially cylindrical, has a longitudinal axis, has a hollow cavity defined by an inner surface, and an outer surface, to a system comprising: a rack that, in operation, supports the tubular workpiece; an interior anode; and an electrolyte bath comprising an electrolyte solution having an electrodepositable species; rotating the tubular workpiece in the rack at a rotational speed; and electrodepositing the electrodepositable species onto the tubular workpiece as a first nanolaminate coating and a second nanolaminate coating, the first nanolaminate coating being on at least a portion of the outer surface, the first nanolaminate coating having a first thickness; and the second nanolaminate coating being on at least a portion of the inner surface, the second nanolaminate coating having a second thickness.

In embodiments, the electrodepositing comprises applying a voltage or a current to the tubular workpiece or a conductive article in contact with the tubular workpiece. In some embodiments, the voltage or current is varied over time. In further embodiments, the rotating the tubular workpiece comprises varying the rotational speed over time, such that a composition of the first nanolaminate coating or the second nanolaminate coating is changed.

In various embodiments, the tubular workpiece is rotated by a driven roller that is substantially cylindrical in shape and is in physical contact with the tubular workpiece. In some embodiments, the tubular workpiece is rotated by a gear in physical contact with the tubular workpiece or a coupler in physical contact with the tubular workpiece.

In some embodiments, introducing the tubular workpiece to the system comprises positioning the interior anode along the longitudinal axis of the tubular workpiece or an axis substantially parallel to the longitudinal axis within the hollow cavity of the tubular workpiece such that an exterior surface of the interior anode is positioned a predetermined distance from the inner surface of the tubular workpiece.

In further embodiments, the electrodepositing the electrodepositable species comprises distributing a portion of the electrolyte solution into the hollow cavity of the tubular workpiece via a hollow cavity of the interior anode or a plurality of holes that extend laterally through the interior anode. In still further embodiments, the electrodepositing the electrodepositable species comprises distributing a portion of the electrolyte solution into the hollow cavity via an electrolyte distribution tube positioned in the hollow cavity of the tubular workpiece. In additional embodiments, the electrodepositing the electrodepositable species comprises distributing a portion of the electrolyte solution into the hollow cavity via a plurality of holes in an electrolyte distribution tube positioned in the hollow cavity of the tubular workpiece. In some embodiments, the electrodepositing the electrodepositable species comprises positioning an exterior anode adjacent to the tubular workpiece.

Further aspects of the present disclosure include a tubular article produced by the methods described herein. Additional aspects of the present disclosure include an oil country tubular good (OCTG) produced by the method described herein.

In some aspects, the present disclosure provides an anode comprising a substantially cylindrical metal member, the metal member having an exterior surface with a surface area feature that increases a surface area of the anode, the metal member, in use, being in electrical contact with a tubular workpiece.

In embodiments, the anode is tubular, such that a hollow cavity is defined by an inner surface of the anode. In some embodiments, the surface area feature is a series of continuous alternating convex and concave portions, such that the exterior surface is corrugated. In further embodiments, the exterior surface is configured in a polygonal or sawtooth tube configuration, the exterior surface comprising a number of interconnected sides.

In some embodiments, the anode is substantially solid. In other embodiments, the anode is porous, and wherein the anode has a percentage open area ranging from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, or from about 95% to about 99%.

Further aspects of the disclosure include a method of configuring an anode for use in an electrodeposition process to deposit a nanolaminate coating on a tubular workpiece, the method comprising: determining a surface area of the anode based on: a ratio of a first surface area corresponding to an inner surface of the tubular workpiece to a second surface area corresponding to an outer surface of the tubular workpiece; and a ratio of an inner diameter of the tubular workpiece to distance between outer surface of the tubular workpiece to the outer anode surface, wherein the surface area of the anode provides a coating on the tubular workpiece such that a ratio of a first thickness of the nanolaminate coating on the inner surface to a second thickness of the nanolaminate coating on the outer surface is about one.

BRIEF DESCRIPTION OF THE DRAWINGS

The detailed description is described with reference to the accompanying figures. In the figures, the left-most digit(s) of a reference number identifies the figure in which the reference number appears. The same right-most digits of a reference number in different figures indicates similar or identical components or features.

The sizes and relative positions of elements in the figures are not necessarily drawn to scale. For example, the shapes of various elements and angles are not drawn to scale and some of these elements are arbitrarily enlarged and positioned to improve figure legibility. Further, the particular shapes of the elements as drawn, are not intended to convey any information regarding the actual shape of the particular elements, and have been solely selected for ease of recognition in the figures.

FIG. 2 shows an illustrative embodiment of an electrodeposition apparatus for a tubular workpiece having a fixed electrical contact point assembly.

FIG. 10A shows a cross section of a system along a longitudinal axis of a tubular substrate; FIG. 10B shows a view from above; and FIG. 10C shows a cross section taken at a mid-point of a tubular workpiece in a direction substantially perpendicular to a longitudinal axis.

DETAILED DESCRIPTION

Figure 1A:
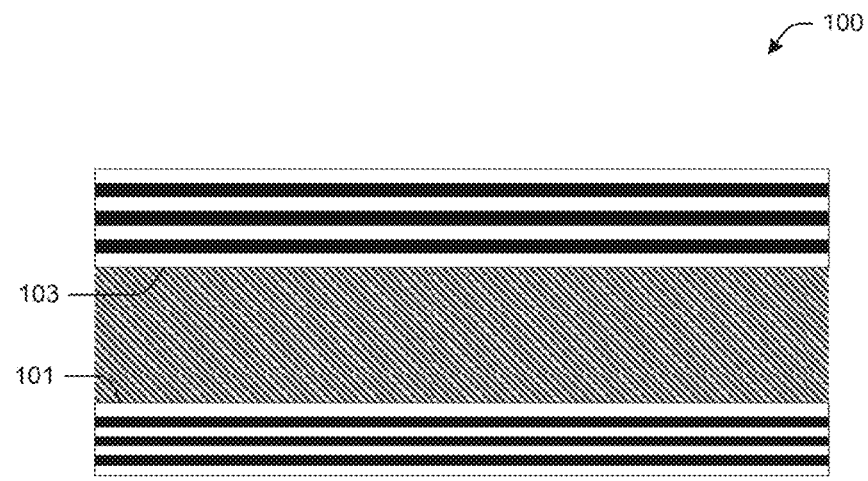
FIGS. 1A and 1B are illustrative examples of inner and outer walls of tubular workpieces coated with nanolaminate coatings.

The present disclosure is generally directed to electrodeposited nanolaminate coatings on tubular substrates, which have improved heat, wear, and corrosion resistance, as well as methods of making and using the same.

Prior to setting forth this disclosure in more detail, it may be helpful to an understanding thereof to provide definitions of certain terms to be used herein. Additional definitions are set forth throughout this disclosure.

"Electrodeposition" or "electrodeposited" refers to a process or a resultant product, respectively, in which electrolysis is used to deposit a coating onto a workpiece. In other words, a workpiece is contacted with (e.g., partially immersed in, or fully immersed in) an electrolyte solution containing one or more ions (e.g., metal, ceramic, etc.) while an electric current is passed through the workpiece and the electrolyte solution, resulting in a thin coating being deposited on the surface of the workpiece. Such an electrodeposited coating that includes two or more layers may be referred to as a "laminate" coating.

For the purposes of this disclosure "coatings" include any thin layers that are electrodeposited onto a surface of a workpiece. Therefore "coatings," as used herein, includes claddings, which are made of a series of thin electrodeposited layers on a surface of a mandrel, where the mandrel is removed after formation of the electrodeposited layers. Claddings are generally fastened to another article as a protective layer after formation.

A "nanolaminate coating" refers to an electrodeposited coating that includes at least one layer with a thickness of less than 10,000 nanometers (i.e., 10 microns). In embodiments, a nanolaminate coating includes two or more layers in which individual layers have a thickness of less than 10,000 nanometers. Although processes described herein are particularly suited for providing nanolaminate coatings, the same or similar processes can also be used to make similar articles in which individual layers that are thicker than 10 microns. Such coatings may be referred to as "microlaminate coatings."

The term "workpiece" includes any item with a surface onto which a coating is electrodeposited. Workpieces include substrates, which are objects on which a coating is applied, and mandrels, which are substrates from which the coating is removed after formation. Generally, for the purposes of this disclosure tubular workpieces are used.

"Tubular" workpieces have a substantially cylindrical shape and a hollow cavity defined by an inner surface of a tubular workpiece. A hollow cavity of a tubular workpiece is generally substantially cylindrical in shape and is aligned along a longitudinal axis, which runs from a center of one base of the substantially cylindrical shape to a center of the other base. Additionally, a base of a hollow cavity is centered substantially in the center of a base of a tubular workpiece. In contrast, a "columnar" shape is substantially cylindrical, but does not have a hollow cavity.

An "article" describes a finished product of a workpiece that has been coated by a method as described herein. Therefore, an article is a workpiece with a nanolaminate or microlaminate coating.

"Balance" or "balance of the composition," as used herein in reference to the composition of materials, refers to the portion of the composition not defined by an explicit amount or range, or, in other words, the remainder of the composition.

All compositions given as percentages are given as percent by weight unless stated otherwise.

The term "about" has the meaning reasonably ascribed to it by a person of ordinary skill in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

The term "substantially" has the meaning reasonably ascribed to it by a person of ordinary skill in the art when used to describe a physical characteristic of an item, i.e., indicating that the item possesses the referenced characteristic to a significant extent, e.g., to within a range of ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic. For example, an item may be considered substantially circular if any two measurements of a diameter of the item are within a range of ±20%, ±19%; ±18%; ±17%; ±16%; ±15%; ±14%; ±13%; ±12%; ±11%; ±10%; ±9%; ±8%; ±7%; ±6%; ±5%; ±4%; ±3%; ±2%; or ±1% of each other. When used in conjunction with a comparator (e.g., a first coating is substantially thicker than a second coating) substantially is used to mean that the difference is at least ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein.

Each embodiment disclosed herein can comprise, consist essentially of, or consist of a particular stated element, step, ingredient, or component. The term "comprise" or "comprises" means "includes, but is not limited to," and allows for the inclusion of unspecified elements, steps, ingredients, or components, even in major amounts. The phrase "consisting of" excludes any element, step, ingredient, or component that is not specified. The phrase "consisting essentially of" limits the scope of the embodiment to the specified elements, steps, ingredients, or components, and to those that do not materially affect the basic and novel characteristics of the claimed disclosure.

Tubular Articles

As noted above, the present disclosure provides for tubular articles. A tubular article of the present disclosure includes a tubular workpiece, which has an interior surface, an exterior surface, an inner nanolaminate coating on the interior surface, and an outer nanolaminate coating on the exterior surface. In embodiments, a tubular workpiece is substantially 100% covered by two or more nanolaminate coatings.

Therefore, embodiments of the present disclosure include tubular articles, comprising a tubular workpiece having an interior surface, an exterior surface and a length of at least one meter (m); and nanolaminate coatings comprising: a first nanolaminate coating on the interior surface; and a second nanolaminate coating on the exterior surface, the two or more nanolaminate coatings covering substantially 100% of the interior surface and the exterior surface.

In some embodiments, a tubular workpiece is single-walled. In other embodiments, a tubular workpiece has two walls, an inner wall and an outer wall.

In embodiments, an inner nanolaminate coating is thicker than an outer nanolaminate coating, as pictured in FIG. 1A. In the embodiment of FIG. 1A, the exterior surface 101 of a workpiece is coated with a nanolaminate coating that is substantially thinner than a nanolaminate coating on an interior surface 103.

Thus, embodiments of the present disclosure include a tubular article, comprising: a tubular workpiece having an interior surface and an exterior surface; an inner nanolaminate coating on the interior surface; and an outer nanolaminate coating on the exterior surface, the outer nanolaminate coating having a thickness that is less than a thickness of the inner nanolaminate coating.

In other embodiments, the outer nanolaminate coating has a thickness that is greater than a thickness of the inner nanolaminate coating.

Figure 1B:
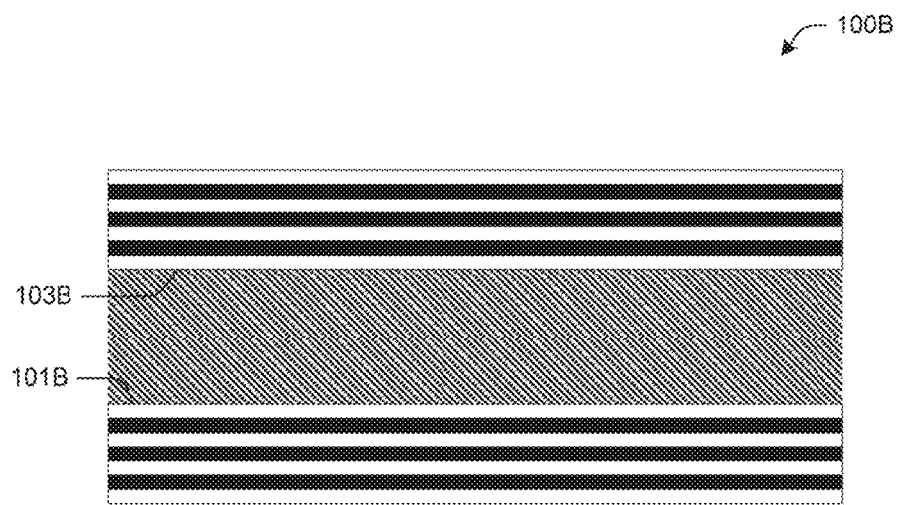

In other embodiments, an inner nanolaminate coating and an outer nanolaminate coating are substantially the same thickness. FIG. 1B is an illustrative example of a cross section of a wall of a tubular article having a multilayered coating 100B. In the embodiment of FIG. 1B, the exterior surface 101B and interior surface 103B of a workpiece is coated with a nanolaminate coating that has substantially a same thickness.

In embodiments, a tubular workpiece includes a threaded portion at one or both ends. A threaded portion may be on the interior of a tubular workpiece or on the exterior of a tubular workpiece. A tubular workpiece may also include a threaded portion at some position between the two ends.

In some embodiments where a tubular workpiece includes a threaded portion, a nanolaminate thread coating covers the threaded portion. In some embodiments, a nanolaminate thread coating is thinner than an interior nanolaminate coating. Therefore, embodiments of the present disclosure include a tubular article, comprising: a tubular workpiece having an interior surface and an exterior surface, the tubular substrate comprising an interior threaded portion; an interior nanolaminate coating on the interior surface; an exterior nanolaminate coating on the exterior surface; and a nanolaminate thread coating on the threaded portion, the nanolaminate thread coating having a thickness that is less than a thickness of the interior nanolaminate coating and a thickness of the exterior nanolaminate coating. In some embodiments where a tubular workpiece has more than one threaded portion, a nanolaminate thread coating is on each of the threaded portions.

In some certain embodiments where a threaded portion is on the interior of a tubular workpiece, a nanolaminate coating applied to a corresponding portion of the exterior of the tubular workpiece is a different thickness than a thickness of an inner nanolaminate coating, a thickness of an outer nanolaminate coating, or a thickness of a nanolaminate thread coating. Similarly, in some embodiments where a threaded portion is on the exterior of a tubular workpiece, a nanolaminate coating applied to a corresponding portion of the interior of the tubular workpiece is a different thickness that a thickness of an inner nanolaminate coating, a thickness of an outer nanolaminate coating, or a thickness of a nanolaminate thread coating.

Nanolaminate coatings of the present disclosure include a plurality of layers that repeat in a pattern. In some embodiments, a plurality of layers is made up of two layers that alternate. In further embodiments, nanolaminate coatings include a plurality of alternating first and second layers. Alternatively, one or more additional layers may be present in a coating between any first and second layer. In other embodiments, a plurality of layers is made up of more than two layers that repeat in any suitable pattern (e.g., A-B-C-A-B-C-A-B-C or A-B-C-B-A-B-C). In addition, the thickness of each of the plurality of layers may repeat in any suitable pattern.

Each layer of a nanolaminate coating may comprise a metal, a metal alloy, or a ceramic. In embodiments, each layer of a nanolaminate coating includes at least one electrodepositable species independently selected from silver (Ag), aluminum (Al), gold (Au), boron (B), beryllium (Be), carbon (C), cobalt (Co), chromium (Cr), copper (Cu), iron (Fe), mercury (Hg), indium (In), iridium (Ir), magnesium (Mg), manganese (Mn), molybdenum (Mo), niobium (Nb), neodymium (Nd), nickel (Ni), phosphorous (P), palladium (Pd), platinum (Pt), rhenium (Re), rhodium (Rh), antimony (Sb), silicon (Si), tin (Sn), lead (Pb), tantalum (Ta), titanium (Ti), tungsten (W), vanadium (V), zinc (Zn), and zirconium (Zr). In some embodiments, each layer of a nanolaminate coating includes at least 0.01% (w/w) of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, or Zr. Each electrodepositable species may be present in a layer of a nanolaminate coating in a concentration of at least about 10% (w/w). In embodiments, each electrodepositable species may be present in a layer of a nanolaminate coating in a concentration of at least about 5% (w/w). In embodiments, each electrodepositable species may be present in a layer of a nanolaminate coating in a concentration of at least about 1% (w/w). In embodiments, each electrodepositable species may be present in a layer of a nanolaminate coating in a concentration of at least about 0.1% (w/w). In embodiments, each electrodepositable species may be present in a layer of a nanolaminate coating in a concentration of at least about 0.05% (w/w). In embodiments, each electrodepositable species may be present in a layer of a nanolaminate coating in a concentration of at least about 0.01% (w/w). In embodiments, each electrodepositable species may be present in a layer of a nanolaminate coating in a concentration of at least about 0.005% (w/w). In embodiments, each electrodepositable species may be present in a layer of a nanolaminate coating in a concentration of at least about 0.001% (w/w).

In certain embodiments, a layer of a nanolaminate coating comprises monocrystalline Co. In some embodiments, a layer of a nanolaminate coating comprises aluminum. In further embodiments, a layer of a nanolaminate coating comprises Ni or Cr. In particular embodiments, a layer of a nanolaminate coating comprises Ni, Fe, and Cr. In some embodiments, a layer of a nanolaminate coating comprises Ni, Fe, Cr, and Mo.

In some embodiments, each layer of a nanolaminate coating comprises two or more, three or more, four or more, or five or more different electrodepositable species. In some embodiments, each layer comprises an alloy of at least two metals. In some embodiments, each layer comprises an alloy of at least three metals.

In embodiments, a first layer and a second layer of a nanolaminate coating comprise a first alloy and a second alloy, respectively, which comprise the same first and second metals. In some embodiments, a difference between a concentration of a first metal in a first alloy and a first metal in a second alloy is less than about 10%, about 20%, about 30%, or about 50%, by weight. In further embodiments, a difference between a concentration of a first metal in a first alloy and a first metal in a second alloy is more than about 1%, about 2%, about 5%, or about 10%, by weight.

Illustrative alloys that may be used in a layer of a nanolaminate coating comprise Zn and Fe; Zn and Ni; Co and Ni; Ni, Co, and Mo; Ni and Fe; Ni and Cr; Cu and Zn; Cu and Sn; Ni, Co, and P; Ni, Co, W, and P; Ni, Co, and W; Ni and W; Ni, W, and P; Ni, Co, and B; Ni, Co, W, and B; or Ni, W, and B. In specific embodiments, an alloy used in a layer of a nanolaminate coating includes Ni and Fe; or Ni and Co. In still further embodiments, a layer of a nanolaminate coating comprises three or more, four or more, or five or more of Co, Cr, Mo, W, Fe, Si, Mn, and Ni.

In embodiments, each layer comprises Ni and W. In embodiments, each layer comprises Ni and Mo. In embodiments, each layer comprises Ni, Mo, and W. In embodiments, each layer comprises Ni and Cr.

In embodiments, each of layer comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB. In some embodiments, each layer comprises NiCr, NiCo, NiW, or NiCoP.

In some embodiments, a layer (e.g., a first layer and/or a second layer) of a nanolaminate coating includes Ni in a concentration greater than about 50% (w/w). In some embodiments, a layer of a nanolaminate coating includes Ni in a concentration greater than about 55% (w/w). In some embodiments, a layer of a nanolaminate coating includes Ni in a concentration greater than about 60% (w/w). In some embodiments, a layer of a nanolaminate coating includes Ni in a concentration greater than about 65% (w/w). In some embodiments, a layer of a nanolaminate coating includes Ni in a concentration greater than about 70% (w/w). In some embodiments, a layer of a nanolaminate coating includes Ni in a concentration greater than about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a layer of a nanolaminate coating includes Ni in a concentration less than about 99% (w/w). In some embodiments, a layer of a nanolaminate coating includes Ni in a concentration less than about 98% (w/w). In some embodiments, a layer of a nanolaminate coating includes Ni in a concentration less than about 97% (w/w). In some embodiments, a layer of a nanolaminate coating includes Ni in a concentration less than about 96% (w/w). In some embodiments, a layer of a nanolaminate coating includes Ni in a concentration less than about 70% (w/w). In some embodiments, a layer of a nanolaminate coating includes Ni in a concentration less than about 50% (w/w), about 55% (w/w), about 60% (w/w), about 65% (w/w), about 75% (w/w), about 80% (w/w), about 85% (w/w), about 90% (w/w), about 92% (w/w), about 93% (w/w), about 94% (w/w), or about 95% (w/w). In particular embodiments, a layer of a nanolaminate coating includes Ni in a concentration ranging from about 50% (w/w) to about 99% (w/w).

In certain embodiments, a layer of a nanolaminate coating includes Co in a concentration ranging from about 5% (w/w) to about 35% (w/w). In further embodiments, the second layer includes Co in a concentration ranging from about 5% (w/w) to about 10% (w/w), from about 10% (w/w) to about 15% (w/w), from about 15% (w/w) to about 20% (w/w), from about 20% (w/w) to about 25% (w/w), from about 25% (w/w) to about 30% (w/w), or from about 30% (w/w) to about 35% (w/w).

In embodiments, a layer of a nanolaminate coating comprises Cr in a concentration ranging from about 5% (w/w) to about 99% (w/w). In some embodiments, a layer of a nanolaminate coating includes Cr in a concentration greater than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a layer of a nanolaminate coating includes Cr in a concentration less than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

In embodiments, a layer of nanolaminate coating comprises Cr in a concentration ranging from about 5% (w/w) to about 35% (w/w), a layer of nanolaminate coating comprises Ni in a concentration of greater than about 90% (w/w), or both. In further embodiments, a layer of nanolaminate coating comprises Ni in a concentration ranging from about 20% (w/w) to about 50% (w/w), Cr in a concentration ranging from about 20% (w/w) to about 35% (w/w), and Mo in a concentration great than about 1.5% (w/w). In some embodiments, a layer of a nanolaminate coating comprises Cr in a concentration greater than about 7% (w/w), Mo in a concentration ranging from about 5% (w/w) to about 30% (w/w), W in a concentration less than about 3% (w/w), Fe in a concentration ranging from about 1.5% (w/w) to about 15% (w/w), Si in a concentration less than 1% (w/w), Mn in a concentration less than 3% (w/w), and a balance of Ni.

In embodiments, a layer of a coating comprises Ni in a concentration ranging from about 40% (w/w) to about 70% (w/w) and W in a concentration ranging from about 20% (w/w) to about 60% (w/w). In some such embodiments, the layer of the coating may also comprise Mo in a concentration of up to about 40% (w/w).

In embodiments, a layer of a coating comprises Ni in a concentration ranging from about 50% (w/w) to about 70% (w/w) and W in a concentration ranging from about 30% (w/w) to about 50% (w/w). In some such embodiments, the layer of the coating may also comprise Mo in a concentration of up to about 30% (w/w).

In embodiments, a layer of a coating comprises Ni in a concentration of at least about 50% (w/w), and W and Mo in a collective concentration of up to about 50% (w/w). In embodiments, a layer of a coating comprises Ni in a concentration of at least about 60% (w/w), and W and Mo in a collective concentration of up to about 40% (w/w). In particular embodiments, a layer of a coating comprises Ni in a concentration of about 60% (w/w), and W and Mo in a collective concentration of about 40% (w/w). In particular embodiments, a layer of a coating comprises Ni in a concentration of about 60% (w/w), and W in a concentration of about 40% (w/w).

Each layer has a thickness in a range selected independently from about 5 nm to about 250 nm. In embodiments, each layer has a thickness in a range selected independently from about 5 nm to about 100 nm, from about 50 nm to about 150 nm, from about 100 nm to about 200 nm, or from about 150 nm to about 250 nm. In further embodiments, each layer has a thickness in a range selected independently from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 200 nm to about 250 nm, from about 220 nm to about 250 nm, or from about 150 nm to about 250 nm.

In embodiments, each layer has a thickness in a range selected independently from about 2 nm to about 750 nm. In embodiments, each layer has a thickness in a range selected independently from about 2 nm to about 500 nm. In embodiments, each layer has a thickness in a range selected independently from about 2 nm to about 250 nm. In embodiments, each layer has a thickness in a range selected independently from about 2 nm to about 200 nm.

An interface between individual layers may be discrete or diffuse. An interface between the neighboring layers is considered to be "discrete" if the composition shifts between a first layer and a second layer over a distance that is less than about 20% of a thickness of the thinner of the two layers.

In embodiments, an interface between neighboring layers is considered to be discrete if the composition shifts between a first layer and a second layer over a distance that is less than about 15% of a thickness of the thinner of the layers. In embodiments, an interface between neighboring layers is considered to be discrete if the composition shifts between a first layer and a second layer over a distance that is less than about 10% of a thickness of the thinner of the layers. In embodiments, an interface between neighboring layers is considered to be discrete if the composition shifts between a first layer and a second layer over a distance that is less than about 8% of a thickness of the thinner of the layers. In embodiments, an interface between neighboring layers is considered to be discrete if the composition shifts between a first layer and a second layer over a distance that is less than about 5% of a thickness of the thinner of the layers. In embodiments, an interface between neighboring layers is considered to be discrete if the composition shifts between a first layer and a second layer over a distance that is less than about 4% of a thickness of the thinner of the layers. In embodiments, an interface between neighboring layers is considered to be discrete if the composition shifts between a first layer and a second layer over a distance that is less than about 2% of a thickness of the thinner of the layers.

In embodiments, an interface is "diffuse" if the composition shifts between a first layer and a second layer over a more than about 20% of the thickness of a thinner of the two layers. In embodiments, an interface between neighboring layers is considered to be diffuse if the composition shifts between a first layer and a second layer over a distance that is more than about 15% of a thickness of the thinner of the layers. In embodiments, an interface between neighboring layers is considered to be diffuse if the composition shifts between a first layer and a second layer over a distance that is more than about 10% of a thickness of the thinner of the layers. In embodiments, an interface between neighboring layers is considered to be diffuse if the composition shifts between a first layer and a second layer over a distance that is more than about 8% of a thickness of the thinner of the layers. In embodiments, an interface between neighboring layers is considered to be diffuse if the composition shifts between a first layer and a second layer over a distance that is more than about 5% of a thickness of the thinner of the layers. In embodiments, an interface between neighboring layers is considered to be diffuse if the composition shifts between a first layer and a second layer over a distance that is more than about 4% of a thickness of the thinner of the layers. In embodiments, an interface between neighboring layers is considered to be diffuse if the composition shifts between a first layer and a second layer over a distance that is more than or about 2% of a thickness of the thinner of the layers.

In embodiments, a diffuse interface has a composition shift between a first layer and a second layer over a thickness in a range of about 0.5 nm to about 5 nm. In some embodiments, a diffuse interface has a thickness in a range of about 0.5 nm to about 3 nm, about 1 nm to about 4 nm, or about 2 nm to about 5 nm. In further embodiments, a diffuse interface has a thickness in a range of about 0.5 nm to about 1 nm, about 1 nm to about 2 nm, about 2 nm to 3 nm, from about 3 nm to about 4 nm, or from about 4 nm to about 5 nm.

An overall thickness of each nanolaminate coating present on different portions of a tubular workpiece (e.g., an inner nanolaminate coating, an outer nanolaminate coating, and a nanolaminate thread coating) may vary widely depending on an application of the coatings. In embodiments, a coating is substantially continuous over the entire tubular workpiece. In embodiments, a coating is continuous over the entire tubular workpiece. In some embodiments, a coating that is present on a particular portion of the tubular workpiece is uniform or substantially uniform in thickness. In embodiments, a nanolaminate coating (e.g., an inner nanolaminate coating, an outer nanolaminate coating, etc.) has substantially the same thickness at two or more locations. In embodiments, a nanolaminate coating of the present disclosure has substantially the same thickness at three or more locations. In embodiments, a nanolaminate coating of the present disclosure has substantially the same thickness at four or more locations. In embodiments, a nanolaminate coating of the present disclosure has substantially the same thickness at five or more locations. In certain embodiments, a coating has two or more thicknesses across a length of a portion of the tubular workpiece.

In embodiments, a coating has a thickness ranging from about 5 nm to about 5 cm. In some embodiments, each coating has a thickness in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 to about 250 nm, from about 1 µm to about 5 centimeters (cm), from about 1 µm to about 50 µm, from about 50 µm to about 100 µm, from about 100 µm to about 200 µm, from about 200 µm to about 500 µm, from about 500 µm to about 800 µm, from about 800 µm to about 1.2 millimeters (mm), from about 500 µm to about 1 mm, from about 1 mm to about 1.5 mm, from about 1.2 mm to about 2 mm, from about 1.8 mm to about 2.5 mm, from about 2 mm to about 3 mm, from about 2.5 mm to about 5 mm, from about 1 mm to about 5 mm, from about 5 mm to about 1 cm, from about 1 cm to about 2 cm, or from about 2 cm to about 5 cm.

In particular embodiments, each coating independently has a thickness ranging from about 5 µm to about 3,500 µm. In further embodiments, a coating has a thickness in a range selected independently from about 25 µm to about 2,250 µm, from about 125 µm to about 2,050 µm, from about 125 µm to about 1,750 µm, from about 200 µm to about 1,500 µm, from about 250 µm to about 1,250 µm, from about 250 µm to about 1,000 µm, from about 250 µm to about 750 µm, from about 500 µm to about 1,000 µm. In yet further embodiments, the coatings have a thickness in a range selected independently from about 25 µm to about 125 µm, from about 50 µm to about 150 µm, about 125 µm to about 250 µm, about 250 µm to about 375 µm, about 375 µm to about 500 µm, about 500 µm to about 750 µm, about 750 µm to about 1,000 µm, about 1,000 µm to about 1,250 µm, about 1,250 µm to about 1,500 µm, about 1,500 µm to about 1,750 µm, about 1,750 µm to about 2,000 µm, about 2,000 µm to about 2,250 µm, about 2,250 µm to about 2,500 µm, about 2,500 µm to about 2,750 µm, and about 2,750 µm to about 3,000 µm.

In embodiments, a thickness of a nanolaminate thread coating does not prevent threading from being joined with a second item having corresponding threading. In further embodiments, a nanolaminate thread coating is not compromised by the joining of a threaded portion of a tubular article with the corresponding threading of a second item. In certain embodiments, a thickness of a nanolaminate thread coating ranges from about 50 µm to about 150 µm.

Nanolaminate coatings as described herein may include a large number of layers. Coatings may include at least two layers, at least three layers, at least four layers, at least six layers, at least eight layers, at least ten layers, at least 20 layers, at least 30 layers, at least 50 layers, at least 100 layers, at least 200 layers, at least 500 layers, at least 1,000 layers, at least 1,500 layers, at least 2,000 layers, at least 2,500 layers, at least 3,000 layers, at least 3,500 layers, at least 4,000 layers, at least 5,000 layers, at least 6,000 layers, at least 7,000 layers, or at least 8,000 layers. In embodiments, a number of layers in a coating is in a range from about 50 layers to about 8,000 layers. In some embodiments, the number of layers in a coating is in the range of about 100 layers to about 8,000 layers. In further embodiments, the number of layers in a coating is in the range of about 50 layers to about 100 layers, from about 100 layers to about 1,000 layers, from about 1,000 layers to about 2,000 layers, from about 2,000 layers to about 4,000 layers, from about 4,000 layers to about 8,000 layers, or greater than about 8,000 layers. Each nanolaminate coating present on different portions of a tubular workpiece may have a different number of layers applied. In other embodiments, each nanolaminate coating present on different portions of a tubular workpiece has the same number of layers applied.

A tubular workpiece employed in embodiments of the present disclosure may be any suitable tubular workpiece. In embodiments, a tubular workpiece is made of a metal or metal alloy. In some embodiments, a tubular workpiece is made of a steel alloy. In certain embodiments, a steel alloy includes: C and Fe; C, Fe, and Mo; or C, Fe, Mo, and Co.

In other embodiments, a tubular workpiece is made of a plastic or polymeric material. In some embodiments, a plastic or polymeric material includes arylamides, acrylamides, polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, polyurethanes, or any combination thereof.

In various embodiments, a plastic or polymeric material includes an additive, such as carbon black (e.g., from about 1% to about 5% (w/w)), graphene (e.g., PLA-Graphene printing filament), graphite, carbon nanotubes, carbon nanofibers, or graphite fibers. Additionally, in some embodiments, a plastic or polymeric material of the present disclosure further includes a metal additive (e.g., Ag, Al, Au, B, Be, Co, Cr, Cu, Fe, Hg, In, Ir, Mg, Mn, Mo, Nb, Nd, Ni, Pd, Pt, Re, Rh, Sb, Sn, Pb, Ta, Ti, W, V, Zn, Zr, or alloys thereof). In further embodiments, a metal additive is included in a concentration ranging from about 1% to about 50% (w/w).

Generally, in order to apply a nanolaminate coating onto a tubular workpiece made of plastic or polymeric material, a strike layer is first coated onto the plastic or polymeric material of the tubular workpiece. A strike layer is a very thin conductive layer that is deposited on a tubular workpiece using a high current density and an electrolyte solution with a low ion concentration. In embodiments, a conductive material used for a strike layer comprises Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or alloys thereof. In some embodiments, a strike layer comprises Ni, Cu, or both.

A tubular workpiece employed in the methods of the disclosure may have a length ranging from about 0.1 meters (m) to 15 m. In further embodiments, a tubular workpiece has a length ranging from about 0.10 m to about 0.15 m; from about 0.10 m to about 0.5 m; from about 0.10 m to about 1.0 m; from about 0.10 m to about 0.4 m; from about 0.10 m to about 1.51 m; from about 0.10 m to about 10.7 m; from about 0.10 m to about 13.8 m; from about 0.15 m to about 0.4 m; from about 0.15 m to about 1.51 m; from about 0.15 m to about 10.7 m; from about 0.15 m to about 13.8 m; from about 0.3 m to about 0.7 m; from about 0.6 m to about 1.51 m; from about 1 m to about 2 m; from about 1 m to about 5 m; from about 1 m to about 14.5 m; from about 1.5 m to about 3.1 m; from about 1.5 m to about 6.1 m; from about 2 m to about 3 m; from about 3 m to about 4 m; from about 3 m to about 4.6 m; from about 4 m to about 5 m; from about 4.5 m to about 6.1 m; from about 5 m to about 6 m; from about 5 m to about 10 m; from about 5 m to about 14.5 m; from about 6 m to about 7 m; from about 6 m to about 7.7 m; from about 6 m to about 11 m; from about 7 m to about 8 m; from about 7.6 m to about 9.2 m; from about 8 m to about 9 m; from about 9 m to about 10 m; from about 9.1 m to about 10.7 m; from about 10 m to about 11 m; from about 10 m to about 14.5 m; from about 10.6 m to about 12.2 m; from about 10.6 m to about 13.8 m; from about 11 m to about 12 m; from about 12 m to about 13 m; from about 12.1 m to about 13.8 m; from about 13 m to about 13.5 m; from about 13.5 m to about 14 m; or from about 14 m to about 14.5 m. In some embodiments, a tubular workpiece has a length ranging from about 0.10 m to about 0.15 m.

Specific properties conferred by nanolaminate coatings of the present disclosure provide for improved corrosion, wear, and heat resistance properties in a tubular article. Accordingly, in embodiments, a tubular workpiece is chosen to be coated in order to be used in highly corrosive service environments. In embodiments, a tubular article is an oil country tubular good (OCTG), a line pipe, or a connector for joining two OCTGs. In particular embodiments, a tubular article is a down-hole tubular. In some embodiments, a down-hole tubular is an expandable tubular. In particular embodiments, a tubular article is a connector.

In some embodiments, a tubular article is resistant to $H_2S$-induced sulfide stress cracking under sour service environments having a $H_2S$ partial pressure greater than 0.05 psi (0.3 kPa). In further embodiments, a nanolaminate coating does not lose more than 25% of its mass when subjected to National Association of Corrosion Engineers (NACE) TM0193-2016 standardized testing with 15% HCl at 75 degrees Celsius for 6 hours. In additional embodiments a tubular article is resistant to cracking of the nanolaminate coating when exposed to autoclave environments per NACE standard TM0175 or American Society for Testing and Materials (ASTM) E399 standardized testing for high sour gas conditions. In still further embodiments, a tubular article is resistance to pitting wherein individual pits are not deeper than 10% of the nanolaminate coating when tested according to ASTM G48 testing standards. In yet further embodiments, a tubular article is resistance to pitting wherein individual pits are not deeper than 10% of the nanolaminate coating in a service environment with a pH ranging from about 3 to about 7. In additional embodiments, a tubular article is resistance to pitting wherein individual pits are not deeper than 10% of the nanolaminate coating in a service environment with a pH ranging from about 7 to about 6.5, about 6.5 to about 6, about 6 to about 5.5, about 5.5 to about 5, about 5 to about 4.5, about 4.5 to about 4, about 4 to about 3.5, or about 3.5 to about 3.

In embodiments, a tubular article is resistant to cracking when subjected to tensile load of 80% of the yield strength of the tubular article in sulfide stress cracking environment for 720 hours according to NACE TM0177 standardized testing in a service environment with a pH ranging from about 3 to about 7. In certain embodiments, a tubular article is resistant to cracking when subjected to tensile load of 80% of the yield strength of the tubular article in sulfide stress cracking environment for 720 hours according to NACE TM0177 standardized testing in a service environment with a pH ranging from about 7 to about 6.5, about 6.5 to about 6, about 6 to about 5.5, about 5.5 to about 5, about 5 to about 4.5, about 4.5 to about 4, about 4 to about 3.5, or about 3.5 to about 3. Tubular articles of the present disclosure include those produced by any method described herein. Additionally, tubular articles of the present disclosure include an oil country tubular good (OCTG) produced by any method described herein.

Fixed Contact Point Assembly Apparatuses for Electrodepositing Nanolaminate Coatings Tubular articles of the present disclosure may be produced using specialized apparatuses. In order to describe particular embodiments of the apparatuses and systems of the disclosure, reference is made to the appended figures. This discussion should not be construed as limiting, as the particular details of the embodiments described herein are by way of example and are for purposes of illustrative discussion of embodiments of the present disclosure.

Apparatuses of the present disclosure include racks, which are designed to support one or more tubular workpiece(s) during the electrodeposition process, an example of which is shown in FIG. 2. A rack of the present disclosure includes two or more support structures 204A and 204B.

In embodiments, support structures 204A and 204B are not physically connected together and therefore are configurable to support a tubular workpiece 202 of various lengths. In some embodiments, support structures 204A and 204B support a tubular workpiece 202 with a length ranging from about 0.1 meters (m) to 15 m. In further embodiments, support structures 204A and 204B support a tubular workpiece 202 that has a length ranging from about 0.10 m to about 0.15 m; from about 0.10 m to about 0.5 m; from about 0.10 m to about 1.0 m; from about 0.10 m to about 0.4 m; from about 0.10 m to about 1.51 m; from about 0.10 m to about 10.7 m; from about 0.10 m to about 13.8 m; from about 0.15 m to about 0.4 m; from about 0.15 m to about 1.51 m; from about 0.15 m to about 10.7 m; from about 0.15 m to about 13.8 m; from about 0.3 m to about 0.7 m; from about 0.6 m to about 1.51 m; from about 1 m to about 2 m;

from about 1 m to about 5 m; from about 1 m to about 14.5 m; from about 1.5 m to about 3.1 m; from about 1.5 m to about 6.1 m; from about 2 m to about 3 m; from about 3 m to about 4 m; from about 3 m to about 4.6 m; from about 4 m to about 5 m; from about 4.5 m to about 6.1 m; from about 5 m to about 6 m; from about 5 m to about 10 m; from about 5 m to about 14.5 m; from about 6 m to about 7 m; from about 6 m to about 7.7 m; from about 6 m to about 11 m; from about 7 m to about 8 m; from about 7.6 m to about 9.2 m; from about 8 m to about 9 m; from about 9 m to about 10 m; from about 9.1 m to about 10.7 m; from about 10 m to about 11 m; from about 10 m to about 14.5 m; from about 10.6 m to about 12.2 m; from about 10.6 m to about 13.8 m; from about 11 m to about 12 m; from about 12 m to about 13 m; from about 12.1 m to about 13.8 m; from about 13 m to about 13.5 m; from about 13.5 m to about 14 m; or from about 14 m to about 14.5 m.

In embodiments where the rack is designed to support a plurality of tubular workpieces, each of the tubular workpieces may have substantially the same length, substantially the same outer diameter, substantially the same inner diameter, or a combination thereof.

In other embodiments, support structures 204A and 204B of a rack are set a fixed distance apart. In some embodiments, support structures 204A and 204B of a rack accommodate a tubular workpiece 202 with a length ranging from about 0.1 m to 15 m. In embodiments, support structures 204A and 204B support a tubular workpiece 202 with a length of about 0.15 m, about 0.3 m, about 0.4 m, about 0.6 m, about 0.7 m, about 1 m, about 1.5 m, about 2 m, about 3 m, about 4 m, about 5 m, about 6 m, about 7 m, about 8 m, about 9 m, about 10 m, about 11 m, about 12 m, about 13 m, about 14 m, or about 15 m.

In some embodiments, additional support structures are added to the rack in order to provide additional support for a tubular workpiece. In further embodiments, additional support structures are generally added at or near a mid-point of the tubular workpiece.

A rack of the present disclosure may hold a tubular workpiece 202 such that a longitudinal axis of the tubular workpiece 202 is substantially horizontal. In other embodiments, a rack holds a tubular workpiece 202 such that a longitudinal axis is at an include ranging from about 0.5 degrees to about 2.5 degrees relative to horizontal. In some embodiments, a rack holds a tubular workpiece 202 such that a longitudinal axis is at an incline ranging from about 0.5 degrees to about 1 degree; from about 1 degree to about 1.5 degrees; from about 1.5 degrees to about 2 degrees; or from about 2 degrees to about 2.5 degrees.

In some embodiments where a rack supports more than one tubular workpiece, the tubular workpieces are arranged substantially parallel to each other.

In some embodiments, a rack supports a plurality of tubular workpieces, at least a portion of which are arranged in a planar configuration. In other words, two or more tubular workpieces are arranged next to each other in a line, such that first ends the tubular workpieces are aligned, the second ends of the tubular workpieces are aligned, and the midpoints of the tubular workpieces are aligned. In some embodiments, a plurality of tubular workpieces are arranged in a polygonal configuration. In other words, lines connecting the longitudinal axis of each of the plurality of tubular articles, when viewed in a direction parallel to the longitudinal axes, would form a polygon. In some embodiments, the polygon formed has three sides. In some embodiments, the polygon formed has four sides. In some embodiments, the polygon formed has five sides. In some embodiments, the polygon formed has six sides. In embodiments, the plurality of tubular workpieces are spaced such that the individual tubular workpieces do not make physical contact. In embodiments, the plurality of tubular workpieces are spaced such that the distance between the individual tubular workpieces is at least about the same as the outer diameter of the tubular workpiece.

In some embodiments, at least a portion of a plurality of tubular workpieces are arranged in series. In such embodiments, a first end of a first tubular workpiece is coupled to a first end of a second tubular workpiece, a second end of the second tubular workpiece is coupled to a first end of a third tubular workpiece, and the like. In some such embodiments, at least three tubular workpieces may be serially coupled. In some embodiments, at least four tubular workpieces are serially coupled. In some embodiments, at least five tubular workpieces are serially coupled. In some embodiments, at least 10 tubular workpieces are serially coupled. In some embodiments, at least 15 tubular workpieces are serially coupled. In various embodiments, ends of respective tubular workpieces are coupled by one or more couplers. Couplers generally are cylindrical (e.g., tubular) structures that, in embodiments, include a first threaded portion and a second threaded portion that correspond to threaded portions of tubular workpieces, such that a threaded portion of coupler may be joined to a threaded portion of the tubular workpiece. In other embodiments, a coupler is joined to a tubular workpiece in a manner other than corresponding threading. For example, a coupler may be welded, bonded, or fastened to the tubular workpiece. In various embodiments, couplers may be made of conductive or non-conductive material, with or without a conductive or non-conductive coating. In some embodiments, tubular workpieces coupled in a series have a length ranging from about 0.1 m to about 1 m. In particular embodiments, tubular workpieces coupled in a series have a length ranging from about 0.1 m to about 0.5 m.

Support structures 204A and 204B may be fabricated from a non-conductive material such as, polyvinylchloride (PVC), polyethylene (e.g. high density polyethylene (HDPE), acrylonitrile butadiene styrene (ABS), polypropylene (PP), or any combination thereof, or a support structure made of a conductive or non-conductive material may be coated with a non-conductive coating such as, PVC, polyethylene, polycarbonate, polyurethane, synthetic rubber, acrylic, or any combination thereof.

Additionally, support structures 204A and 204B may have attachments that allow a support structure to be coupled to (e.g., suspended from) an overhead gantry or gantry system that allows a tubular workpiece to be transported between a plurality of processing tanks. Alternatively, support structures 204A and 204B may have attachments that allow the support structure to be coupled to (e.g., supported by) a vehicle such as, a trolley or a tractor, in order to facilitate transport. In some embodiments, a gantry system or a vehicle is automated. In some embodiments, a gantry crane or vehicle is coupled to a rack during an electrodeposition process. In other embodiments, a gantry crane or a vehicle releases a rack during an electrodeposition process. In further embodiments, a same gantry crane or vehicle re-couples with a rack after completion. In other embodiments, a different gantry crane or vehicle may couple with a rack after completion.

In some embodiments, support structures may comprise a rod that is positioned substantially along the longitudinal axis or an axis substantially parallel to the longitudinal axis within the hollow cavity of the tubular workpiece. In such embodiments, the inner surface of the tubular workpiece is generally coated at a separate time from (i.e., before or after) the outer surface. In some such embodiments, the rod has substantially the same diameter as the inner diameter of the tubular workpiece.

The racks further include a contact point assembly that rotates a tubular workpiece substantially around the longitudinal axis of the tubular workpiece, enables electrical contact with a tubular workpiece, or both. In various embodiments where a rack supports a plurality of tubular workpieces, the contact point assembly rotates the plurality of tubular workpieces, enables electrical contact with the plurality of tubular workpieces, or both. In such embodiments, each tubular workpiece is rotated substantially around the respective longitudinal axis of the tubular workpiece.

In some embodiments where a tubular workpiece has one or more threaded portions, an apparatus of the present disclosure includes a fixed contact point assembly. In embodiments, a fixed contact point assembly comprises a gear 206.

A gear 206 may include a threaded portion. A threaded portion may be internally threaded or externally threaded. In some embodiments, a threaded portion of the gear 206 corresponds to a threaded portion of a tubular workpiece 202, such that a threaded portion of a gear 206 and a threaded portion of a tubular workpiece 202 may be joined together.

In other embodiments, a gear 206 is joined to a tubular workpiece 202 in a manner other than corresponding threading. For example, a gear 206 may be welded, bonded, or fastened to a tubular workpiece 202.

In some embodiments, a second gear is coupled to the opposite end of a tubular workpiece 202. A first and second gear may be coupled to a tubular workpiece 202 using a same manner (e.g., corresponding threading, welding, bonding, fastening, etc.) or a different manner.

A gear 206 of the present disclosure may be engaged by a motor to rotate a tubular workpiece 202. A tubular workpiece 202 may be rotated (e.g. by a motor) at a rotational speed ranging from about 0.5 revolutions per minute (rpm) to about 10 rpm. In embodiments, a tubular workpiece 202 is rotated (e.g., by a motor) at a rotational speed ranging from about 0.5 rpm to about 3 rpm, about 1 rpm to about 4 rpm, about 2 rpm to about 5 rpm, about 3 rpm to about 6 rpm, about 4 rpm to about 7 rpm, about 5 rpm to about 8 rpm, about 6 rpm to about 9 rpm, or about 7 rpm to about 10 rpm. In some embodiments, a tubular workpiece 202 is rotated at a rotational speed ranging from about 0.5 rpm to about 1 rpm, about 1 rpm to about 2 rpm, about 2 to about 3 rpm, about 3 rpm to about 4 rpm, about 4 to about 5 rpm, about 5 rpm to about 6 rpm, about 6 rpm to about 7 rpm, 7 to about 8 rpm, about 8 rpm to about 9 rpm, or about 9 to about 10 rpm.

In various embodiments where a rack supports a plurality of tubular workpieces, a fixed contact point assembly comprises a plurality of gears that are coupled to the plurality of tubular workpieces, respectively. In such embodiments, the plurality of gears may be engaged by a single motor to rotate the tubular workpieces. In other embodiments, the plurality of gears may be engaged by two or more motors to rotate the tubular workpieces. In some embodiments, the plurality of tubular workpieces are rotated at a same speed. In other embodiments, individual tubular workpieces of the plurality of tubular workpieces are rotated at two or more speeds.

A motor may be housed in a suitable housing. In some embodiments, a housing is fabricated from a polymeric material (e.g., composite, thermoplastic, or thermoset) that is sealed (i.e., water tight).

A motor controller may be used to control a motor. In some embodiments, a motor controller is used to start or stop the motor, or to vary a speed as desired. In some embodiments, a motor or motor controller is a part of an apparatus of the disclosure. In other embodiments, a motor or motor controller is separate from an apparatus of the disclosure.

An apparatus described herein may further include a gear box. Such a gear box may be in a same housing as a motor, or in a second housing. A motor of the present disclosure may connect to a first end of a gear box. In embodiments, a gear box is a right-angle (or 90 degree) gear drive that translates linear motion from a linear motor into rotary motion. A second end of a gear box may be connected to a gear 206.

The apparatuses of the present disclosure may further include a coupler 208A. A coupler 208A generally is a cylindrical (e.g., tubular) structure that includes a first threaded portion and a second threaded portion. In embodiments, the first threaded portion corresponds to a threaded portion of the gear 206, such that a threaded portion of the gear 206 and a first threaded portion of the coupler 208A may be joined together, and a second threaded portion that corresponds to a threaded portion of a tubular workpiece 202, such that a threaded portion of the tubular workpiece 202 and a second threaded portion of the coupler 208A may be joined together.

In other embodiments, a coupler 208A is joined to a tubular workpiece 202 or a gear 206 in a manner other than corresponding threading. For example, a coupler may be welded, bonded, or fastened to the tubular workpiece or gear.

A coupler 208A may be made of conductive or non-conductive material, with or without a conductive or non-conductive coating.

In embodiments, a coupler 208A experiences wear during an electrodeposition process, and therefore is sacrificial.

In some embodiments, apparatuses of the present disclosure may include two or more couplers 208A, 208B.

Additionally, an apparatus of the present disclosure may further include one or more bearings that rotate with a tubular workpiece 202. Such bearings may support the tubular workpiece 202 at any suitable position, such as at a coupler 208A.

Apparatuses of the present disclosure may further include an interior anode 210. Anodes of the present disclosure are substantially cylindrical, and generally made of a metal. An anode is an "interior" anode if it is positioned at least partially within a hollow cavity of a tubular structure 202. An interior anode 210 generally is positioned substantially parallel to a longitudinal axis of a tubular structure 202 such that an exterior surface of an interior anode 210 is positioned a predetermined distance from an inner surface of a tubular workpiece 202.

A distance between an exterior surface of an interior anode 210 and an inner surface of a tubular workpiece 202 is generally substantially uniform. An apparatus of the present disclosure may include one or more guides 212A and 212B coupled to a rack that maintain an interior anode 210 in position when in use. A guide may be fabricated from any suitable non-conductive material, such as a non-conductive thermoplastic material (e.g., chlorinated polyvinyl chloride (CPVC)).

Figure 3A:
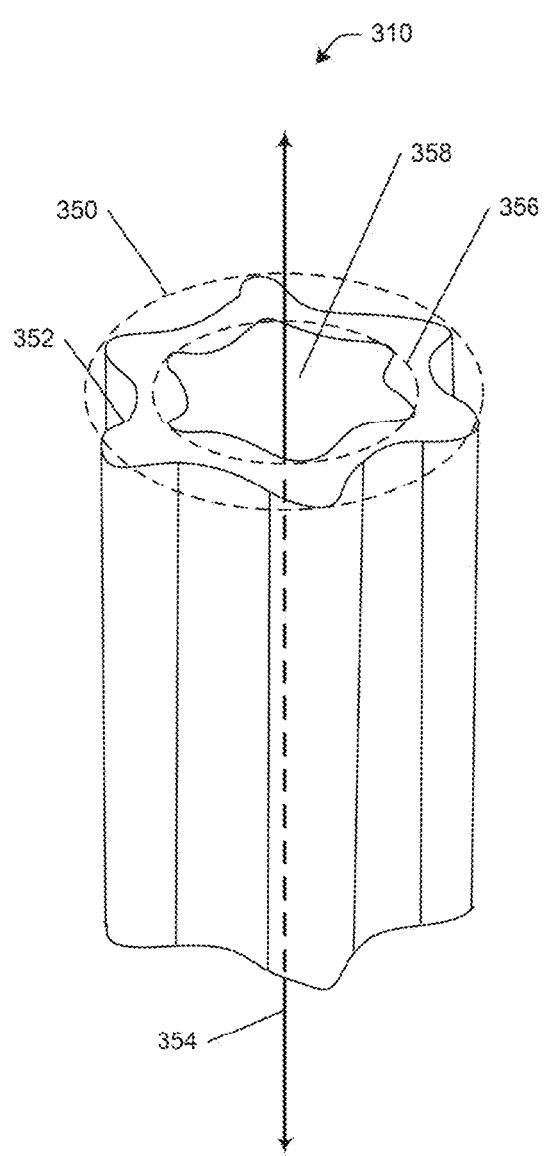
FIGS. 3A-3C show illustrative embodiments of anodes of the present disclosure.
Figure 3B:
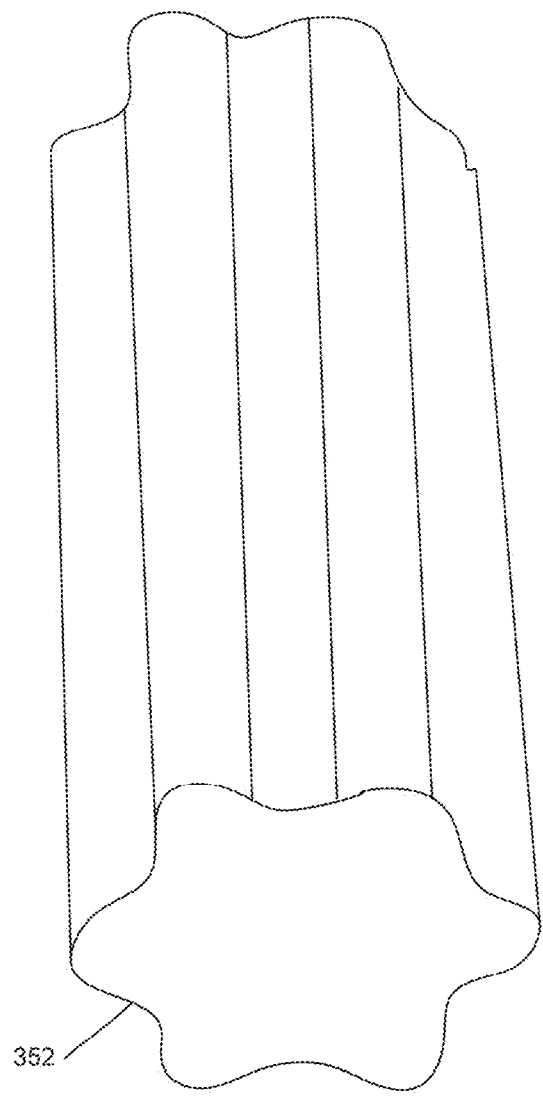

In some embodiments, an interior anode is columnar or tubular. In embodiments, an interior anode 210 has a diameter that is smaller than an inner diameter of the tubular workpiece 102. Referring to FIG. 3A, an exterior surface of the interior anode 310 may be, for example, substantially cylindrical 350 or may have a surface area feature that increases a surface area of the anode. In some embodiments, a surface area feature is corrugation 352. As used herein, "corrugation" or "corrugated" refers to a surface that has regularly alternating ridges and grooves (i.e., a series of continuous alternating convex and concave portions). In some embodiments where an interior anode 310 is tubular, an interior anode also has a hollow cavity centered on a longitudinal axis 354 that is circular 356 or that has a corrugated shape 358, as shown in FIG. 3B. In further embodiments, a surface area feature is a polygonal or sawtooth tube configuration, such that an exterior surface comprises a number of interconnected sides. In embodiments, an interior anode has three, four, five, six, or more interconnected sides. In further embodiments, a number of interconnected sides varies over a length of an interior anode.

Accordingly, embodiments of the present disclosure include an anode comprising a substantially cylindrical metal member, the metal member having an exterior surface with a surface area feature that increases a surface area of the anode, the metal member, in use, being in electrical contact with a tubular workpiece.

A surface area of an interior anode may be based on an inner surface area of a tubular workpiece and a ratio of a length between the exterior surface and an inner surface of a tubular workpiece to a length between an outer surface of the tubular workpiece and an exterior anode.

Accordingly, embodiments of the present disclosure include methods of configuring an anode for use in an electrodeposition process to deposit a nanolaminate coating on a tubular workpiece, comprising: determining a surface area of the anode based on: a ratio of a first surface area corresponding to an inner surface of the tubular workpiece to a second surface area corresponding to an outer surface of the tubular workpiece; and a ratio of an inner diameter of the tubular workpiece to an distance between outer surface of the tubular workpiece to the outer anode surface, wherein the surface area of the anode provides a coating on the tubular workpiece such that a ratio of a first thickness of the nanolaminate coating on the inner surface to a second thickness of the nanolaminate coating on the outer surface is about one.

Figure 3C:
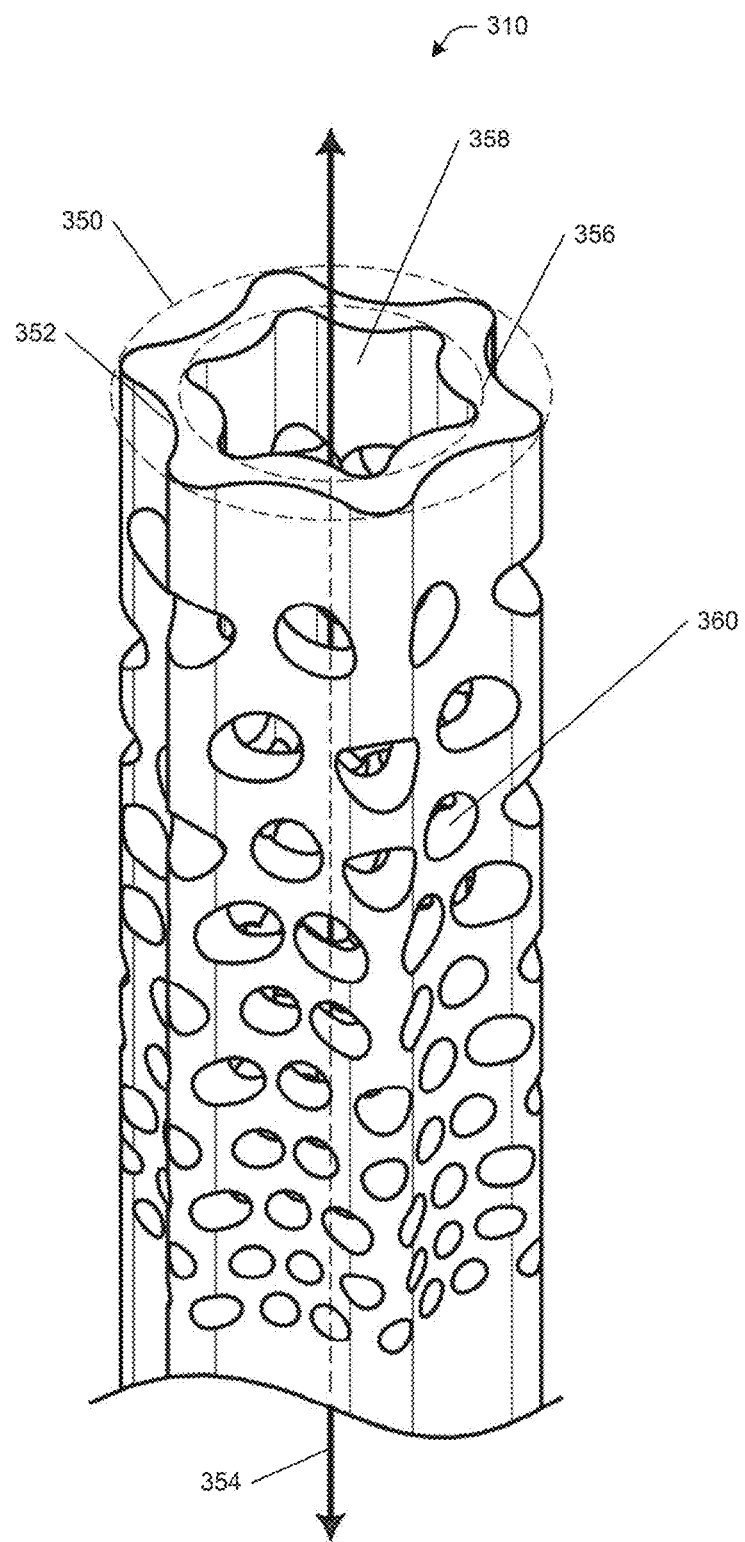

In embodiments, an interior anode 310 has a plurality of holes 360 that extend laterally through at least one wall of the interior anode, as shown in FIG. 3C. In some embodiments, ones of a plurality of holes 360 extend through an interior anode 310. In some embodiments where an interior anode 310 has a hollow cavity, holes extend through a wall of an interior anode, but do not align with a corresponding hole in an opposite wall. A concentration of a subset of a plurality of holes 360 may differ over a length of an interior anode 310, as shown in FIG. 3C. In other words, a number of holes found in a predetermined area of an interior anode 310 may vary along a length of an interior anode. Similarly, a diameter of a subset of a plurality of holes 360 may differ over a length of an interior anode 310, as also shown in FIG. 3C. Thus, a size of holes found in a predetermined area of an interior anode 310 may vary along a length of an interior anode.

A plurality of holes in a tubular workpiece may be in any suitable shape, such as, for example, circles, squares, rectangles, ovals, triangles, diamonds, hexagons, and the like. In some embodiments, a plurality of holes is one shape. In further embodiments, a plurality of holes in a tubular workpiece includes holes of more than one shape.

An interior anode may be made of any suitable materials, such as a metal or an alloy, such as Zn, Ni, Sn, a precious metal (e.g., gold, silver, platinum, palladium, etc.), or any alloy thereof. In certain embodiments, an interior anode is made of a Zn—Sn alloy or a Ni—Co alloy. In embodiments, an interior anode is sacrificial, and therefore is replaced during or after the electrodeposition process.

In embodiments, an interior anode is surrounded, or partially surrounded by shielding. "Shielding" or "shields" refers to shaped pieces of plastic (e.g., acrylics) or polymeric materials that are positioned in order to lower a current density that reaches certain areas of a tubular workpiece. By varying a thickness or creating cutouts, such as holes, shielding can be customized in order to distribute a current density as desired. Shielding may be shaped in any suitable form, such as, substantially circular, semi-circular, rectangular, cylindrical, semi-cylindrical, cuboidal, spherical, conical, pyramidal, and the like. Shielding may be made of any suitable material, such as an acrylic. In some embodiments, shielding is made by 3D printing methods using materials suitable for such methods. In certain embodiments, shielding is made from poly(methyl methacrylate) (PMMA). Shielding may be static (i.e., in a fixed position) or dynamic (i.e., in motion) when an apparatus of the present disclosure is in use.

In embodiments, an interior anode has a substantially constant material thickness ranging from about 0.25 mm to about 0.60 mm, from about 0.50 mm to about 0.80 mm, from about 0.75 mm to about 1.1 mm, from about 1.0 mm to about 1.3 mm, from about 1.2 mm to about 1.6 mm, from about 1.5 mm to about 1.8 mm, from about 1.7 mm to about 2.1 mm, from about 2.0 mm to about 2.3 mm, from about 2.2 mm to about 2.6 mm, from about 2.5 mm to about 3.9 mm, from about 3.8 mm to about 5.1 mm, or from about 5.0 mm to about 6.4 mm. In some embodiments, an interior anode is substantially solid. In further embodiments, an interior anode is made of a material that is substantially non-porous. In some embodiments, an interior anode has a plurality of holes or a hollow cavity, such that, in use, an interior anode to distributes or causes mixing of an electrolyte solution adjacent the interior anode In embodiments, an interior anode is porous. In such embodiments, the interior anode has a "percentage open area" which is a measure of the "empty" space in the anode. In other words, a percentage open area is the fraction of the volume of the pores (i.e., void spaces) over the total volume of the anode. In some embodiments, an interior anode has a percentage open area ranging from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, or from about 95% to about 99%. In some embodiments, an interior anode is positioned within a fabric material. Suitable fabric materials include polypropylene, napped poly, cotton, synel, canton flannel, mono-filament polypropylene, nylon, polypropylene microfilet, cotton duck, felt, and polyester.

In certain embodiments, an apparatus of the present disclosure comprises a rack including: at least one support structure configured to support a tubular workpiece having a substantially cylindrical shape, a hollow cavity defined by an inner surface of the tubular workpiece, and a longitudinal axis; and a contact point assembly configured to rotate the tubular workpiece or enable electrical contact with the tubular workpiece. In particular embodiments, an apparatus of the present disclosure further comprises an interior anode supported by the rack, the interior anode having an exterior surface, the interior anode configured to be positioned substantially along the longitudinal axis or an axis substantially parallel to the longitudinal axis within the hollow cavity of the tubular workpiece such that the exterior surface of the interior anode is positioned a predetermined distance from the inner surface of the tubular workpiece.

Returning to FIG. 2, one or more electrical contact bars 214A and 214B are generally positioned at one or both ends of the interior anode 210. Electrical contact bar(s) 214A and 214B may serve as electrical contact points for an interior anode 210 during an electrodeposition process.

An apparatus of the present disclosure may further include a conductive bus. While in use, a conductive bus remains in electrical contact with a tubular workpiece without interfering with rotation of a tubular workpiece. In some embodiments, a conductive bus is in electrical contact with a tubular workpiece via a gear. In related embodiments, a conductive bus is in electrical contact with a tubular workpiece via a gear and a coupler.

In other embodiments, a conductive bus is configured to maintain electrical contact with an outer surface of a tubular workpiece. In some embodiments, a conductive bus is configured to be in electrical contact with an exterior surface of a tubular workpiece in at least two places. In some embodiments, a conductive bus is configured to be in electrical contact with an exterior surface of a tubular workpiece in at least three places.

Any appropriate conductive material may be used for a conductive bus. For example, a conductive bus may be made of copper, etc.

A conductive bus may be a bus bar. In further embodiments, while in use, a bus bar is positioned substantially parallel to a longitudinal axis of a tubular workpiece. In some embodiments, a bus bar is attached at one or both ends to one or more support structures. In certain embodiments, a bus bar is a copper bar that is attached to support structure 204A and support structure 204B.

A contact point assembly may further include one or more conductive articles, which, if present, are generally in physical contact with a gear, a coupler, or a tubular workpiece during rotation. In some embodiments, a conductive bus, while in use, is in electrical contact with a tubular workpiece via a conductive article. In some embodiments, a conductive article is in physical contact with the gear or the coupler.

In some embodiments, two or more conductive articles are positioned such that a gear, coupler, or tubular workpiece is sandwiched between the conductive articles. Similarly, two or more conductive articles may be positioned such that a conductive bus is sandwiched between the conductive articles. A conductive article for use in an apparatus of the present disclosure may be made of conductive material (e.g., copper) or have a conductive coating.

In embodiments, a conductive article includes two or more threaded portions. In further embodiments, a conductive article for use in an apparatus of the present disclosure is a coupler made of conductive material (e.g., copper) or have a conductive coating.

In other embodiments, a conductive article for use in an apparatus of the present disclosure is a flexible sheet, a brush, a rod, or a wire.

In further embodiments, a conductive article for use in an apparatus of the present disclosure includes one or more linkages. A "linkage" is made of two or more conductive portions that are joined by a flexible, conductive connection point. A conductive portion or conductive connection point may be formed of, or coated in, a conductive material. A conductive portion may be flexible or inflexible. A flexible, conductive connection point may be any appropriate connection, such as an articulation, a hinge, a swivel, a bracket, or a flexible portion. In embodiments, a linkage is a single, continuous structure. In other embodiments, a linkage is made up of discrete portions. In some embodiments, a conductive article includes two or more linkages. In such embodiments, a conductive article may be capable of pivoting in two or more directions.

As a conductive article may be in physical contact with a gear, a coupler, or a tubular workpiece, a conductive article may cause resistance to rotation of a tubular workpiece. However, any resistance caused does not prevent a tubular workpiece from rotating.

As an example, a bus bar may maintain electrical contact with a gear, a coupler, or a tubular workpiece via one or more conductive bars. In further embodiments, one or more conductive bars are positioned substantially perpendicular to a bus bar. At one end, a conductive bar contacts a bus bar, and, at an opposite end, a conductive bar contacts a gear, a coupler, or a tubular workpiece.

An apparatus of the present disclosure may further include shielding or thieving positioned adjacent to a tubular workpiece. "Thieving" or "thieves" refers to a conductive material (e.g., conductive wires) that are used as auxiliary cathodes in order to draw current away from high current density areas. By varying a distance from a tubular workpiece and a position of conductive wires in relation to a tubular workpiece and anode(s), a current density that reaches a tubular workpiece can be customized as desired.

In some embodiments where a tubular workpiece includes one or more threaded portions, at least a portion of a shielding or thieving is positioned adjacent to a threaded portion(s) of a tubular workpiece. In further embodiments, at least a portion of a shielding or thieving is positioned between a tubular workpiece and an interior or an exterior anode.

Dynamic Contact Point Assembly Apparatuses for Electrodepositing Nanolaminate Coatings Apparatuses of the present disclosure may include a dynamic contact point assembly that rotates a tubular workpiece or enables electrical contact with a tubular workpiece without leaving a marked off portion of a tubular workpiece. This allows for a continuous coating to be deposited on substantially all of an inner and outer surface of a tubular workpiece.

Figure 4:
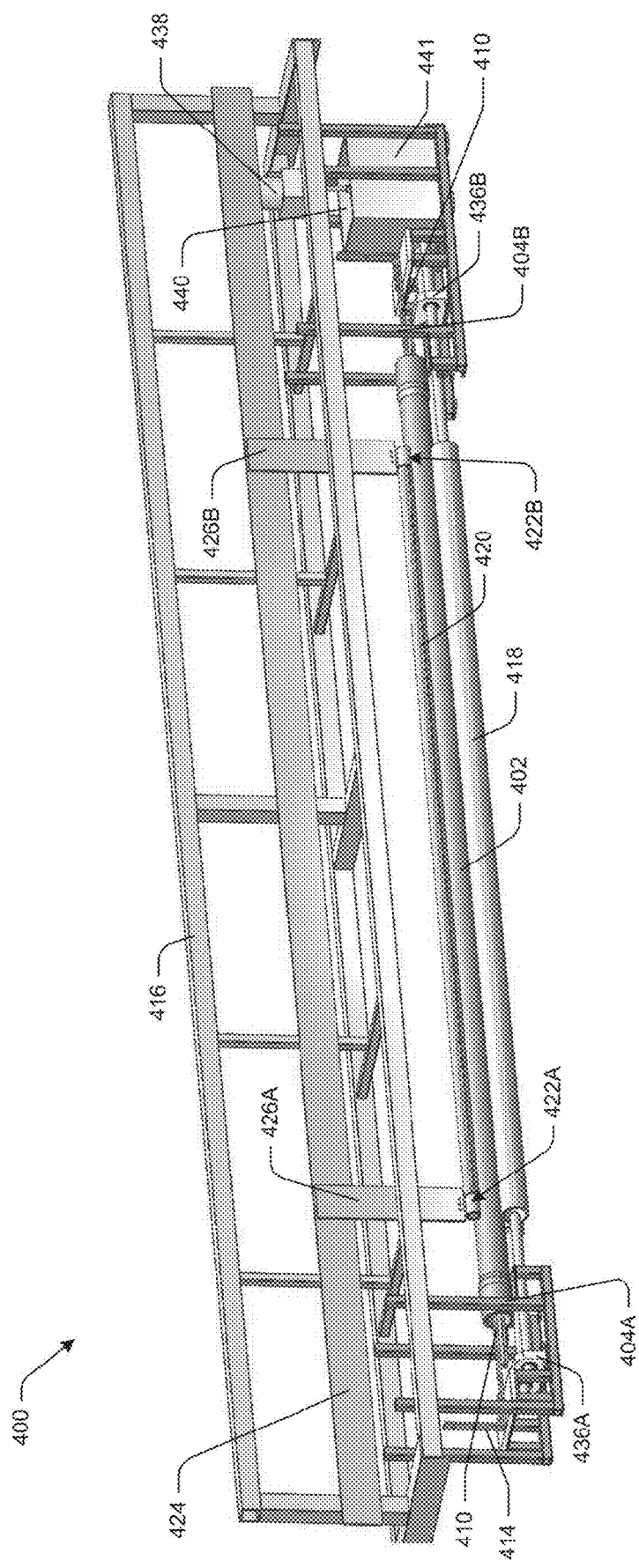
FIG. 4 shows an illustrative embodiment of an electrodeposition system for depositing a nanolaminate coating on a tubular workpiece.

FIG. 4 provides an illustrative example of a dynamic contact point assembly of the present disclosure. Similar to the embodiment of FIG. 2, a rack 416, including support structures 404A and 404B, supports a tubular workpiece 402 and may allow a tubular workpiece 402 to be transported during an electrodeposition process.

In embodiments, support structures 404A and 404B are not physically connected together and therefore is able to support tubular workpiece 402 of various lengths. In further embodiments, support structures 404A and 404B support a tubular workpiece 402 with a length ranging from about 0.1 meters (m) to 15 m. In further embodiments, support structures 104 support a tubular workpiece 102 that has a length ranging from about 0.10 m to about 0.15 m; from about 0.10 m to about 0.5 m; from about 0.10 m to about 1.0 m; from about 0.10 m to about 0.4 m; from about 0.10 m to about 1.51 m; from about 0.10 m to about 10.7 m; from about 0.10 m to about 13.8 m; from about 0.15 m to about 0.4 m; from about 0.15 m to about 1.51 m; from about 0.15 m to about 10.7 m; from about 0.15 m to about 13.8 m; from about 0.3 m to about 0.7 m; from about 0.6 m to about 1.51 m; from about 1 m to about 2 m; from about 1 m to about 5 m; from about 1 m to about 14.5 m; from about 1.5 m to about 3.1 m; from about 1.5 m to about 6.1 m; from about 2 m to about 3 m; from about 3 m to about 4 m; from about 3 m to about 4.6 m; from about 4 m to about 5 m; from about 4.5 m to about 6.1 m; from about 5 m to about 6 m; from about 5 m to about 10 m; from about 5 m to about 14.5 m; from about 6 m to about 7 m; from about 6 m to about 7.7 m; from about 6 m to about 11 m; from about 7 m to about 8 m; from about 7.6 m to about 9.2 m; from about 8 m to about 9 m; from about 9 m to about 10 m; from about 9.1 m to about 10.7 m; from about 10 m to about 11 m; from about 10 m to about 14.5 m; from about 10.6 m to about 12.2 m; from about 10.6 m to about 13.8 m; from about 11 m to about 12 m; from about 12 m to about 13 m; from about 12.1 m to about 13.8 m; from about 13 m to about 13.5 m; from about 13.5 m to about 14 m; or from about 14 m to about 14.5 m.

In embodiments where the rack is designed to support a plurality of tubular workpieces, each of the tubular workpieces may have substantially the same length, substantially the same outer diameter, substantially the same inner diameter, or a combination thereof.

In other embodiments, support structures 404A and 404B of a rack are set a fixed distance apart. In some embodiments, support structures 404A and 404B of a rack accommodate a tubular workpiece 402 with a length ranging from about 0.1 m to 15 m. In embodiments, support structures 404A and 404B support a tubular workpiece 402 with a length of about 0.15 m, about 0.3 m, about 0.4 m, about 0.6 m, about 0.7 m, about 1 m, about 1.5 m, about 2 m, about 3 m, about 4 m, about 5 m, about 6 m, about 7 m, about 8 m, about 9 m, about 10 m, about 11 m, about 12 m, about 13 m, about 14 m, or about 15 m.

In some embodiments, additional support structures are added to the rack in order to provide additional support for a tubular workpiece. In further embodiments, additional support structures are generally added at or near a mid-point of a tubular workpiece.

A rack of the present disclosure may hold a tubular workpiece 402 such that a longitudinal axis of a tubular workpiece 402 is substantially horizontal. In other embodiments, a rack holds a tubular workpiece 402 such that a longitudinal axis is at an include ranging from about 0.5 degrees to about 2.5 degrees relative to horizontal. In some embodiments, a longitudinal axis of a tubular workpiece 102 is at an incline ranging from about 0.5 degrees to about 1 degree; from about 1 degree to about 1.5 degrees; from about 1.5 degrees to about 2 degrees; or from about 2 degrees to about 2.5 degrees.

In some embodiments where a rack supports more than one tubular workpiece, the tubular workpieces are arranged substantially parallel to each other.

In some embodiments, a rack supports a plurality of tubular workpieces, at least a portion of which are arranged in a planar configuration. In other words, two or more tubular workpieces are arranged next to each other in a line, such that first ends the tubular workpieces are aligned, the second ends of the tubular workpieces are aligned, and the midpoints of the tubular workpieces are aligned. In some embodiments, a plurality of tubular workpieces are arranged in a polygonal configuration. In other words, lines connecting the longitudinal axis of each of the plurality of tubular articles, when viewed in a direction parallel to the longitudinal axes, would form a polygon. In some embodiments, the polygon formed has three sides. In some embodiments, the polygon formed has four sides. In some embodiments, the polygon formed has five sides. In some embodiments, the polygon formed has six sides. In embodiments, the plurality of tubular workpieces are spaced such that the individual tubular workpieces do not make physical contact. In embodiments, the plurality of tubular workpieces are spaced such that the distance between the individual tubular workpieces is at least about the same as the outer diameter of the tubular workpiece.

In some embodiments, at least a portion of a plurality of tubular workpieces are arranged in series. In such embodiments, a first end of a first tubular workpiece is coupled to a first end of a second tubular workpiece, a second end of the second tubular workpiece is coupled to a first end of a third tubular workpiece, and the like. In some such embodiments, at least three tubular workpieces may be serially coupled. In some embodiments, at least four tubular workpieces are serially coupled. In some embodiments, at least five tubular workpieces are serially coupled. In some embodiments, at least 10 tubular workpieces are serially coupled. In some embodiments, at least 15 tubular workpieces are serially coupled. In various embodiments, ends of respective tubular workpieces are coupled by one or more couplers. Couplers generally are cylindrical (e.g., tubular) structures that, in embodiments, include a first threaded portion and a second threaded portion that correspond to threaded portions of tubular workpieces, such that a threaded portion of coupler may be joined to a threaded portion of the tubular workpiece. In other embodiments, a coupler is joined to a tubular workpiece in a manner other than corresponding threading. For example, a coupler may be welded, bonded, or fastened to the tubular workpiece. In various embodiments, couplers may be made of conductive or non-conductive material, with or without a conductive or non-conductive coating. In some embodiments, tubular workpieces coupled in a series have a length ranging from about 0.1 m to about 1 m. In particular embodiments, tubular workpieces coupled in a series have a length ranging from about 0.1 m to about 0.5 m.

Support structures 404A and 404B may be fabricated from a non-conductive material such as, polyvinylchloride (PVC), polyethylene (e.g. high density polyethylene (HDPE), acrylonitrile butadiene styrene (ABS), polypropylene (PP), or any combination thereof, or a support structure made of a conductive or non-conductive material may be coated with a non-conductive coating such as, PVC, polyethylene, polycarbonate, polyurethane, synthetic rubber, acrylic, or any combination thereof.

Additionally, support structures 404A and 404B may have attachments that allow a support structure to be coupled to (e.g., suspended from) an overhead gantry or gantry system that allows a tubular workpiece to be transported between a plurality of processing tanks. Alternatively, support structures 404A and 404B may have attachments that allow a support structure to be coupled to (e.g., supported by) a vehicle such as, a trolley or a tractor, in order to facilitate transport. In some embodiments, a gantry system or a vehicle is automated. In some embodiments, a gantry crane or vehicle is coupled to a rack during an electrodeposition process. In other embodiments, a gantry crane or vehicle releases a rack during an electrodeposition process. In further embodiments, a same gantry crane or vehicle re-couples with a rack after completion. In other embodiments, a different gantry crane or vehicle couples with a rack after completion.

A rack may further include two or more drive rollers 418 that are in physical contact with a tubular workpiece during an electrodeposition process. Generally, drive rollers 418 will be substantially cylindrical. In embodiments, two or more drive rollers 418 are positioned under a tubular workpiece 402 such that a tubular workpiece 402 is positioned in an interstitial space between two drive rollers 418. In other embodiments, one or more drive rollers 418 are positioned above a tubular workpiece 402.

Figure 5:
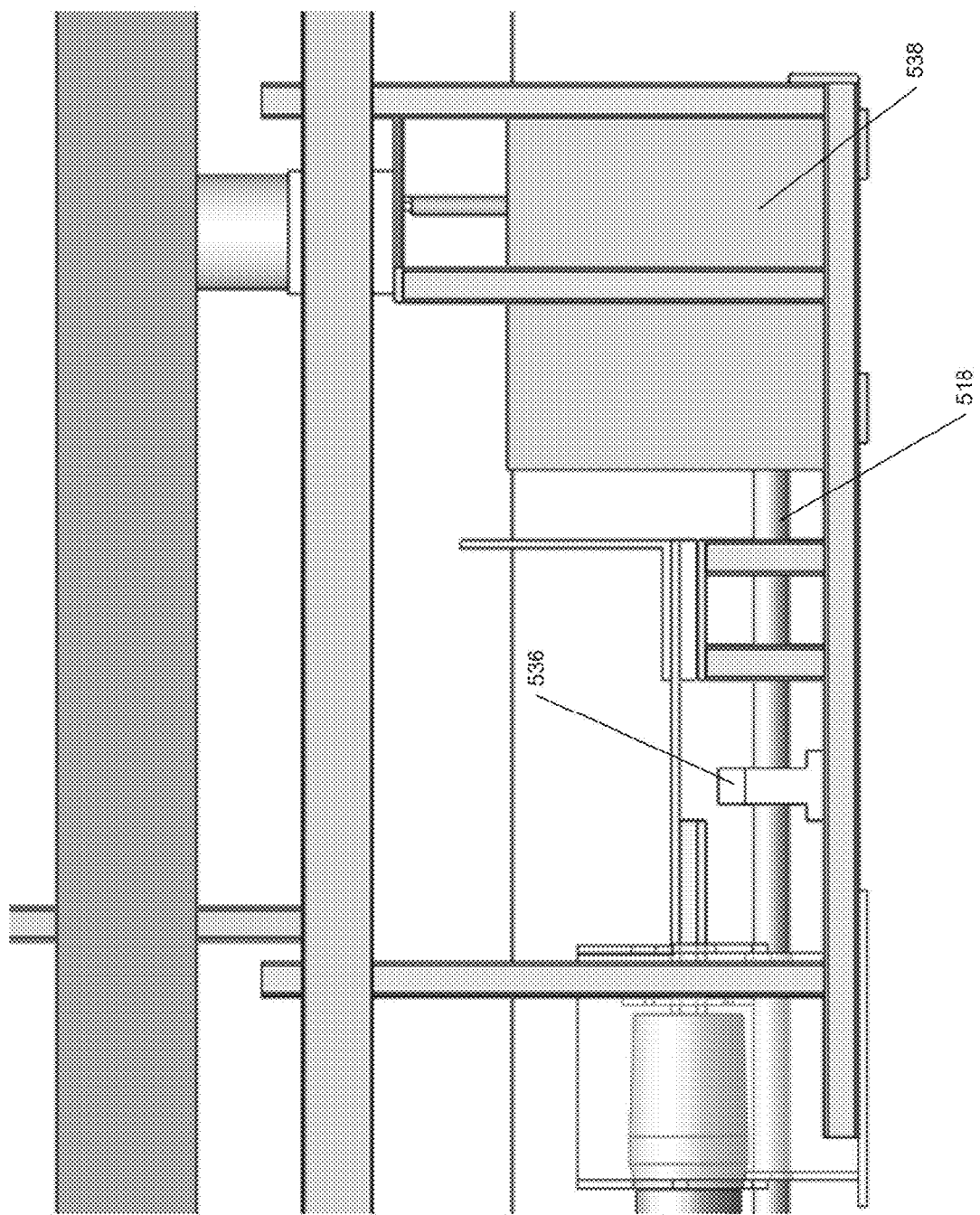
FIG. 5 shows an illustrative embodiment of a configuration of an electrodeposition system with a dynamic contact point assembly.

In embodiments, one or more drive rollers 418 is a driven roller. A driven roller is coupled to a motor 438, which causes a driven roller to rotate, thereby rotating a tubular workpiece and other drive roller(s) 418. An illustrative example of such a configuration is pictured in FIG. 5. In some embodiments, a drive roller 518, which is supported by a bearing 536, is directly coupled to a motor 538. In other embodiments, such as that of FIG. 4, a drive roller 418 is coupled to a motor 438 via a gear box 440.

A motor 438 may be housed in a suitable housing. In some embodiments, a housing is fabricated from a polymeric material (e.g., composite, thermoplastic, or thermoset) that is sealed (i.e., water tight).

A system described herein may further include a gear box 440. Such a gear box 440 may be in a same housing as a motor 438, or in a second housing 441. A motor 438 of the present disclosure may connect to a first end of a gear box 440. In embodiments, a gear box 440 is a right-angle (or 90 degree) gear drive that translates linear motion from a linear motor into rotary motion. A second end of a gear box 440 may be connected to a driven roller.

A tubular workpiece 402 may be rotated (e.g., by a motor 438) at a rotational speed ranging from about 0.5 rpm to about 10 rpm. In embodiments, a tubular workpiece 402 is rotated (e.g., by a motor 438) at a rotational speed ranging from about 0.5 rpm to about 3 rpm, about 1 rpm to about 4 rpm, about 2 rpm to about 5 rpm, about 3 rpm to about 6 rpm, about 4 rpm to about 7 rpm, about 5 rpm to about 8 rpm, about 6 rpm to about 9 rpm, or about 7 rpm to about 10 rpm. In some embodiments, a tubular workpiece 402 is rotated (e.g., by a motor 438) at a rotational speed ranging from about 0.5 rpm to about 1 rpm, about 1 rpm to about 2 rpm, about 2 rpm to about 3 rpm, about 3 rpm to about 4 rpm, about 4 to about 5 rpm, about 5 rpm to about 6 rpm, about 6 rpm to about 7 rpm, 7 to about 8 rpm, about 8 rpm to about 9 rpm, or about 9 to about 10 rpm.

A motor controller may be used to control a motor. In some embodiments, a motor controller is used to start or stop the motor, or to vary a speed as desired. In some embodiments, a motor or motor controller is a part of an apparatus of the disclosure. In other embodiments, a motor or motor controller is separate from an apparatus of the disclosure.

Drive rollers 418 may be made of any suitable non-conductive material (e.g., a plastic or a polymeric material, such as a composite material). In embodiments, a drive roller is made of a conductive (or a non-conductive) material that is coated with a suitable non-conductive coating (e.g., a plastic or a polymeric material, such as a composite material) using methods known in the art, such as via shrink wrapping, dip coating, painting, and the like. Suitable non-conductive materials or coatings are chosen based on the chemistry of the electrolyte bath, such that the material or coating does not contaminate an electrolyte solution.

A diameter of drive rollers 418 may vary based on a number of factors, for example, a diameter of a tubular workpiece, a length of a tubular workpiece, and the like. In embodiments, a diameter of a drive roller ranges from about 10 centimeters (cm) to about 250 cm. In certain embodiments, a diameter of a drive roller ranges from about 25 cm to about 100 cm.

Additionally, an apparatus of the present disclosure may further include one or more bearings 436A and 436B that support drive rollers 418 that, in use, rotate with a tubular workpiece 402. Bearing(s) 436A and 436B may be a bearing block including one or more spherical roller bearings. In embodiments, such a bearing block or a spherical roller bearing is made of one or more non-conductive materials, such as a plastic (e.g., a thermoplastic or a polyethylene-based plastic) or a polymeric material. In some embodiments, bearings 436A and 436B are electrically isolated.

An apparatus of the present disclosure may further include a dynamic contact point assembly that rotates a tubular workpiece, enables electrical contact with a tubular workpiece, or both. In embodiments, a dynamic contact point assembly is electrically coupled to a conductive bus. In some embodiments, a dynamic contact point assembly includes a conductive roller assembly including a conductive roller 420, which acts as a cathode, and is in electrical contact with the tubular workpiece 402 while in use. A conductive roller 420 may be in physical contact with a tubular workpiece 402, when in use. In other embodiments, a conductive roller 420 is not in physical contact with a tubular workpiece 402, but is in electrical contact with a tubular workpiece 402 when in use. In such embodiments, a conductive roller 420 may be in physical contact with a conductive article (e.g., a linkage, a flexible sheet, a brush, a rod, a wire, etc.), which is in physical contact with a tubular workpiece 402. In specific embodiments, a conductive roller 420 is not in physical contact with a tubular workpiece 402, but is in electrical contact with a tubular workpiece 402 via one or more wire brushes when in use.

Figure 6:
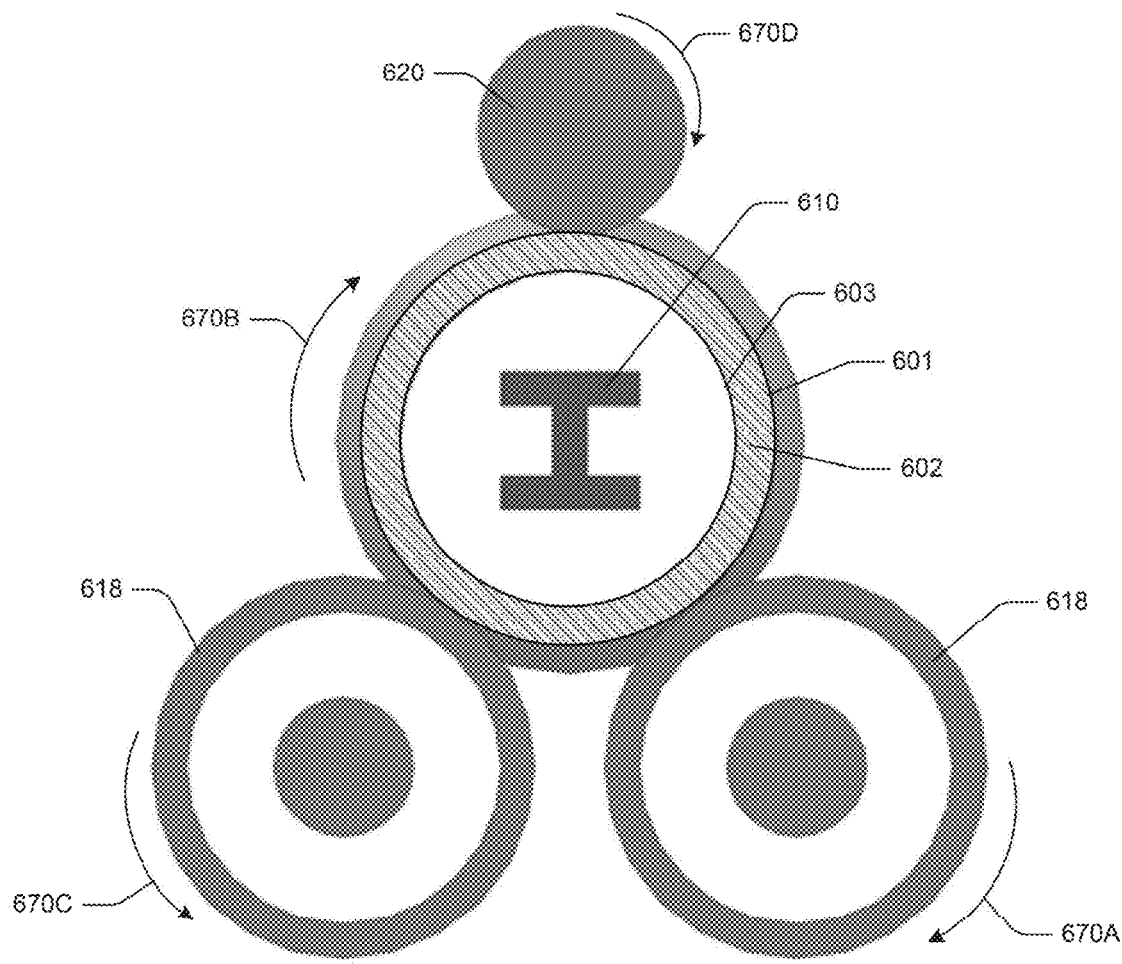
FIG. 6 is a cross-section of an illustrative embodiment of rollers used in an electrodeposition system.

In further embodiments, rotation of a driven roller causes a conductive roller 420 to rotate. A cross-section of an illustrative embodiment of a dynamic contact point assembly roller system is shown in FIG. 6. As shown, a tubular workpiece 602 has an outer surface 601 and an inner surface 603. A tubular workpiece 602 is supported by two drive rollers 618, at least one of which is a driven roller. In some embodiments, both drive rollers 618 are driven rollers. A driven roller introduces rotary motion 670A to a system with a tubular workpiece 602 via physical contact. A tubular workpiece 602 then experiences rotary motion 670B, which causes a second drive roller 618 to experience rotary motion 670C and a conductive roller 620 to experience rotary motion 670D. An interior anode 610 is shown positioned substantially in a center of a tubular workpiece 602.

Figure 7:
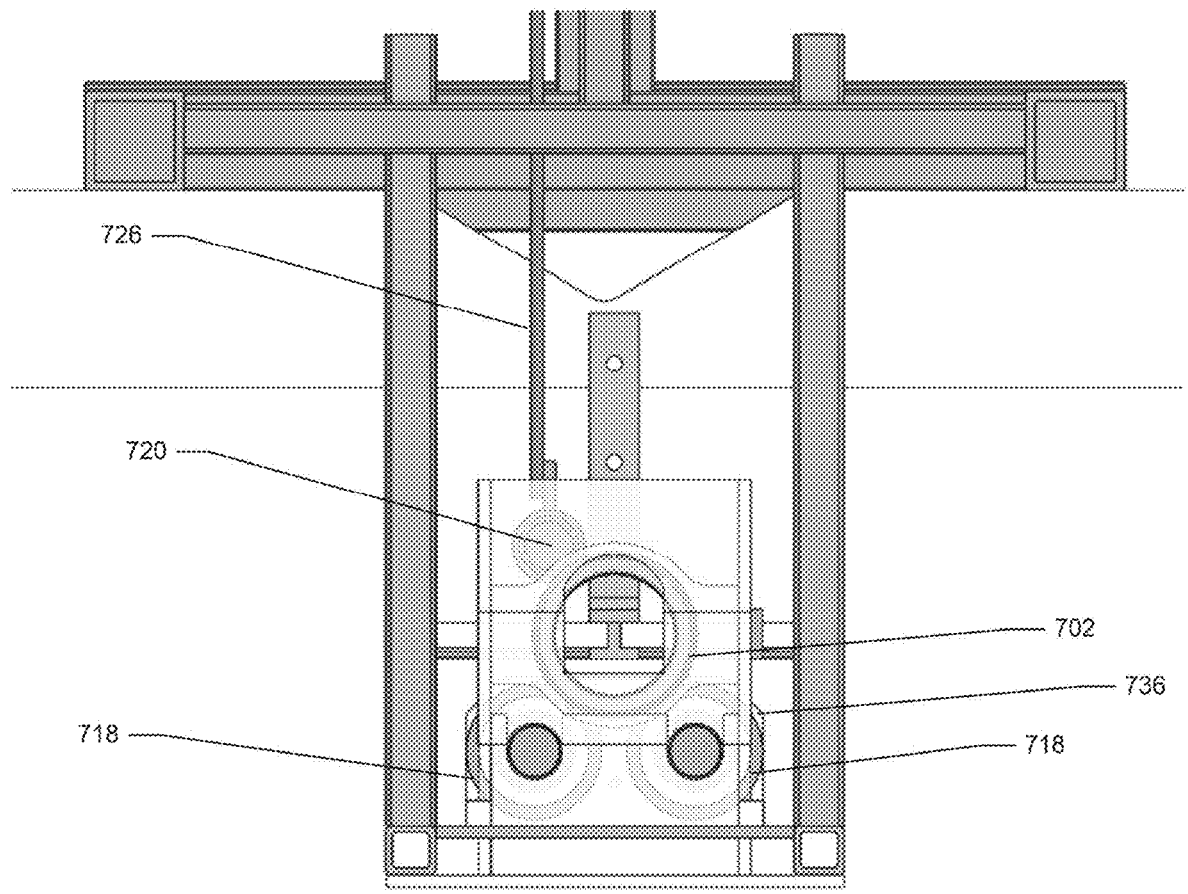
FIG. 7 is a cross-section of an illustrative embodiment of rollers as arranged in an electrodeposition system.

A conductive roller 620 may be in any position that allows for continuous electrical contact with a tubular workpiece 602. In some embodiments, a conductive roller 620 is centered over a longitudinal axis of a tubular workpiece 602 (e.g., as shown in FIG. 6). In other embodiments, a conductive roller 720 is positioned substantially to one side of a longitudinal axis, as shown in FIG. 7.

Such embodiments provide electrical connectivity to a tubular workpiece 702 while allowing the tubular workpiece 702 to rotate continuously. Therefore, a portion of a tubular workpiece 702 that is in electrical contact with a conductive roller 720 (i.e., cathode) varies over time as a tubular workpiece rotates. By maintaining an electrical circuit without having a conductive roller 720 in fixed or permanent contact with a tubular workpiece 702, no portion of a tubular workpiece 702 is prevented from receiving a coating for the entire processing duration. Thus, no marked-off area(s) are created on the coated article.

A conductive roller 720 may be made of any suitable conductive material. For example, a conductive roller may be made of a metal (e.g., copper). In embodiments, a diameter of a conductive roller ranges from about 10 cm) to about 250 cm. In certain embodiments, a diameter of a driver roller ranges from about 25 cm to about 50 cm.

In embodiments, a configuration of one or more drive rollers 718 or a conductive roller 720 is used to restrict a lateral or vertical motion of the tubular workpiece during processing. In some embodiments, a drive roller 718 and a conductive roller 720 are positioned under a tubular workpiece 702 such that a tubular workpiece 702 is positioned in an interstitial space between a drive roller 718 and a conductive roller 720.

A conductive roller assembly may also include one or more bearing assemblies 736 that may be attached to a first or second end of a conductive roller 720, such that a conductive roller 720 can rotate. In some embodiments, a bearing assembly is in electrical contact with a conductive roller 720. Accordingly, a conductive roller is able to maintain electrical contact with a bearing assembly, which is able to maintain electrical contact with a conductive bus, while rotating.

Figure 8:
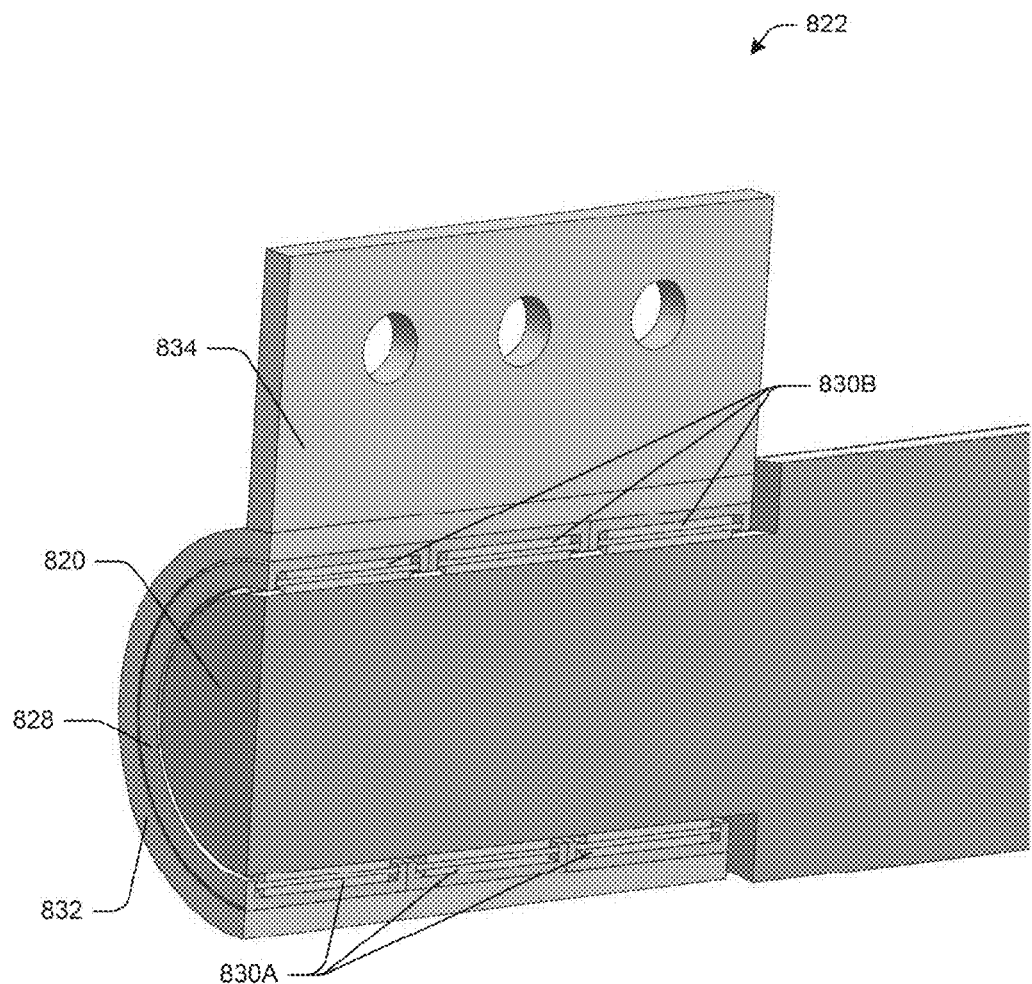
FIG. 8 provides an illustrative embodiment of a needle roller bearing.

In embodiments, a bearing assembly used in an apparatus of the present disclosure is a needle roller bearing assembly 822. An illustrative embodiment of a needle roller bearing assembly is shown in FIG. 8. A needle roller bearing assembly 822 may be coupled to a first or second end of a conductive roller 820, such that a conductive roller 820 can rotate. A portion of one or both ends of a conductive roller 820 may taper in order to fit into a needle roller bearing 828. In one embodiment, the conductive roller 820 is notched or keyed to receive a needle roller bearing assembly 822.

In embodiments, a needle roller bearing assembly 822 has a plurality of cylindrical rollers 830A and 830B in electrical contact with a conductive roller 820. Such cylindrical rollers 830A and 830B allow the needle roller bearing 828, bearing housing 832, and bearing tab 834 to remain stationary while a conductive roller 820 rotates. Additionally, a conductive roller 820 is able to maintain electrical contact with a needle roller bearing assembly 822, which is able to maintain electrical contact with a conductive bus, while rotating.

A needle roller bearing assembly 822 of the present disclosure may be sheathed in a bearing housing 832. In embodiments, a conductive bus is joined to a bearing housing 832 via a conductive article. A bearing housing 832 may further comprise a bearing tab 834 joined with one or more conductive articles (not pictured), as described with respect to FIG. 4. In some embodiments a connection between a bearing tab 834 and one or more conductive articles is a flexible connection. Additionally or alternatively, in some embodiments, one or more conductive articles are connected to a conductive bus via a flexible connection. A flexible connection acts to prevent a system from binding.

Referring again to FIG. 4, an apparatus of the present disclosure may include a conductive bus 424. In other embodiments, a conductive bus is configured to maintain electrical contact with an outer surface of a tubular workpiece. In further embodiments, a conductive bus is configured to be in electrical contact with an exterior surface of a tubular workpiece in at least two places, or at least three places.

Any appropriate conductive material may be used for a conductive bus. For example, a conductive bus may be made of copper, etc.

A conductive bus 424 may be a bus bar. In further embodiments, when in use, a bus bar is positioned substantially parallel to a longitudinal axis of a tubular workpiece. In some embodiments, a bus bar is attached at one or both ends to one or more support structures. In certain embodiments, a bus bar is a copper bar that is attached to support structure 404A and 404B.

While in use, a conductive bus remains in electrical contact with a tubular workpiece without interfering with the rotation of a tubular workpiece. A contact point assembly may further include one or more conductive articles, which, if present, are generally in physical contact with a conductive roller 420 or a tubular workpiece 402 during rotation. In some embodiments, a conductive bus, while in use, is in electrical contact with a tubular workpiece via a conductive article.

In embodiments, a conductive article for use in an apparatus of the present disclosure is a flexible sheet, a brush, a rod, or a wire. In further embodiments, a conductive article for use in an apparatus of the present disclosure includes one or more linkages. In some embodiments, a conductive article includes two or more linkages. In other embodiments, a conductive article for use in an apparatus of the present disclosure is a bar.

In embodiments, a dynamic contact point assembly is in electrical contact with a conductive bus via one or more needle roller bearing assemblies 422A and 422B. For example, each needle roller bearing assembly 422A and 422B may be in electrical contact with a conductive bus 424, as shown in FIG. 4. Needle roller bearing assemblies 422A and 422B are in contact with conductive articles 426A and 426B, respectively. In some embodiments, one end of a conductive article is joined (e.g., fastened, bonded, etc.) to a conductive bus, and another end of a conductive article is joined to a needle roller bearing assembly. In certain embodiments, conductive articles 426A and 426B are bars. In other embodiments, conductive articles 426A and 426B are linkages. By utilizing flexible conductive articles or conductive articles with a flexible connection point, e.g., linkages, allows a conductive roller 420 more freedom of movement, which decreases the risk of binding as a drive roller 418 and a tubular workpiece 402 rotate. In any of these embodiments, conductive articles 426A and 426B made of, or coated with, a conductive material (e.g., copper).

In some embodiments, two or more conductive articles are positioned such that a bearing, conductive roller, or tubular workpiece is sandwiched between the two or more conductive articles. Similarly, two or more conductive articles may be positioned such that a conductive bus is sandwiched between the two or more conductive articles. A conductive article for use in an apparatus of the present disclosure may be made of conductive material (e.g., copper) or have a conductive coating.

In embodiments, a conductive article includes two or more threaded portions. In further embodiments, a conductive article for use in an apparatus of the present disclosure is a coupler made of conductive material (e.g., copper) or have a conductive coating.

As a conductive article may be in physical contact with a bearing, a conductive roller, or a tubular workpiece, a conductive article may cause resistance to rotation of a tubular workpiece. However, any resistance caused does not prevent rotation of a tubular workpiece.

Embodiments of the present disclosure include an apparatus comprising a rack configured to support a tubular workpiece that is substantially cylindrical, has a longitudinal axis, has a hollow cavity defined by an inner surface having a first surface area, and has an outer surface having a second surface area, the rack including: a conductive bus; a dynamic contact point assembly electrically coupled to the conductive bus, such that, when in use, the tubular workpiece and the conductive bus are in electrical conduct via the dynamic contact point assembly; a drive roller that is substantially cylindrical in shape, the drive roller configured to maintain physical contact with the tubular workpiece; and a driven roller that is substantially cylindrical in shape, the driven roller configured to maintain physical contact with the tubular workpiece.

Apparatuses of the present disclosure may further include an interior anode 410. Anodes of the present disclosure are substantially cylindrical, and generally made of a metal. An interior anode 410 generally is positioned substantially parallel to a longitudinal axis of a tubular structure 402 such that an exterior surface of an interior anode 410 is positioned a predetermined distance from an inner surface of a tubular workpiece 402.

A distance between an exterior surface of an interior anode 410 and an inner surface of a tubular workpiece 402 is generally substantially uniform. An apparatus of the present disclosure may include a guide 412 coupled to the rack that maintains an interior anode 410 in position when in use. A guide may be fabricated from any suitable non-conductive material, such as a non-conductive thermoplastic material (e.g., chlorinated polyvinyl chloride (CPVC)).

An interior anode may be columnar or tubular. In embodiments, an interior anode 410 has a diameter that is smaller than an inner diameter of a tubular workpiece 402. Referring to FIG. 3A, an exterior surface of an interior anode 310 may be, for example, substantially cylindrical 350 or may have a surface area feature that increases a surface area of the anode. In some embodiments, a surface area feature is corrugation 352. In some embodiments where an interior anode 310 is tubular, an interior anode also has a hollow cavity centered on a longitudinal axis 354 that is circular 356 or that has a corrugated shape 358, as shown in FIG. 3B. In further embodiments, a surface area feature is a polygonal or sawtooth tube configuration, such that an exterior surface comprises a number of interconnected sides. In embodiments, an interior anode has three, four, five, six, or more interconnected sides. In further embodiments, a number of interconnected sides varies over a length of an interior anode.

Accordingly, embodiments of the present disclosure include an anode comprising a substantially cylindrical metal member, the metal member having an exterior surface with a surface area feature that increases a surface area of the anode, the metal member, in use, being in electrical contact with a tubular workpiece.

A surface area of an interior anode may be based on an inner surface area of a tubular workpiece and a ratio of a length between an exterior surface and an inner surface of a tubular workpiece to a length between an outer surface of a tubular workpiece and an exterior anode.

Accordingly, embodiments of the present disclosure include methods of configuring an anode for use in an electrodeposition process to deposit a nanolaminate coating on a tubular workpiece, comprising: determining a surface area of the anode based on: a ratio of a first surface area corresponding to an inner surface of the tubular workpiece to a second surface area corresponding to an outer surface of the tubular workpiece; and a ratio of an inner diameter of the tubular workpiece to distance between outer surface of the tubular workpiece to the outer anode surface, wherein the surface area of the anode provides a coating on the tubular workpiece such that a ratio of a first thickness of the nanolaminate coating on the inner surface to a second thickness of the nanolaminate coating on the outer surface is about one.

An interior anode 310 may have a plurality of holes 360 that extend laterally through at least one wall of an interior anode, as shown in FIG. 3C. In some embodiments, ones of a plurality of holes 360 extend through an interior anode 310. In some embodiments where an interior anode 310 has a hollow cavity, holes extend through a wall of an interior anode, but do not align with a corresponding hole in an opposite wall. A concentration of a subset of a plurality of holes may differ over a length of an interior anode 310, as shown in FIG. 3C. In other words, a number of holes found in a predetermined area of an interior anode 310 may vary along a length of an interior anode. Similarly, a diameter of a subset of a plurality of holes may differ over a length of an interior anode 310, as shown in FIG. 3C. Thus, a size of holes found in a predetermined area of an interior anode 310 may vary along a length of an interior anode.

A plurality of holes in a tubular workpiece may be in any suitable shape, such as, for example, circles, squares, rectangles, ovals, triangles, diamonds, hexagons, and the like. In some embodiments, a plurality of holes is one shape. In further embodiments, a plurality of holes in a tubular workpiece includes holes of more than one shape.

An interior anode may be made of any suitable materials, such as a metal or an alloy, such as Zn, Ni, Sn, a precious metal (e.g., gold, silver, platinum, palladium, etc.), or any alloy thereof. In certain embodiments, an interior anode is made of a Zn—Sn alloy or a Ni—Co alloy. In embodiments, an interior anode is sacrificial, and therefore is replaced during the electrodeposition process.

In embodiments, an interior anode is surrounded, or partially surrounded by shielding. By varying a thickness or creating cutouts, such as holes, shielding can be customized in order to distribute the current density as desired. Shielding may be shaped in any suitable form, such as, substantially circular, semi-circular, rectangular, cylindrical, semi-cylindrical, cuboidal, spherical, conical, pyramidal, and the like. Shielding may be made of any suitable material, such as an acrylic. In some embodiments, shielding is made by 3D printing methods using materials suitable for such methods. In certain embodiments, shielding is made from poly(methyl methacrylate) (PMMA). Shielding may be static (i.e., in a fixed position) or dynamic (i.e., in motion) when an apparatus of the present disclosure is in use.

In embodiments, an interior anode has a substantially constant material thickness ranging from about 0.25 mm to about 0.60 mm, from about 0.50 mm to about 0.80 mm, from about 0.75 mm to about 1.1 mm, from about 1.0 mm to about 1.3 mm, from about 1.2 mm to about 1.6 mm, from about 1.5 mm to about 1.8 mm, from about 1.7 mm to about 2.1 mm, from about 2.0 mm to about 2.3 mm, from about 2.2 mm to about 2.6 mm, from about 2.5 mm to about 3.9 mm, from about 3.8 mm to about 5.1 mm, or from about 5.0 mm to about 6.4 mm. In some embodiments, an interior anode is substantially solid. In further embodiments, an interior anode is made of a material that is substantially non-porous. In further embodiments, an interior anode has a plurality of holes or a hollow cavity, such that, when in use, an interior anode to distributes or causes mixing of an electrolyte solution adjacent the interior anode In other embodiments, an interior anode is porous. In some embodiments, an interior anode has a percentage open area ranging from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, or from about 95% to about 99%. In some embodiments, an interior anode is positioned within a fabric material. Suitable fabric materials include polypropylene, napped poly, cotton, synel, canton flannel, mono-filament polypropylene, nylon, polypropylene microfilet, cotton duck, felt, and polyester.

Returning to FIG. 4, one or more electrical contact bars 414 may be positioned at one or both ends of the interior anode 410. Electrical contact bar(s) may serve as electrical contact points for an interior anode 410 during the electrodeposition process.

Figure 9A:
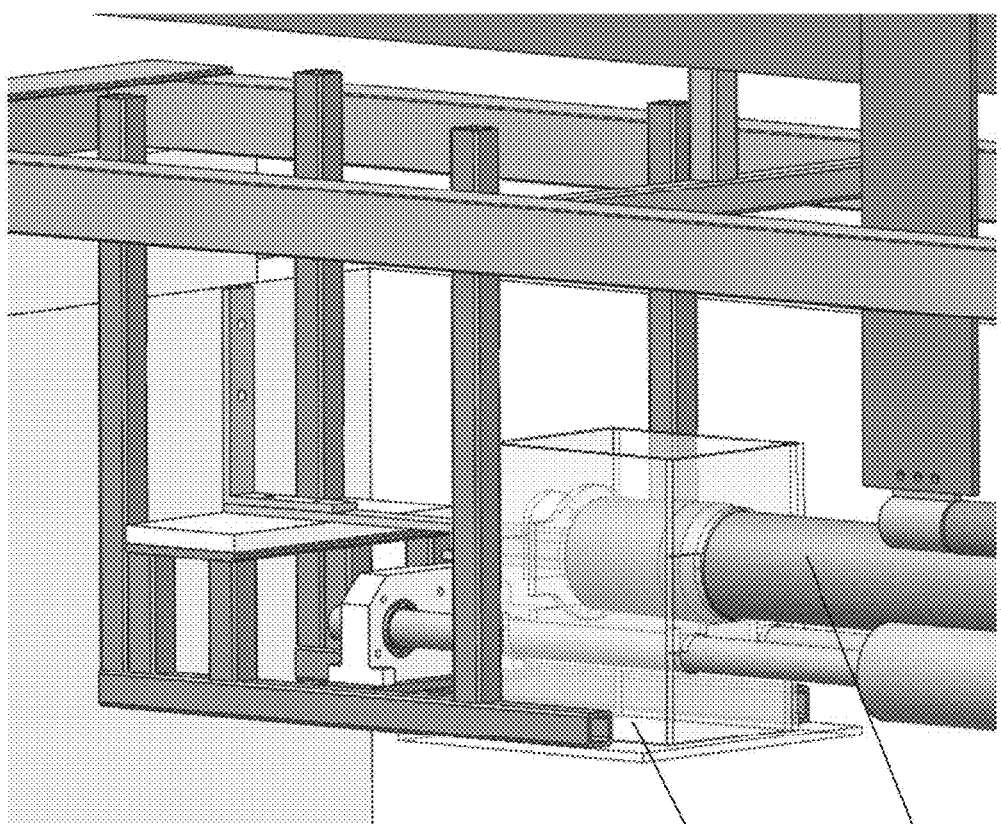
FIGS. 9A-9D show illustrative examples of shielding as used in electrodeposition systems of the present disclosure.
Figure 9B:
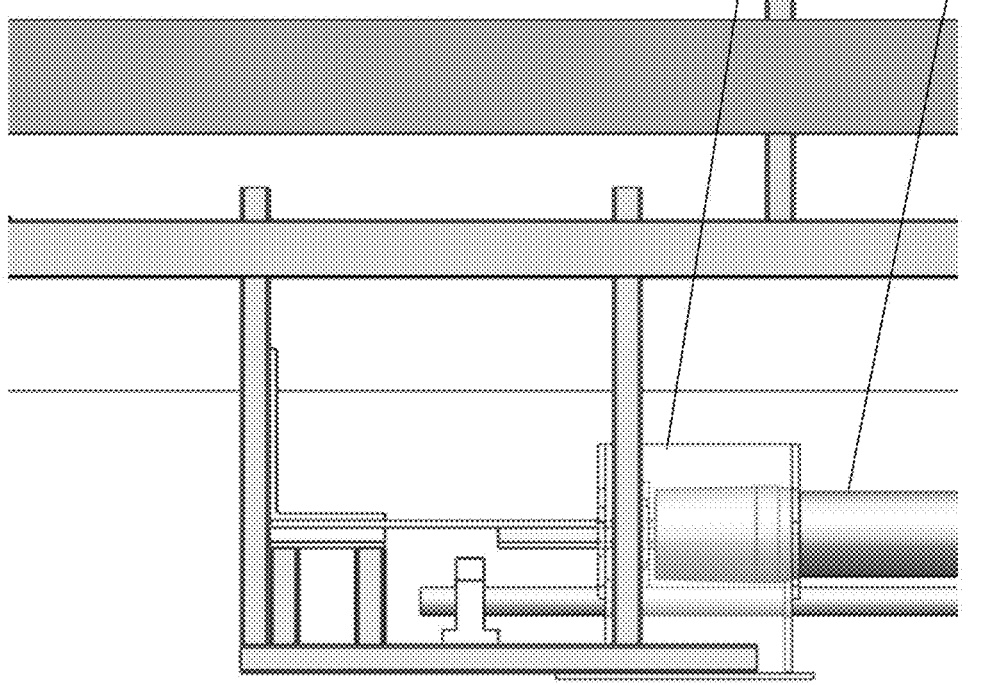
Figure 9C:
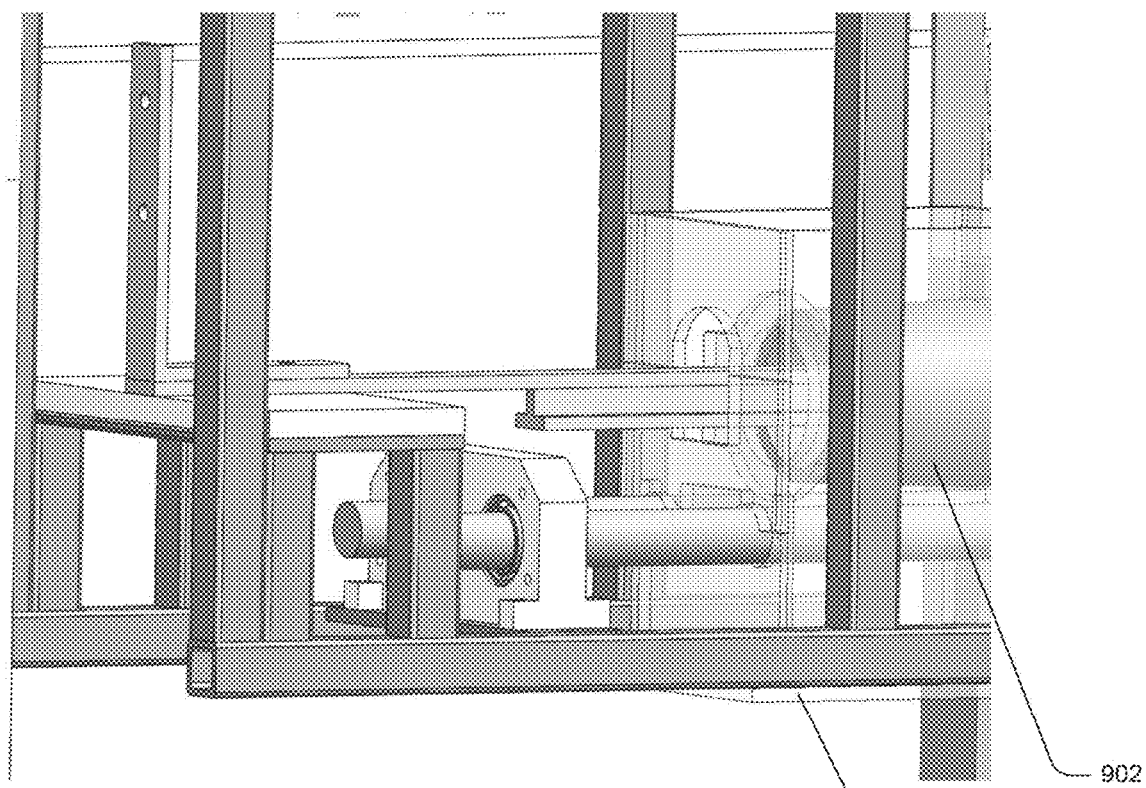
Figure 9D:
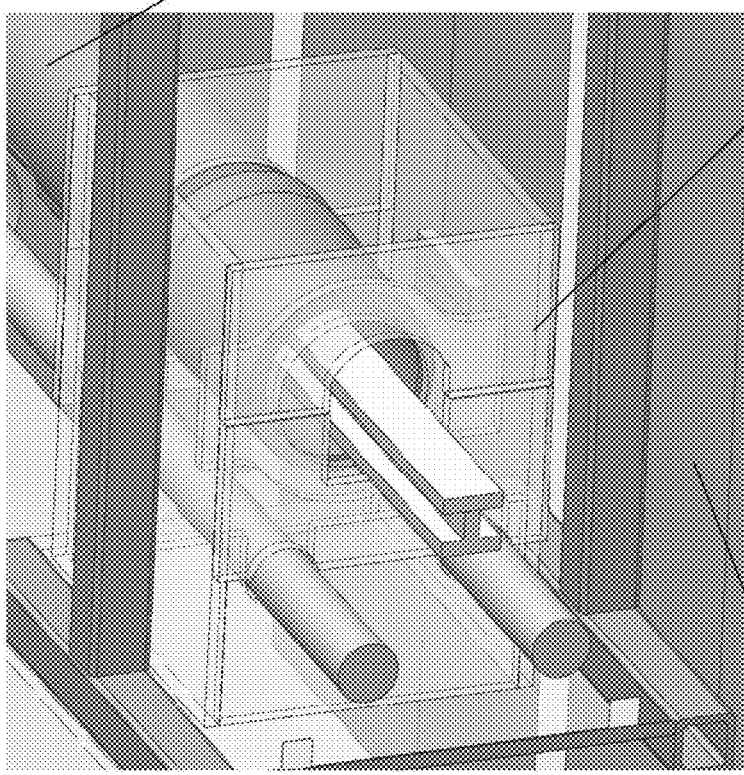

An apparatus of the present disclosure may further include shielding 948 or thieving positioned adjacent to a tubular workpiece 902, as shown in FIGS. 9A-9D. FIG. 9A, FIG. 9B, FIG. 9C, and FIG. 9D each provide different views of embodiments of such shielding. In some embodiments where a tubular workpiece includes one or more threaded portions, at least a portion of the shielding 948 or thieving is positioned adjacent to a threaded portion of a tubular workpiece 902. In some such embodiments, at least a portion of the shielding 948 or thieving is positioned between a tubular workpiece 902 and an interior or exterior anode 942, as shown in FIG. 9D.

Systems for Electrodepositing Nanolaminate Coatings

Systems for electrodepositing nanolaminate coatings comprise an apparatus as described above and a tubular workpiece. Accordingly, embodiments of the present disclosure include an electroplating system comprising: (1) a tubular workpiece having a substantially cylindrical shape, a hollow cavity defined by an inner surface of the tubular workpiece, and a longitudinal axis; (2) a rack comprising: at least one support structure that, when in use supports the tubular workpiece; and a contact point assembly that, when in use, rotates the tubular workpiece or enables electrical contact with the tubular workpiece; and (3) an interior anode supported by the rack, the interior anode having an exterior surface, the interior anode, when in use, positioned substantially along the longitudinal axis or an axis substantially parallel to the longitudinal axis within the hollow cavity of the tubular workpiece such that the exterior surface of the interior anode is positioned a predetermined distance from the inner surface of the tubular workpiece.

Additional embodiments of the disclosure include an electroplating system comprising: (1) a tubular workpiece that is substantially cylindrical, has a longitudinal axis, has a hollow cavity defined by an inner surface having a first surface area, and has an outer surface having a second surface area; (2) a rack that, when in use, supports a tubular workpiece, the rack comprising: a conductive bus; a dynamic contact point assembly electrically coupled to the conductive bus, such that, when in use, the tubular workpiece and the conductive bus are in electrical contact via the dynamic contact point assembly; a drive roller that is substantially cylindrical in shape, the drive roller that, when in use, maintains physical contact with the tubular workpiece; and a driven roller that is substantially cylindrical in shape, the driven roller that, when in use, maintains physical contact with the tubular workpiece.

Figure 10A:
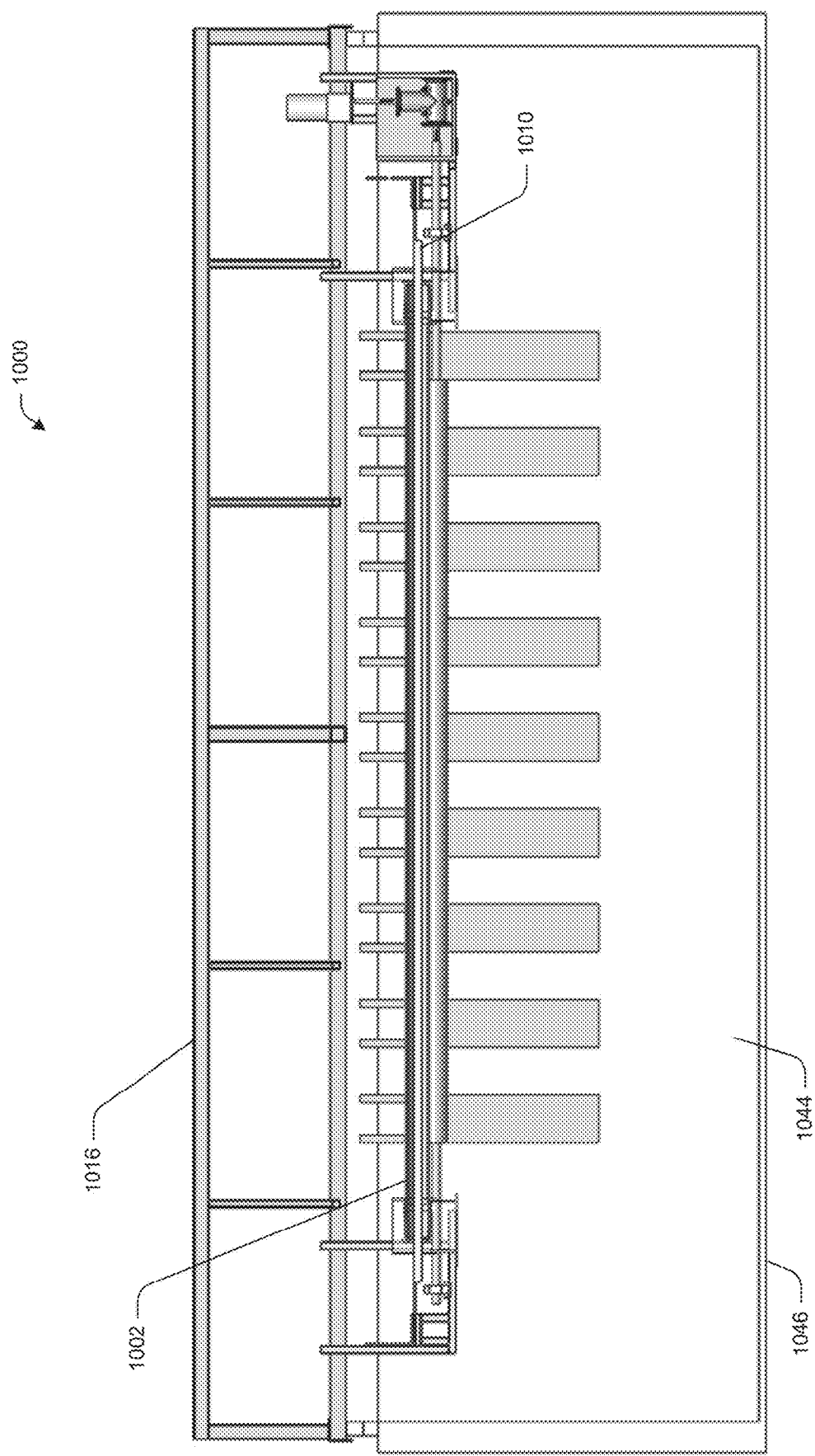
FIGS. 10A-10C provide several views of an illustrative example of a system of the disclosure.
Figure 10B:
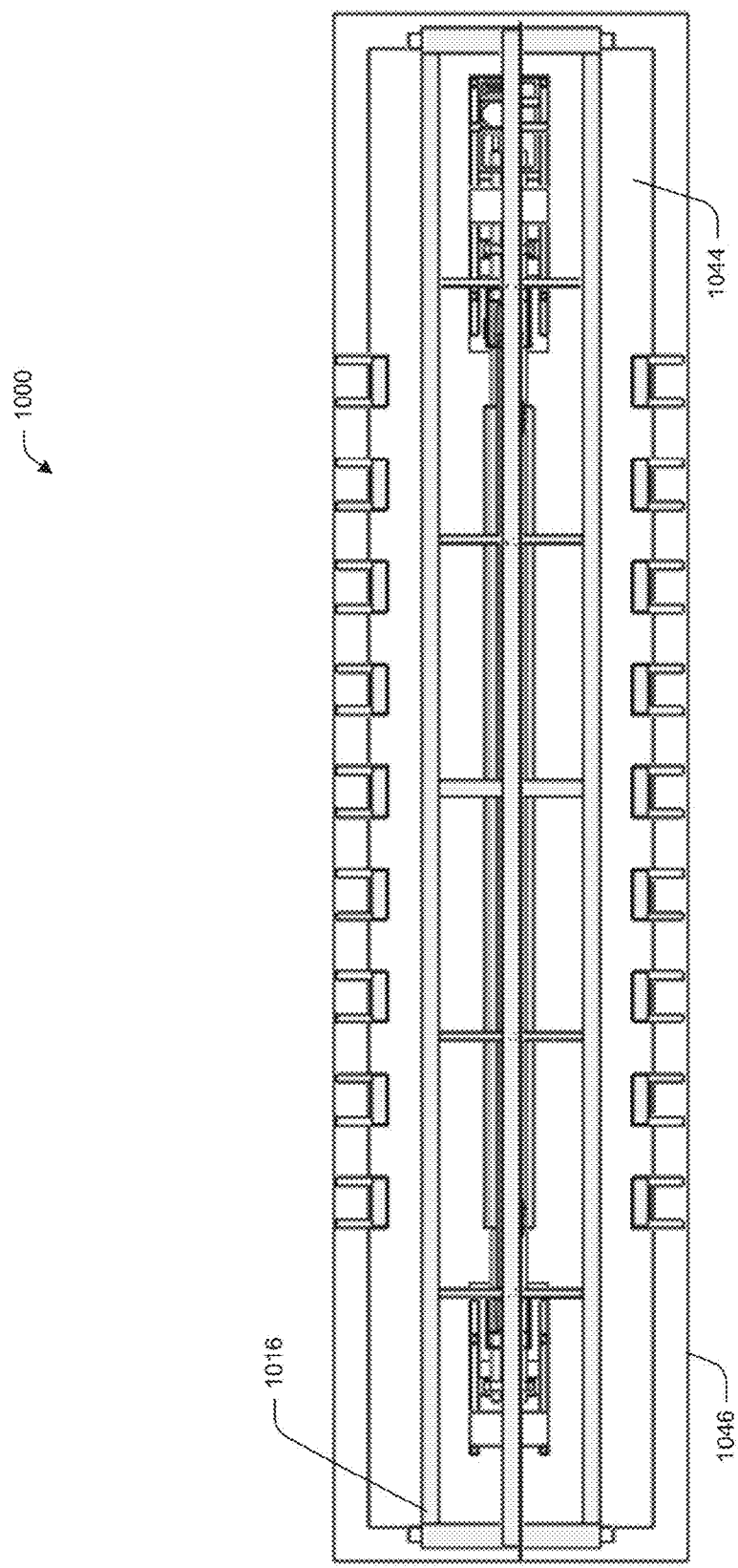
Figure 10C:
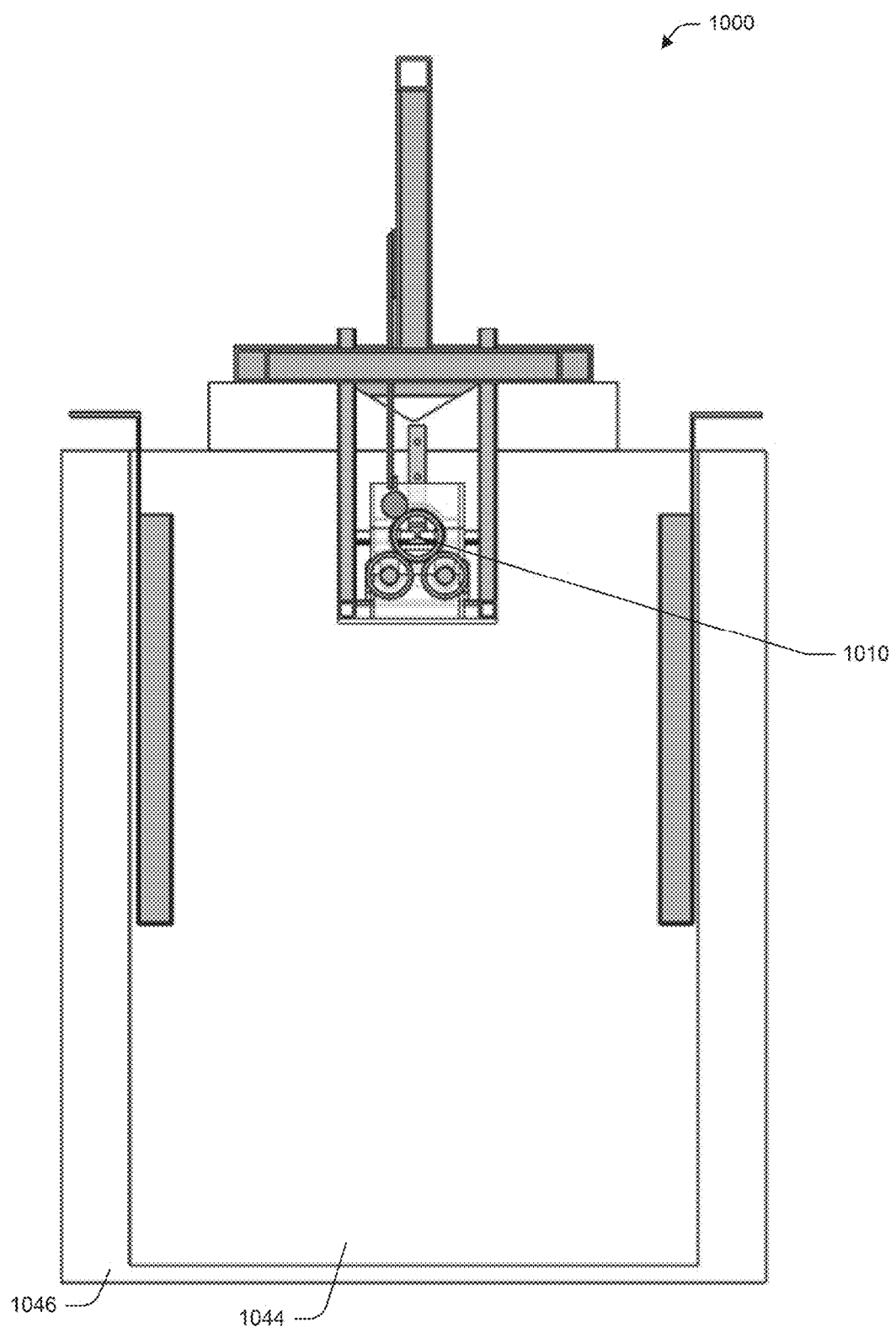

Several views of an illustrative example of a system 1000 of the disclosure is shown in FIGS. 10A-10C. FIG. 10A shows a cross section of a system 1000 along a longitudinal axis of a tubular substrate 1002; FIG. 10B shows a view from above; and FIG. 10C shows a cross section taken at a mid-point of a tubular workpiece 1002 in a direction substantially perpendicular to a longitudinal axis.

In such embodiments, a system 1000 of the present disclosure further includes an electrolyte bath 1044. An electrolyte bath 1044 includes an electrolyte solution comprising a liquid and at least one electrodepositable species. In some embodiments, the liquid is an ionic liquid. In some embodiments, an electrodepositable species includes a metal salt, from which a metal may be electroplated onto a tubular workpiece. In embodiments, two or more electrodepositable species are in an electrolyte solution. Electrodepositable species that may be used in an electrolyte solution of the present disclosure include, for example, Ag, Al, Au, B, Be, C (e.g., graphite), Co, Cr, Cu, Fe, Hg, In, Ir, Mg, Mn, Mo, Nb, Nd, Ni, P, Pd, Pt, Re, Rh, Sb, Sn, Pb, Ta, Ti, W, V, Zn, and Zr. In some embodiments, an electrolyte solution includes one or more additives. Examples of additives include brightening agents, leveling agents, surfactants, and the like.

In some embodiments where two or more metal salts are present in an electrolyte solution, an alloy of two or more metals is deposited onto a tubular workpiece. In some embodiments, a composition of an alloy electrodeposited onto a tubular workpiece is varied based on a current or a voltage applied. In some embodiments, more than two (e.g., three, four, five, six, seven, eight, or more) metal salts are present in an electrolyte solution.

In further embodiments, multilayer nanolaminate coatings with layers having alloys of varying composition are deposited onto a tubular workpiece by varying a current or a voltage applied. Such multilayer nanolaminate coatings may be produced by applying an oscillating current density to a tubular workpiece. In some embodiments, at least two cycles of an oscillating current density is applied, resulting in a compositionally (e.g., concentration of metals in an alloy, etc.) or structurally (e.g., layer thickness, layer density, etc.) modulated nanolaminate coating on a tubular workpiece.

In some embodiments, a rack 1016 and an electrolyte bath 1044 are housed in a process tank 1046.

In embodiments, a system 1000 of the present disclosure further includes a flow control unit to distribute an electrolyte solution through a process tank. In some embodiments, a flow control unit distributes an electrolyte solution over an exterior surface of a tubular workpiece. In various embodiments, an electrolyte solution is circulated, in part, by an electrolyte distribution tube.

In embodiments, a flow control unit introduces electrolyte solution into a hollow cavity of a tubular workpiece. In some embodiments, an electrolyte distribution tube is positioned adjacent to an interior anode within a hollow cavity of a tubular workpiece. An electrolyte distribution tube may include a plurality of holes that extend laterally though an electrolyte distribution tube. In embodiments, the holes extend through a wall of an electrolyte distribution tube, but do not align with a corresponding hole in an opposite wall. A concentration of a subset of a plurality of holes may differ over a length of an electrolyte distribution tube. In other words, a number of holes found in a predetermined area of an electrolyte distribution tube may vary along a length of an electrolyte distribution tube. Similarly, a diameter of a subset of a plurality of holes may differ over a length of an electrolyte distribution tube. Thus, a size of holes found in a predetermined area of an electrolyte distribution tube may vary along a length of an electrolyte distribution tube.

In further embodiments, a flow control unit distributes an electrolyte solution into a hollow cavity of a tubular workpiece through a hollow cavity in an interior anode, through a plurality of holes in an interior anode, or both.

A flow control unit may include a pump that, when in use, circulates electrolyte solution over an exterior surface of a tubular workpiece 1002 or through a hollow cavity of a tubular workpiece 1002. In embodiments, a pump circulates electrolyte solution over an exterior surface of a tubular workpiece 1002 via an electrolyte distribution tube. In additional embodiments, a pump circulates electrolyte solution through a hollow cavity of a tubular workpiece 1002 via an interior anode 1010 or an electrolyte distribution tube. An electrolyte solution may be circulated through a hollow cavity of a tubular workpiece at a flow rate ranging from about 0.005 cubic meters per hour ($m^3/h$) to about 24.0 $m^3/h$. In some embodiments, an electrolyte solution is circulated at a flow rate ranging from about 0.005 $m^3/h$ to about 0.5 $m^3/h$, from about 0.005 $m^3/h$ to about 12.0 $m^3/h$; from about 0.5 $m^3/h$ to about 1.0 $m^3/h$, from about 1.0 $m^3/h$ to about 2.0 $m^3/h$, from about 1.0 $m^3/h$ to about 6.0 $m^3/h$; from about 1.0 $m^3/h$ to about 12.0 $m^3/h$; from about 1.0 $m^3/h$ to about 18.0 $m^3/h$; from about 1.0 $m^3/h$ to about 24.0 $m^3/h$; from about 2.0 $m^3/h$ to about 3.0 $m^3/h$, from about 3.0 $m^3/h$ to about 6.0 $m^3/h$; from about 3.0 $m^3/h$ to about 12.0 $m^3/h$; from about 3.0 $m^3/h$ to about 18.0 $m^3/h$; from about 3.0 $m^3/h$ to about 24.0 $m^3/h$; from about 4.0 $m^3/h$ to about 5.0 $m^3/h$, from about 5.0 $m^3/h$ to about 6.0 $m^3/h$; from about 6.0 $m^3/h$ to about 12.0 $m^3/h$; from about 6.0 $m^3/h$ to about 18.0 $m^3/h$; from about 6.0 $m^3/h$ to about 24.0 $m^3/h$; from about 12.0 $m^3/h$ to about 18.0 $m^3/h$; from about 12.0 $m^3/h$ to about 24.0 $m^3/h$; from about 18.0 $m^3/h$ to about 24.0 $m^3/h$; from about 20.0 $m^3/h$ to about 24.0 $m^3/h$; or from about 22.0 $m^3/h$ to about 24.0 $m^3/h$.

Figure 11A:
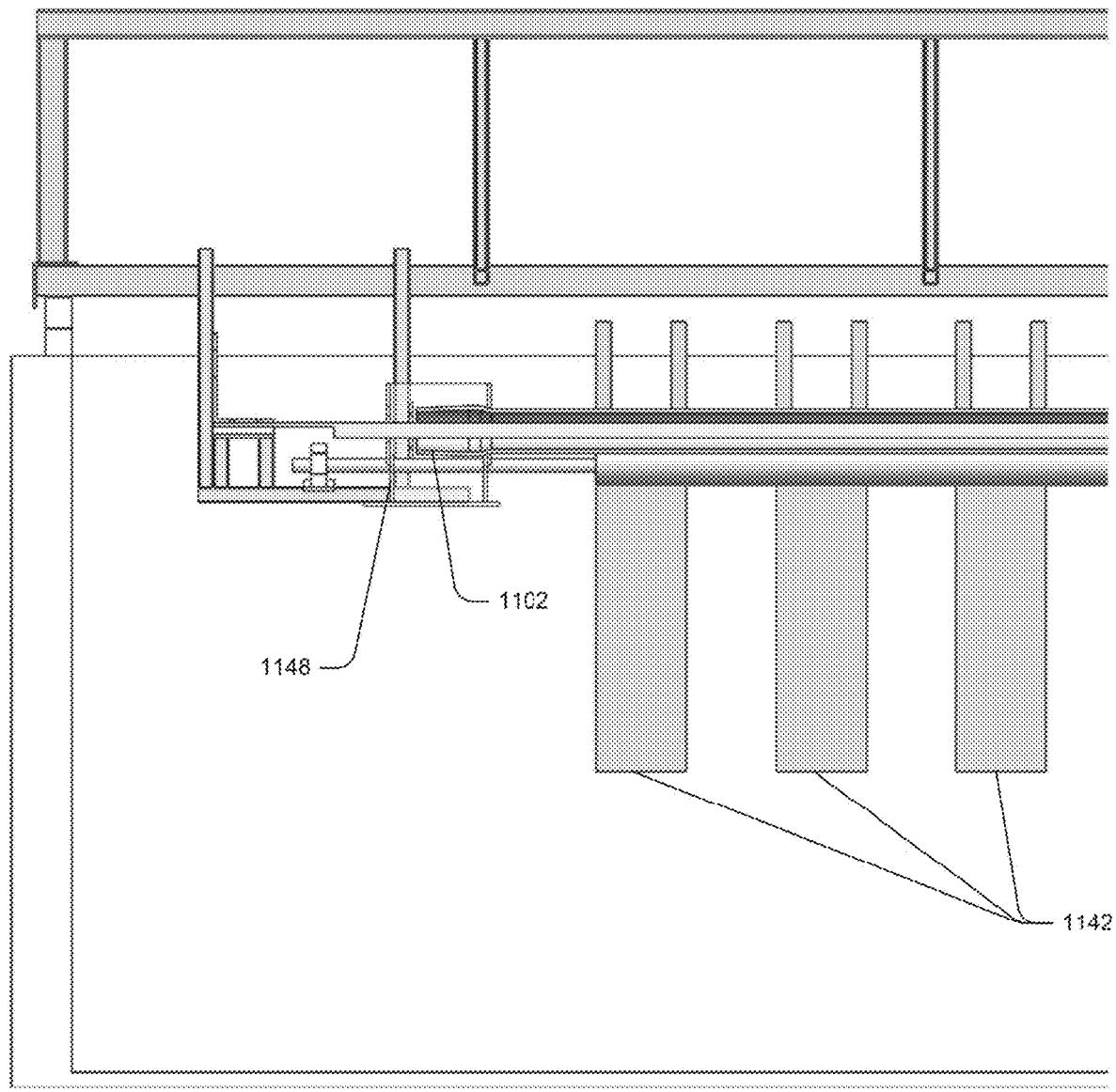
FIGS. 11A-11D show further illustrative examples of systems of the present disclosure that include shielding adjacent to a portion of a tubular workpiece.
Figure 11B:
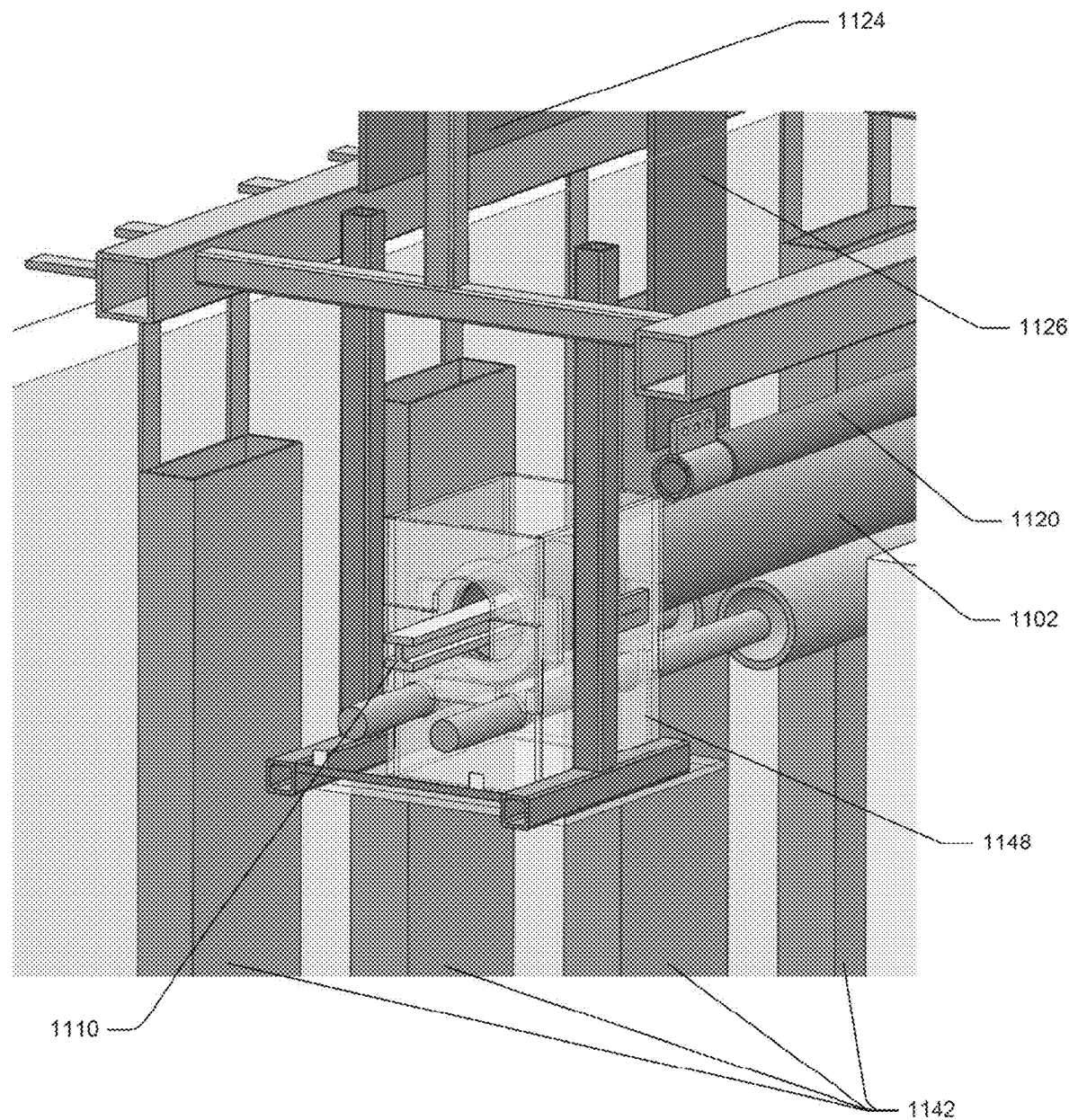
Figure 11C:
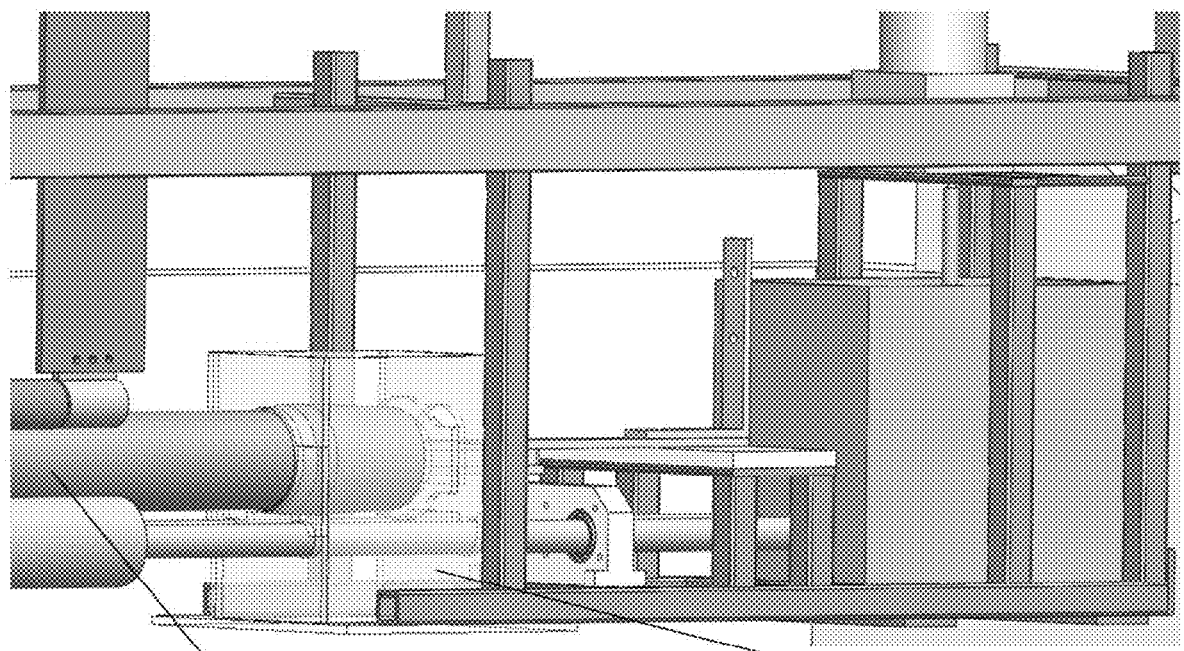
Figure 11D:
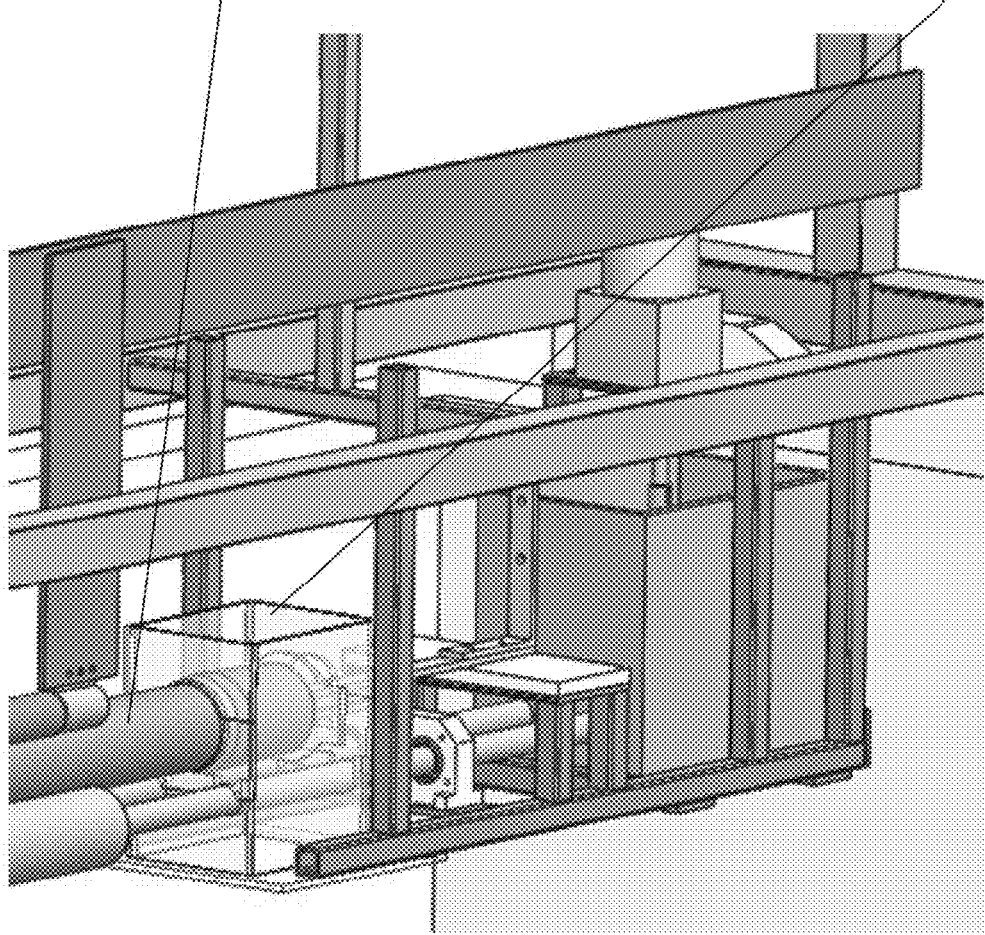

In embodiments, systems of the present disclosure further include one or more exterior anodes 1142, such as those pictured in FIGS. 11A and 11B. An exterior anode 1142 may have a length that is less than or equal to a length of a tubular workpiece 1102. When in use, an exterior anode 1142 is positioned adjacent to a tubular workpiece 1102. An exterior anode 1142 is positioned a predetermined distance away from an exterior surface of a tubular workpiece 1102. Additionally, an exterior anode 1142 may be positioned substantially parallel to a longitudinal axis of a tubular workpiece at a substantially uniform distance from an exterior surface of a tubular workpiece 1102.

A system of the present disclosure may further include shielding 1148 or thieving positioned adjacent to a tubular workpiece 1102, as shown in FIGS. 11A-11D. In some embodiments where a tubular workpiece includes one or more threaded portions, at least a portion of the shielding 1148 or thieving is positioned adjacent to a threaded portion of a tubular workpiece 1102. In some such embodiments, at least a portion of the shielding 1148 or thieving is positioned between a tubular workpiece 1102 and an interior or exterior anode 1142, as shown in FIGS. 11A and 11B.

A system of the present disclosure may further include a power supply. In embodiments, a power supply is electrically coupled to an interior anode. In some embodiments where more than one anode is present, a power supply is electrically coupled to each anode. In embodiments, a single power supply is present. In other embodiments, two or more power supplies are present.

In certain embodiments, a first power supply controller distributes power to one or more exterior anodes and a second power supply controller distributes power to an interior anode.

As pictured in FIG. 11B, in embodiments, a power supply is in electrical contact with a conductive bus 1124. In some embodiments where a gear or a coupler is joined to a tubular workpiece at one or both ends, a gear or a coupler acts as a fixed contact between a tubular workpiece and a power supply. In other embodiments, a conductive roller 1120 is used to maintain electrical contact with a tubular workpiece. In further embodiments, a power supply is in electrical contact with a tubular workpiece via one or more conductive articles 1126.

In some embodiments, a conductive article is in physical contact with the gear or the coupler.

In some embodiments, two or more conductive articles are positioned such that a gear, coupler, or tubular workpiece is sandwiched between the conductive articles. Similarly, two or more conductive articles may be positioned such that a conductive bus is sandwiched between the conductive articles. A conductive article for use in a system of the present disclosure may be made of conductive material (e.g., copper) or have a conductive coating.

In embodiments, a conductive article includes two or more threaded portions. In further embodiments, a conductive article for use in a system of the present disclosure is a coupler made of conductive material (e.g., copper) or have a conductive coating.

In other embodiments, a conductive article for use in a system of the present disclosure is a flexible sheet, a brush, a rod, or a wire. In other embodiments, a conductive article for use in a system of the present disclosure is a bar.

In further embodiments, a conductive article for use in a system of the present disclosure includes one or more linkages. In some embodiments, a conductive article includes two or more linkages. In such embodiments, a conductive article may be capable of pivoting in two or more directions.

A power supply may further be connected to an interior anode 1110. In some embodiments, a power supply is connected to an anode via an electrical control bar positioned at one or both ends of an interior anode.

Further, a power supply controller may be included in a system of the present disclosure. In some embodiments where a single power supply is present, a power supply controller, when in use, distributes power from a power supply to a conductive bus. Similarly, in embodiments where more than one power supply is present, a power supply controller, when in use, distributes power from a power supplies to a conductive bus. A power supply controller may distribute power to one or more locations on a conductive bus. In further embodiments, a power supply controller distributes power to two or more locations on a conductive bus.

A power supply controller may, when in operation, control a current or a voltage applied to a tubular workpiece. In various embodiments, a power supply controller, when in operation, varies a current or a voltage over time. Similarly, a power supply controller may, when in operation, vary a current density applied to the tubular workpiece over time.

Figure 12:
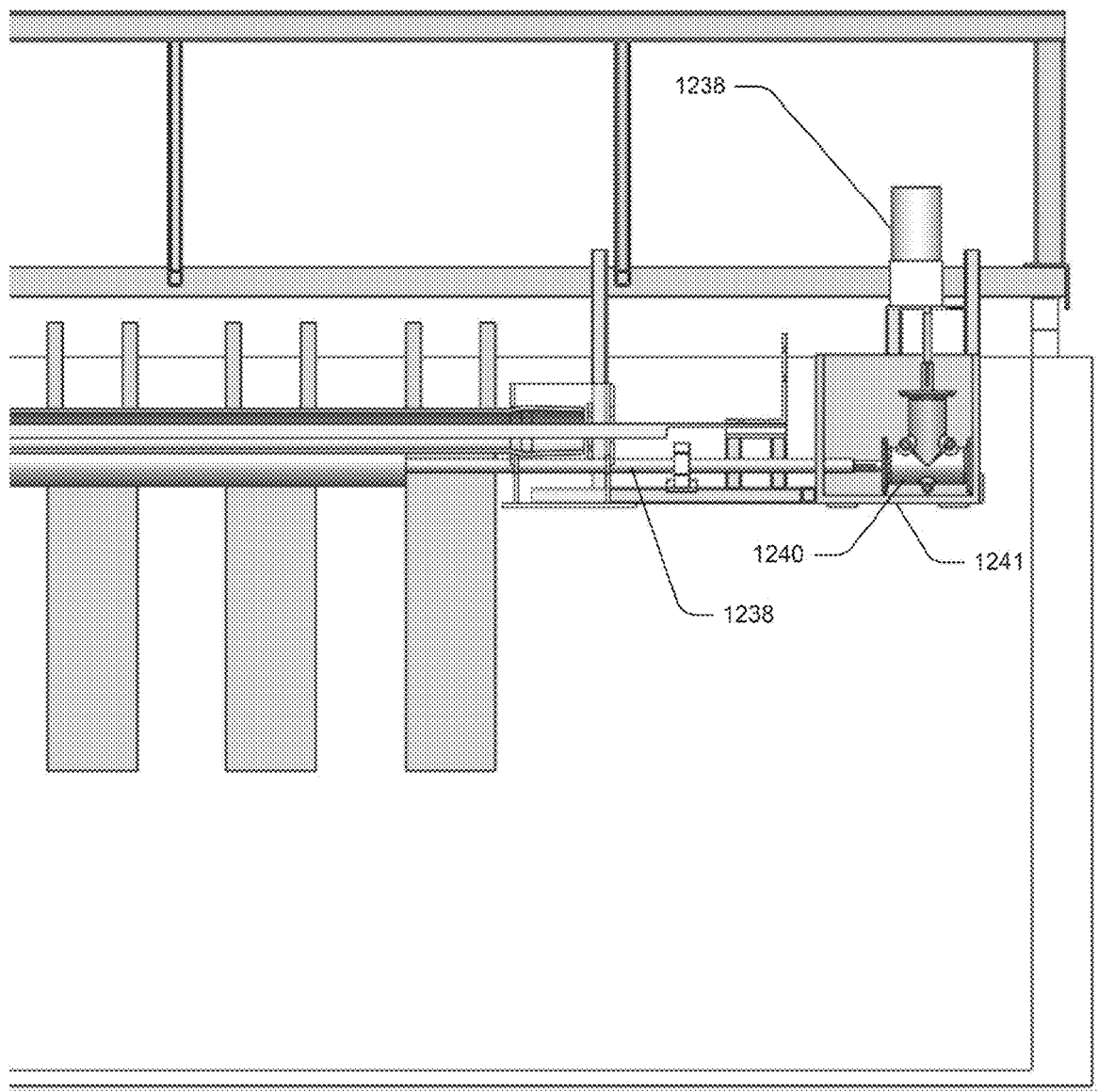
FIG. 12 provides an example of a configuration of a motor and a gear box in a system of the present disclosure.
Figure 13:
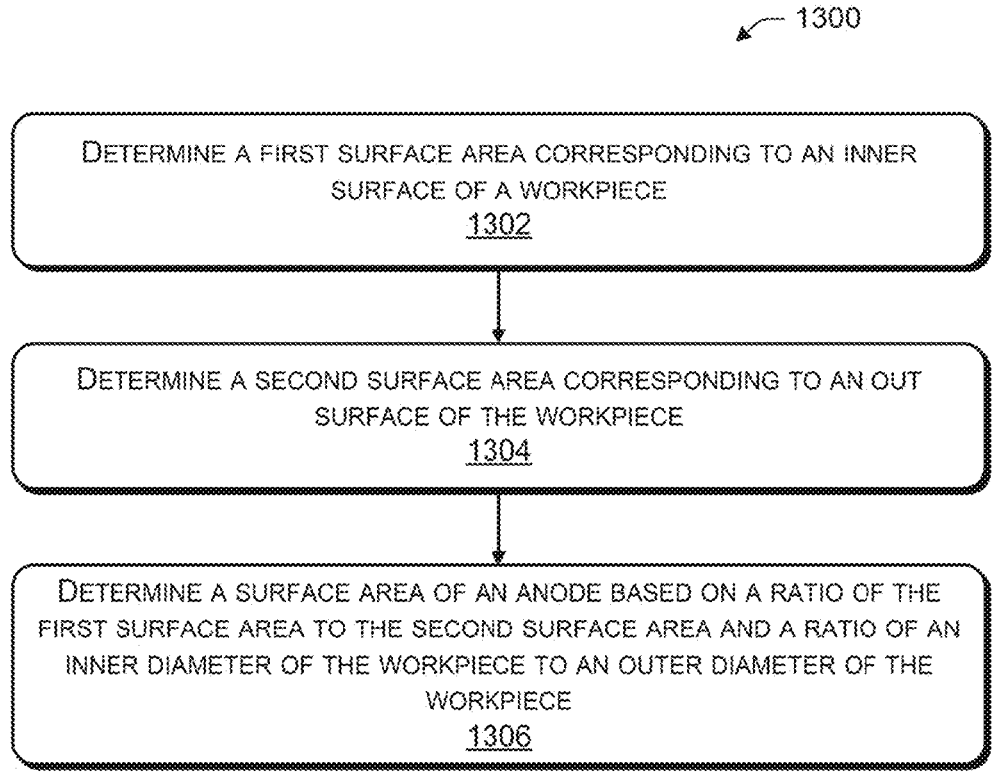
FIG. 13 is an illustrative process for producing a nanolaminate article via an apparatus of the present disclosure.

In embodiments, a motor 1238 is present, as shown in FIG. 12. A motor 1238 may produce linear or rotary motion. In some embodiments, a motor 1238, in use, rotates a gear, in the case of fixed contact point assembly systems, or a driven roller 1238, in the case of dynamic contact point assembly systems.

A motor 1238 may be housed in a suitable housing. In some embodiments, a housing is fabricated from a polymeric material (e.g., composite, thermoplastic, or thermoset) that is sealed (i.e., water tight).

A system described herein may further include a gear box 1240. Such a gear box 1240 may be in a same housing as a motor 1238, or in a second housing 1241. A motor 1238 of the present disclosure may connect to a first end of a gear box 1240. In embodiments, a gear box 1240 is a right-angle (or 90 degree) gear drive that translates linear motion from a linear motor into rotary motion. A second end of a gear box 1240 may be connected to a driven roller.

Methods for Electrodepositing Nanolaminate Coatings

Methods for electrodepositing nanolaminate coatings onto tubular workpieces using apparatuses or systems of the present disclosure are provided herein.

Generally, methods of the present disclosure include introducing a tubular workpiece to a system of the disclosure, rotating the tubular workpiece, and electrodepositing at least one electrodepositable species onto an inner surface of a tubular workpiece and an outer surface of a tubular workpiece. In embodiments, a coating on an inner surface and a coating on an outer surface may have substantially a same thickness. In other embodiments, a coating on an inner surface may be thicker than a coating on an outer surface. In still other embodiments, a coating on an inner surface may be thinner than a coating on an outer surface.

Accordingly, methods of the present disclosure include a method for producing a nanolaminate coating on a tubular workpiece comprising: (1) introducing a tubular workpiece that is substantially cylindrical, has a longitudinal axis, has a hollow cavity defined by an inner surface, and an outer surface, to a system comprising: a rack that, when in use, supports the tubular workpiece; an interior anode; and an electrolyte bath comprising an electrolyte solution having at least one electrodepositable species; (2) rotating the tubular workpiece in the rack at a rotational speed; and (3) electrodepositing the at least one electrodepositable species onto the tubular workpiece as a first nanolaminate coating and a second nanolaminate coating, the first nanolaminate coating being on at least a portion of the outer surface, the first nanolaminate coating having a first thickness; and the second nanolaminate coating being on at least a portion of the inner surface, the second nanolaminate coating having a second thickness. In some embodiments, the first nanolaminate coating and the second nanolaminate coating are deposited simultaneously. In other embodiments, the first nanolaminate coating and the second nanolaminate coating are not deposited simultaneously. In some such embodiments, the first nanolaminate coating is deposited before the second nanolaminate coating. In further embodiments, the first nanolaminate coating is deposited after the second nanolaminate coating.

In embodiments, methods of the present disclosure produce a tubular workpiece that is substantially 100% covered by two or more nanolaminate coatings. In some embodiments, a first nanolaminate coating (i.e., an outer nanolaminate coating) and a second nanolaminate coating (i.e., an inner nanolaminate coating) coating are substantially the same thickness. In other embodiments, a coating on an inner surface is thinner than a coating on an outer surface. In still other embodiments, a coating on an inner surface is thicker than a coating on an outer surface.

In embodiments, introducing a tubular workpiece to a system of the present disclosure comprises positioning an interior anode along a longitudinal axis of a tubular workpiece or an axis substantially parallel to a longitudinal axis within a hollow cavity of a tubular workpiece such that an exterior surface of an interior anode is positioned a predetermined distance from an inner surface of a tubular workpiece.

Interior anodes suitable for use in the present disclosure are described herein. For example, an interior anode used in a method of the disclosure may have a corrugated surface. In some embodiments, an exterior surface area of an anode is based on a ratio of an inner surface area of a tubular substrate to an outer surface area of a tubular workpiece, and a ratio of an inner diameter of a tubular substrate to an outer diameter of a tubular workpiece.

In methods of the present disclosure, a tubular workpiece is rotated in a system as described above. In embodiments where a system comprises a fixed contact point assembly, a tubular workpiece is rotated by a gear in physical contact with a tubular workpiece, or a coupler that is in physical contact with a tubular workpiece. In further embodiments, a coupler is in physical contact with a gear.

In embodiments, in order to prevent a marked-off portion of a tubular workpiece, a coupler or gear is in physical contact with a first end of a tubular workpiece for at least a portion of an electrodeposition process. In further embodiments, after a portion of an electrodeposition process of sufficient length such that a first end (e.g., a threaded portion of a first end) has been coated, a first end of a tubular workpiece is uncoupled from a coupler or gear, which is then be coupled to a second end of a tubular workpiece. In such methods, no marked-off portions of a tubular article are created.

In some embodiments where a system comprises a dynamic contact point assembly, a tubular workpiece is rotated by a driven roller, as described herein, which is in physical contact with a tubular workpiece. In some embodiments, a driven roller rotates a drive roller, which causes rotation of a tubular workpiece.

In embodiments, a tubular workpiece is rotated at a constant speed during an electrodeposition process. In other embodiments, a rotational speed is varied over time. In further embodiments, a varied rotational speed results in a change in a composition or a structure of a nanolaminate coating on an inner surface or an outer surface of a tubular workpiece.

Varying a rotational speed of a tubular workpiece may comprise changing a rotational speed from a first rotational speed to a second rotational speed for a period of time, and changing a second rotational speed to a first rotational speed for a period of time. In some embodiments, a first or a second rotational speed is changed to a third rotational speed for a period of time, and a third rotational speed is changed to a first rotational speed, a second rotational speed, or a fourth rotational speed.

Suitable rotational speeds may be between 0.5 rpm and 10 rpm. In some embodiments, speeds of less than 0.5 rpm, or more than 6 rpm are used. In embodiments, a rotational speed ranges from about 0.5 rpm to about 3 rpm, about 1 rpm to about 4 rpm, about 2 rpm to about 5 rpm, about 3 rpm to about 6 rpm, about 4 rpm to about 7 rpm, about 5 rpm to about 8 rpm, about 6 rpm to about 9 rpm, or about 7 rpm to about 10 rpm. In other embodiments, a rotational speed ranges from about 0.5 rpm to about 1 rpm, about 1 rpm to about 2 rpm, about 2 to about 3 rpm, about 3 rpm to about 4 rpm, about 4 to about 5 rpm, about 5 rpm to about 6 rpm, about 6 rpm to about 7 rpm, 7 to about 8 rpm, about 8 rpm to about 9 rpm, or about 9 to about 10 rpm.

Electrodepositing at least one electrodepositable species onto a tubular workpiece may comprise contacting a tubular workpiece with an electrolyte solution by submerging a tubular workpiece in an electrolyte bath, partially submerging a tubular workpiece in an electrolyte bath, or applying an electrolyte solution using other suitable means.

An electrolyte solution includes a liquid and one or more electrodepositable species, such as Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr. In some embodiments, the liquid is an ionic liquid. In some embodiments, an electrolyte solution includes one or more additives. Examples of additives include brightening agents, leveling agents, surfactants, and the like.

In embodiments, electrodepositing at least one electrodepositable species onto a tubular workpiece comprises distributing a portion of an electrolyte solution into a hollow cavity of a tubular workpiece. Electrolyte solution may be distributed into a hollow cavity of a tubular workpiece via an interior anode. In some embodiments, an electrolyte solution is distributed through a hollow cavity of an interior anode, or through a plurality of holes that extend laterally though an interior anode.

In further embodiments, electrolyte solution is distributed into a hollow cavity of a tubular workpiece via an electrolyte distribution tube. In some embodiments, an electrolyte solution is distributed through plurality of holes in an electrolyte distribution tube.

In some embodiments, methods of the present disclosure comprise positioning an exterior anode adjacent to a tubular workpiece.

In some embodiments where a tubular workpiece has one or more threaded portions, a third coating (i.e., nanolaminate thread coating) is electrodeposited over a threaded portion. In further embodiments, a nanolaminate coating over a threaded portion is thinner than a nanolaminate coating over an inner surface and a nanolaminate coating over an outer surface.

A current density applied to a threaded portion of a tubular workpiece may be reduced in order to achieve a nanolaminate coating that is thinner than a nanolaminate coating over other portions of a tubular workpiece. A current density may be reduced by positioning shielding or thieving adjacent to a threaded portion of a tubular workpiece. If a tubular workpiece has more than one threaded portion, a similar method may be utilized in order to deposit a nanolaminate coating that is thinner than a nanolaminate coating on other portions of a tubular workpiece.

In order to electrodeposit an electrodepositable species onto a tubular workpiece, a voltage or a current is applied to a tubular workpiece or a conductive article that is in contact with a tubular workpiece. In some embodiments, a voltage or current applied varies over time. Varying a voltage or current applied to a tubular workpiece may comprise changing a voltage or current from a first voltage or current to a voltage or current for a period of time, and changing a second voltage or current to a first voltage or current for a period of time. In some embodiments, a first or a second voltage or current is changed to a third voltage or current for a period of time, and a third voltage or current is changed to a first voltage or current, a second voltage or current, or a fourth voltage or current.

In embodiments, a system that includes a fixed contact point assembly is used. In some embodiments, a voltage or current is applied to an exterior surface of a tubular workpiece. In other embodiments, a voltage or current is applied to a gear that is in physical contact with a tubular workpiece, or a coupler that is in physical contact with a tubular workpiece.

In other embodiments, a system that includes a dynamic contact point assembly is used. In some embodiments, a voltage or current is applied to an exterior surface of a tubular workpiece. In other embodiments, a voltage or current is applied to a conductive roller that is in physical contact with a tubular workpiece. In still other embodiments, a voltage or current is applied to a conductive roller that is not in physical contact with a tubular workpiece, but is in electrical contact with a tubular workpiece when in use. In such embodiments, a conductive roller may be in physical contact with a conductive article (e.g., a linkage, a flexible sheet, a brush, a rod, a wire, etc.), which is in physical contact with a tubular workpiece.

A tubular workpiece may undergo pre-processing steps. For example, a tubular workpiece may be washed, etched, etc. before receiving an electrodeposited coating. Such pre-processing steps may improve adhesion of a nanolaminate coating, among other benefits.

Additionally, if a tubular workpiece is made of a plastic or polymeric material, a strike layer may first be coated onto a plastic or polymeric material. A strike layer is generally a very thin layer that is deposited on a tubular workpiece using a high current density and an electrolyte solution with a low ion concentration.

Methods of the present disclosure generally produce a tubular article as described herein. In embodiments, methods described herein produce a tubular article that is coated on substantially all of an inner surface and an outer surface, including any threaded portion(s).

In some embodiments, methods of the present disclosure produce a tubular article with a coating having from about 50 layers to about 8,000 layers. Coatings deposited onto a tubular workpiece may have from about 50 layers to about 100 layers, from about 100 layers to about 1,000 layers, from about 1,000 layers to about 2,000 layers, from about 2,000 layers to about 4,000 layers, or from about 4,000 layers to about 8,000 layers.

Each layer deposited onto a tubular workpiece may have a thickness ranging from about 5 nm to about 250 nm. Individual layers deposited may have a thickness in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, or from about 200 to about 250 nm.

In embodiments, each layer has a thickness in a range selected independently from about 2 nm to about 750 nm. In embodiments, each layer has a thickness in a range selected independently from about 2 nm to about 500 nm. In embodiments, each layer has a thickness in a range selected independently from about 2 nm to about 250 nm. In embodiments, each layer has a thickness in a range selected independently from about 2 nm to about 200 nm.

In some embodiments, methods of the present disclosure produce a tubular article with a coating having an overall thickness ranging from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 to about 250 nm, from about 1 µm to about 5 centimeters (cm), from about 1 µm to about 50 µm, from about 50 µm to about 100 µm, from about 100 µm to about 200 µm, from about 200 µm to about 500 µm, from about 500 µm to about 800 µm, from about 800 µm to about 1.2 millimeters (mm), from about 500 µm to about 1 mm, from about 1 mm to about 1.5 mm, from about 1.2 mm to about 2 mm, from about 1.8 mm to about 2.5 mm, from about 2 mm to about 3 mm, from about 2.5 mm to about 5 mm, from about 1 mm to about 5 mm, from about 5 mm to about 1 cm, from about 1 cm to about 2 cm, or from about 2 cm to about 5 cm In embodiments, a nanolaminate coating (e.g., an inner nanolaminate coating, an outer nanolaminate coating, etc.) has substantially the same thickness at two or more locations. In embodiments, a nanolaminate coating of the present disclosure has substantially the same thickness at three or more locations. In embodiments, a nanolaminate coating of the present disclosure has substantially the same thickness at four or more locations. In embodiments, a nanolaminate coating of the present disclosure has substantially the same thickness at five or more locations.

In embodiments, methods of the present disclosure produce coatings comprising at least one of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr in an amount of at least 10% (w/w). In some embodiments, each electrodepositable species is present in a concentration of at least about 5%, by weight. In some embodiments, each electrodepositable species is present in a concentration of at least about 1%, by weight. In some embodiments, each electrodepositable species is present in a concentration of at least about 0.1%, by weight. In some embodiments, each electrodepositable species is present in a concentration of at least about 0.05%, by weight. In some embodiments, each electrodepositable species is present in a concentration of at least about 0.01%, by weight. In some embodiments, each electrodepositable species is present in a concentration of at least about 0.005%, by weight. In some embodiments, each electrodepositable species is present in a concentration of at least about 0.001%, by weight.

In certain embodiments, a layer of a nanolaminate coating comprises Co. In some embodiments, a layer of a nanolaminate coating comprises aluminum. In further embodiments, a layer of a nanolaminate coating comprises Ni or Cr. In particular embodiments, a layer of a nanolaminate coating comprises Ni, Fe, and Cr. In some embodiments, a layer of a nanolaminate coating comprises Ni, Fe, Cr, and Mo.

In some embodiments, each layer of a nanolaminate coating comprises two or more, three or more, four or more, or five or more different electrodepositable species. In some embodiments, each layer comprises an alloy of at least two metals. In some embodiments, each layer comprises an alloy of at least three metals.

Illustrative alloys that may be used in a layer of a nanolaminate coating comprise Zn and Fe; Zn and Ni; Co and Ni; Ni, Co, and Mo; Ni and Fe; Ni and Cr; Cu and Zn; Cu and Sn; Ni, Co, and P; Ni, Co, W, and P; Ni, Co, and W; Ni and W; Ni, W, and P; Ni, Co, and B; Ni, Co, W, and B; or Ni, W, and B. In specific embodiments, an alloy used in a layer of a nanolaminate coating includes Ni and Fe; or Ni and Co. In still further embodiments, a layer of a nanolaminate coating comprises three or more, four or more, or five or more of Co, Cr, Mo, W, Fe, Si, Mn, and Ni.

In embodiments, each layer comprises Ni and W. In embodiments, each layer comprises Ni and Mo. In embodiments, each layer comprises Ni, Mo, and W. In embodiments, each layer comprises Ni and Cr.

In embodiments, each of layer comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB. In some embodiments, each layer comprises NiCr, NiCo, NiW, or NiCoP.

In embodiments, a first layer and a second layer of a nanolaminate coating comprise a first alloy and a second alloy, respectively, which comprise the same first and second metals. In some embodiments, a difference between a concentration of a first metal in a first alloy and a first metal in a second alloy is less than about 50%. In some embodiments, a difference between a concentration of a first metal in a first alloy and a first metal in a second alloy may be no more than about 30%. In such embodiments, a difference between a concentration of a first metal in a first alloy and a first metal in a second alloy may be no more than about 20%. In such embodiments, a difference between a concentration of a first metal in a first alloy and a first metal in a second alloy may be no more than about 10%. In further embodiments, a difference between a concentration of a first metal in a first alloy and a first metal in a second alloy is more than about 1%. In some embodiments, a difference between a concentration of a first metal in a first alloy and a first metal in a second alloy is at least than about 2%. In some embodiments, a difference between a concentration of a first metal in a first alloy and a first metal in a second alloy is at least than about 5%. In some embodiments, a difference between a concentration of a first metal in a first alloy and a first metal in a second alloy is at least than about 10%.

In some embodiments, a layer (e.g., a first layer and/or a second layer) of a nanolaminate coating includes Ni in a concentration greater than about 50% (w/w). In some embodiments, a layer of a nanolaminate coating includes Ni in a concentration greater than about 55% (w/w). In some embodiments, a layer of a nanolaminate coating includes Ni in a concentration greater than about 60% (w/w). In some embodiments, a layer of a nanolaminate coating includes Ni in a concentration greater than about 65% (w/w). In some embodiments, a layer of a nanolaminate coating includes Ni in a concentration greater than about 70% (w/w). In some embodiments, a layer of a nanolaminate coating includes Ni in a concentration greater than about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a layer of a nanolaminate coating includes Ni in a concentration less than about 99% (w/w). In some embodiments, a layer of a nanolaminate coating includes Ni in a concentration less than about 98% (w/w). In some embodiments, a layer of a nanolaminate coating includes Ni in a concentration less than about 97% (w/w). In some embodiments, a layer of a nanolaminate coating includes Ni in a concentration less than about 96% (w/w). In some embodiments, a layer of a nanolaminate coating includes Ni in a concentration less than about 70% (w/w). In some embodiments, a layer of a nanolaminate coating includes Ni in a concentration less than about 50% (w/w), about 55% (w/w), about 60% (w/w), about 65% (w/w), about 75% (w/w), about 80% (w/w), about 85% (w/w), about 90% (w/w), about 92% (w/w), about 93% (w/w), about 94% (w/w), or about 95% (w/w). In particular embodiments, a layer of a nanolaminate coating includes Ni in a concentration ranging from about 50% (w/w) to about 99% (w/w).

In additional embodiments, a layer of a nanolaminate coating comprises Co in a concentration ranging from about 5% (w/w) to about 35% (w/w). In particular embodiments, a layer of a nanolaminate coating comprises Co in a concentration ranging from about 5% (w/w) to about 10% (w/w), from about 10% (w/w) to about 15% (w/w), from about 15% (w/w) to about 20% (w/w), from about 20% (w/w) to about 25% (w/w), from about 25% (w/w) to about 30% (w/w), or from about 30% (w/w) to about 35% (w/w).

In embodiments, a layer of a nanolaminate coating comprises Cr in a concentration ranging from about 5% (w/w) to about 99% (w/w). In some embodiments, a layer of a nanolaminate coating includes Cr in a concentration greater than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a layer of a nanolaminate coating includes Cr in a concentration less than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

In embodiments, a layer of nanolaminate coating comprises Cr in a concentration ranging from about 5% (w/w) to about 35% (w/w), a layer of nanolaminate coating comprises Ni in a concentration of greater than about 90% (w/w), or both. In further embodiments, a layer of nanolaminate coating comprises Ni in a concentration ranging from about 20% (w/w) to about 50% (w/w), Cr in a concentration ranging from about 20% (w/w) to about 35% (w/w), and Mo in a concentration great than about 1.5% (w/w). In some embodiments, a layer of a nanolaminate coating comprises Cr in a concentration greater than about 7% (w/w), Mo in a concentration ranging from about 5% (w/w) to about 30% (w/w), W in a concentration less than about 3% (w/w), Fe in a concentration ranging from about 1.5% (w/w) to about 15% (w/w), Si in a concentration less than 1% (w/w), Mn in a concentration less than 3% (w/w), and a balance of Ni.

In embodiments, a layer of a coating comprises Ni in a concentration ranging from about 40% (w/w) to about 70% (w/w) and W in a concentration ranging from about 20% (w/w) to about 60% (w/w). In some such embodiments, the layer of the coating may also comprise Mo in a concentration of up to about 40% (w/w).

In embodiments, a layer of a coating comprises Ni in a concentration ranging from about 50% (w/w) to about 70% (w/w) and W in a concentration ranging from about 30% (w/w) to about 50% (w/w). In some such embodiments, the layer of the coating may also comprise Mo in a concentration of up to about 30% (w/w).

In embodiments, a layer of a coating comprises Ni in a concentration of at least about 50% (w/w), and W and Mo in a collective concentration of up to about 50% (w/w). In embodiments, a layer of a coating comprises Ni in a concentration of at least about 60% (w/w), and W and Mo in a collective concentration of up to about 40% (w/w). In particular embodiments, a layer of a coating comprises Ni in a concentration of about 60% (w/w), and W and Mo in a collective concentration of about 40% (w/w). In particular embodiments, a layer of a coating comprises Ni in a concentration of about 60% (w/w), and W in a concentration of about 40% (w/w).

In embodiments, a first layer and a second layer of a nanolaminate coating comprise a first alloy and a second alloy, respectively, which comprise the same first and second metals. In some embodiments, a difference between a concentration of a first metal in a first alloy and a first metal in a second alloy is less than about 10%, about 20%, about 30%, or about 50%. In further embodiments, a difference between a concentration of a first metal in a first alloy and a first metal in a second alloy is more than about 1%, about 2%, about 5%, or about 10%.

Any suitable tubular workpiece may be used in methods of the present disclosure. For example, a tubular workpiece may be formed from a steel alloy. In some embodiments, a steel alloy comprises C and Fe; C, Fe, and Mo; or C, Fe, Mo, and Co. In other embodiments, as described elsewhere herein, a tubular workpiece is formed of a plastic or a polymeric material.

Embodiments

The following embodiments are included within the scope of this disclosure.

1. A tubular article, comprising:
a tubular workpiece having an interior surface, an exterior surface and a length of at least one meter (m); and
nanolaminate coatings comprising:
a first nanolaminate coating on the interior surface; and
a second nanolaminate coating on the exterior surface, the first and second nanolaminate coatings covering substantially 100% of the interior surface and the exterior surface, respectively.

2. A tubular article, comprising:
a tubular workpiece having an interior surface and an exterior surface; and
nanolaminate coatings comprising:
a first nanolaminate coating on the interior surface; and
a second nanolaminate coating on the exterior surface, the second nanolaminate coating having a thickness that is less than a thickness of the first nanolaminate coating.

3. The tubular article of embodiment 2, further comprising:
a first threaded portion of the tubular workpiece; and
a third nanolaminate coating on the first threaded portion, the third nanolaminate coating having a thickness that is less than the thickness of the first nanolaminate coating.

4. A tubular article, comprising:
a tubular workpiece having an interior surface and an exterior surface, the tubular workpiece comprising a first threaded portion and nanolaminate coatings comprising:

a first nanolaminate coating on the interior surface;

a second nanolaminate coating on the exterior surface; and a third nanolaminate coating on the first threaded portion, the third nanolaminate coating having a thickness that is less than a thickness of the first nanolaminate coating and a thickness of the second nanolaminate coating.

5. The tubular article of embodiment 1 or 4, wherein the thickness of the first nanolaminate coating and the thickness of the second nanolaminate coating are substantially the same.

6. The tubular article of embodiment 1 or 4, wherein the first nanolaminate coating has a thickness that is greater than a thickness of the second nanolaminate coating.

7. The tubular article of any one of embodiments 2-6, wherein the interior surface and the exterior surface are substantially 100% covered by the nanolaminate coatings.

8. The tubular article of any one of embodiments 3-7, wherein the thickness of the third nanolaminate coating ranges from about 50 micrometer (μm) to about 150 μm.

9. The tubular article of any one of embodiments 3-8, wherein the thickness of the third nanolaminate coating does not prevent joining the first threaded portion of the tubular workpiece with a corresponding threaded portion of a second workpiece, such that the joining does not compromise the third nanolaminate coating.

10. The tubular workpiece of any one of embodiments 3-9, further comprising a second threaded portion, the third nanolaminate coating being on the second threaded portion.

11. The tubular article of any one of embodiments 1-10, wherein the tubular workpiece comprises a steel alloy.

12. The tubular article of embodiment 11, wherein the steel alloy comprises:

(A) carbon (C) and iron (Fe);

(B) C, Fe, and molybdenum (Mo); or (C) C, Fe, Mo, and cobalt (Co).

13. The tubular article of any one of embodiments 1-10, wherein the tubular workpiece comprises a plastic, and the tubular article further comprises a strike layer on the plastic.

14. The tubular article of embodiment 13, wherein the plastic comprises an arylamide, an acrylamide, a polybenzimidazole (PBI), a polyetherimide, a polyetherketoneketone (PEKK), a polyether ether ketone (PEEK), a polyamide, a polyimide, a polyamide-imide, a polyphenylene oxide (PPO), a polystyrene (PS), a polyphenylene oxide (PPO), a polystyrene (PS), a polyphthalamide (PPA), a polyvinyl alcohol (PVA), an acrylonitrile butadiene styrene (ABS), a polycarbonate (PC), a polylactic acid (PLA), a PC/ABS, a cellulose fiber, a polyphenylsulfone (PPSU), a thermoset, a PBI-PEEK, a urea, an epoxy, a cyanate ester, a polyurethane, or any combination thereof.

15. The tubular article of embodiment 13 or 14, wherein the strike layer comprises silver (Ag), aluminum (Al), gold (Au), boron (B), beryllium (Be), carbon (C), cobalt (Co), chromium (Cr), copper (Cu), iron (Fe), mercury (Hg), indium (In), iridium (Ir), magnesium (Mg), manganese (Mn), molybdenum (Mo), niobium (Nb), neodymium (Nd), nickel (Ni), phosphorous (P), palladium (Pd), platinum (Pt), rhenium (Re), rhodium (Rh), antimony (Sb), silicon (Si), tin (Sn), lead (Pb), tantalum (Ta), titanium (Ti), tungsten (W), vanadium (V), zinc (Zn), zirconium (Zr), or alloys thereof.

16. The tubular article of any one of embodiments 1-15, wherein the tubular workpiece is a connector for joining two oil country tubular goods (OCTG).

17. The tubular article of any one of embodiments 1-15, wherein the tubular workpiece is an OCTG or a line pipe.

18. The tubular article of any one of embodiments 1-17, wherein the tubular article is resistant to $H_2S$-induced sulfide stress cracking under sour service environments having a $H_2S$ partial pressure greater than 0.05 psi (0.3 kPa) when tested according to NACE TM0175 or ASTM E399.

19. The tubular article of any one of embodiments 1-18, wherein:

(A) the tubular article is resistant to cracking when subjected to tensile load of 80% of the yield strength of the tubular article in a sulfide stress cracking environment for 720 hours according to National Association of Corrosion Engineers (NACE) TM0177 standardized testing in a service environment with a pH ranging from about 3 to about 7;

(B) the nanolaminate coatings do not lose more than 25% of their mass when subjected to NACE TM0193-2016 standardized testing with 15% HCl at 75° Celsius for 6 hours;

(C) the tubular article is resistant to cracking of the nanolaminate coating when exposed to autoclave environments per NACE standard TM0175 or American Society for Testing and Materials (ASTM) E399 standardized testing for high sour gas conditions;

(D) the tubular article is resistance to pitting wherein individual pits are not deeper than 10% of the nanolaminate coating when tested according to ASTM G48 testing standards; and/or (E) the tubular article is resistant to hydrogen sulfide-induces stress cracking or pitting in excess of 10% of a thickness of the first or second nanolaminate coating in a service environment with a pH ranging from about 3 to about 7.

20. The tubular article of any one of embodiments 1-19, wherein the tubular article is resistant to hydrogen sulfide-induces stress cracking or pitting in excess of 10% of a thickness of the first or second nanolaminate coating in a service environment with a pH ranging from about 7 to about 6.5, about 6.5 to about 6, about 6 to about 5.5, about 5.5 to about 5, about 5 to about 4.5, about 4.5 to about 4, about 4 to about 3.5, or about 3.5 to about 3.

21. The tubular article of any one of embodiments 1-20, wherein the first nanolaminate coating and the second nanolaminate coating each comprise a single layer.

22. The tubular article of any one of embodiments 3-21, wherein the first nanolaminate coating, the second nanolaminate coating, and the third nanolaminate coating each comprise at least two layers.

23. The tubular article of any one of embodiments 1-22, wherein the first nanolaminate coating is substantially the same thickness at two or more, three or more, four or more, or five or more locations, wherein the second nanolaminate coating is substantially the same thickness at two or more, three or more, four or more, or five or more locations, or both.

24. The tubular article of any one of embodiments 1-23, wherein the first nanolaminate coating and the second nanolaminate coating each comprise a series of alternating layers.

25. The tubular article of any one of embodiments 3-23, wherein the third nanolaminate coating comprises a series of alternating layers.

26. The tubular article of embodiment 24 or 25, wherein the series of alternating layers comprises:

a first layer comprising at least one electrodepositable species independently selected from Ag, Al, Au, B, Be, C, Co, (Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr; and a second layer comprising at least one electrodepositable species independently selected from Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr.

27. The tubular article of embodiment 26, wherein:
the first layer comprises each electrodepositable species of the at least one electrodepositable species in a concentration of at least 0.01% (w/w); and
the second layer comprises each electrodepositable species of the at least one electrodepositable species in a concentration of at least 0.01% (w/w).

28. The tubular article of embodiment 26 or 27, wherein the first layer or the second layer comprises Ni in a concentration ranging from about 50% (w/w) to about 99% (w/w).

29. The tubular article of any one of embodiments 26-28, wherein the first layer or the second layer comprises Ni in a concentration greater than about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

30. The tubular article of any one of embodiments 26-29, wherein the first layer or the second layer comprises Co in a concentration ranging from about 5% (w/w) to about 35% (w/w).

31. The tubular article of any one of embodiments 26-30, wherein the first layer or the second layer comprises Co in a concentration ranging from about 5% (w/w) to about 10% (w/w), about 10% (w/w) to about 15% (w/w), about 15% (w/w) to about 20% (w/w), about 20% (w/w) to about 25% (w/w), about 25% (w/w) to about 30% (w/w), or about 30% (w/w) to about 35% (w/w).

32. The tubular article of any one of embodiments 26-31, wherein the first layer or the second layer comprises Cr in a concentration ranging from about 5% (w/w) to about 99% (w/w).

33. The tubular article of any one of embodiments 26-32, wherein the first layer or the second layer comprises Cr in a concentration greater than: about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

34. The tubular article of any one of embodiments 26-33, wherein the first layer or the second layer comprises Cr in a concentration less than: about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

35. The tubular article of any of embodiments 26-35, wherein the first layer and the second layer comprise Ni and W.

36. The tubular article of embodiment 35, wherein the first layer and the second layer further comprise Mo.

37. The tubular article of embodiment 35 or 36, wherein the first layer, the second, layer, or both, independently comprise Ni in a concentration ranging from about 40% (w/w) to about 70% (w/w);
wherein the first layer, the second layer, or both, independently comprise W in a concentration ranging from about 30% (w/w) to about 50% (w/w);
or both.

38. The tubular article of embodiment 37, wherein the first layer, the second layer, or both, independently comprise Mo in a concentration of up to about 40% (w/w).

39. The tubular article of any one of embodiments 35-38, wherein the first layer, the second layer, or both, independently comprise Ni in a concentration of about 60% (w/w), and W in a concentration of about 40% (w/w).

40. The tubular article of any one of embodiments 24-39, wherein each of the layers in the series of alternating layers has a thickness independently selected from about 5 nanometers (nm) to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, or from about 200 to about 250 nm.

41. The tubular article of any one of embodiments 3-40, wherein the number of layers in the first nanolaminate coating, the second nanolaminate coating, and the third nanolaminate coating comprise a same number of layers.

42. The tubular article of embodiment 41, wherein the same number of layers ranges from about 50 layers to about 8,000 layers.

43. The tubular article of embodiment 41 or 42, wherein the same number of layers ranges from about 50 layers to about 100 layers; from about 100 layers to about 1,000 layers, from about 1,000 layers to about 2,000 layers, from about 2,000 layers to about 4,000 layers, or from about 4,000 layers to about 8,000 layers.

44. The tubular article of any one of embodiments 3-43, wherein the first nanolaminate coating, the second nanolaminate coating, and the third nanolaminate coating independently have a thickness ranging from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 to about 250 nm, from about 1 µm to about 5 centimeters (cm), from about 1 µm to about 50 µm, from about 50 µm to about 100 µm, from about 100 µm to about 200 µm, from about 200 µm to about 500 µm, from about 500 µm to about 800 µm, from about 800 µm to about 1.2 millimeters (mm), from about 500 µm to about 1 mm, from about 1 mm to about 1.5 mm, from about 1.2 mm to about 2 mm, from about 1.8 mm to about 2.5 mm, from about 2 mm to about 3 mm, from about 2.5 mm to about 5 mm, from about 1 mm to about 5 mm, from about 5 mm to about 1 cm, from about 1 cm to about 2 cm, or from about 2 cm to about 5 cm.

45. The tubular article of any one of embodiments 2-44, wherein the tubular workpiece has a length ranging from about 0.1 meters (m) to 15 m.

46. The tubular article of any one of embodiments 1-45, wherein the tubular workpiece has a length ranging from about 0.10 m to about 0.15 m; from about 0.10 m to about 0.5 m; from about 0.10 m to about 1.0 m; from about 0.10 m to about 0.4 m; from about 0.10 m to about 1.51 m; from about 0.10 m to about 10.7 m; from about 0.10 m to about 13.8 m; from about 0.15 m to about 0.4 m; from about 0.15 m to about 1.51 m; from about 0.15 m to about 10.7 m; from about 0.15 m to about 13.8 m; from about 0.3 m to about 0.7 m; from about 0.6 m to about 1.51 m; from about 1 m to about 2 m; from about 1 m to about 5 m; from about 1 m to about 14.5 m; from about 1.5 m to about 3.1 m; from about 1.5 m to about 6.1 m; from about 2 m to about 3 m; from about 3 m to about 4 m; from about 3 m to about 4.6 m; from about 4 m to about 5 m; from about 4.5 m to about 6.1 m; from about m to about 6 m; from about 5 m to about 10 m; from about 5 m to about 14.5 m; from about 6 m to about 7 m; from about 6 m to about 7.7 m; from about 6 m to about 11 m; from about 7 m to about 8 m; from about 7.6 m to about 9.2 m; from about 8 m to about 9 m; from about 9 m to about 10 m; from about 9.1 m to about 10.7 m; from about 10 m to about 11 m; from about 10 m to about 14.5 m; from about 10.6 m to about 12.2 m; from about 10.6 m to about 13.8 m; from about 11 m to about 12 m; from about 12 m to about 13 m; from about 12.1 m to about 13.8 m; from about 13 m to about 13.5 m; from about 13.5 m to about 14 m; or from about 14 m to about 14.5 m.

47. An apparatus comprising:
a rack comprising:
at least one support structure configured to support a tubular workpiece having a substantially cylindrical shape, a hollow cavity defined by an inner surface having a first surface area, an outer surface having a second surface area, and a longitudinal axis; and
a contact point assembly configured to rotate the tubular workpiece, enable electrical contact with the tubular workpiece, or both.

48. The apparatus of embodiment 47, further comprising an interior anode supported by the rack, the interior anode having an exterior surface, the interior anode configured to be positioned substantially along the longitudinal axis or an axis substantially parallel to the longitudinal axis within the hollow cavity of the tubular workpiece.

49. The apparatus of embodiment 47 and 48, further comprising a conductive bus supported by the rack, the conductive bus configured to be in electrical contact with the tubular workpiece via the contact point assembly, such that the tubular workpiece is free to rotate while maintaining electrical contact with the conductive bus.

50. The apparatus of embodiment 49, wherein the contact point assembly comprises a gear, the gear comprising a threaded portion, and the conductive bus being configured to be in electrical contact with the tubular workpiece via the gear.

51. The apparatus of embodiment 50, further comprising a coupler, the coupler comprising:
a first threaded portion that corresponds to the threaded portion of the gear, such that the threaded portion of the gear and the first threaded portion of the coupler may be joined together; and
a second threaded portion that corresponds to the threaded portion of the tubular workpiece, such that the threaded portion of the tubular workpiece and the second threaded portion of the coupler may be joined together.

52. The apparatus of embodiment 51, wherein the threaded portion of the gear corresponds to a threaded portion of the tubular workpiece, such that the threaded portion of the gear and the threaded portion of the tubular workpiece may be joined together.

53. The apparatus of any one of embodiments 47-52, wherein the contact point assembly comprises a conductive article.

54. The apparatus of any one of embodiments 48-53, wherein the exterior surface of the interior anode is positioned a predetermined distance from the inner surface of the tubular workpiece.

55. The apparatus of any one of embodiments 47 or 49-54, wherein the at least one support structure comprises a rod positioned substantially along the longitudinal axis or an axis substantially parallel to the longitudinal axis within the hollow cavity of the tubular workpiece.

56. An apparatus comprising:
a rack configured to support a tubular workpiece, wherein the tubular workpiece is substantially cylindrical, and comprises: a hollow cavity defined by an inner surface having a first surface area, a longitudinal axis, and an outer surface having a second surface area, the rack comprising:
a conductive bus;
a dynamic contact point assembly electrically coupled to the conductive bus, such that the tubular workpiece and the conductive bus are in electrical contact via the dynamic contact point assembly during rotation of the tubular workpiece;
a drive roller that is substantially cylindrical in shape, the drive roller configured to maintain physical contact with the tubular workpiece; and
a driven roller that is substantially cylindrical in shape, the driven roller configured to maintain physical contact with the tubular workpiece.

57. The apparatus of embodiment 56, wherein the dynamic contact point assembly includes a conductive roller assembly comprising a conductive roller that is configured to be in electrical contact with the tubular workpiece.

58. The apparatus of embodiment 57, wherein the conductive roller assembly further comprises:
a first bearing assembly positioned at a first end of the conductive roller; and
a second bearing assembly positioned at a second end of the conductive roller, the first bearing assembly and the second bearing assembly being arranged such that the conductive roller, in operation, is free to rotate with the tubular workpiece while maintaining electrical contact with the conductive bus.

59. The apparatus of embodiment 58, wherein the first bearing assembly and the second bearing assembly comprise a first needle roller bearing and a second needle roller bearing, respectively, the first needle roller bearing and the second needle roller bearing each having a plurality of cylindrical rollers that are configured to be in electrical contact with the conductive roller and the first needle roller bearing or the second needle roller bearing, respectively.

60. The apparatus of embodiment 59, wherein the first needle roller bearing or the second needle roller bearing is sheathed in a bearing housing, the bearing housing joined to the conductive bus via a conductive article.

61. The apparatus of embodiment 60, wherein the bearing housing is joined to the conductive bus via a flexible material.

62. The apparatus of embodiment 61, wherein the bearing housing is coupled to the conductive article via a mechanical fastener or an adhesive.

63. The apparatus of any one of embodiments 56-62, further comprising an interior anode having an exterior surface, the interior anode configured to be positioned along the longitudinal axis of the tubular workpiece or an axis substantially parallel to the longitudinal axis within the hollow cavity of the tubular workpiece such that the exterior surface of the interior anode is positioned a predetermined distance from the inner surface of the tubular workpiece.

64. The apparatus of any one of embodiments 47-63, wherein the at least one support structure is configured to support a plurality of tubular workpieces that comprises the tubular workpiece.

65. The apparatus of embodiment 64, wherein the contact point assembly is configured to rotate each tubular workpiece of the plurality of tubular workpieces around a respective longitudinal axis.

66. The apparatus of embodiment 65, wherein the contact point assembly is configured to rotate each of the plurality of tubular workpieces at the same speed.

67. The apparatus of any one of embodiments 64-66, wherein the plurality of tubular workpieces is arranged in a planar configuration or a polygonal configuration.

68. The apparatus of any one of embodiments 64-67, wherein individual workpieces of the plurality of tubular workpieces are coupled in serial with a plurality of couplers.

69. The apparatus of any one of embodiments 64-68, wherein the plurality of workpieces comprises at least three, at least four, at least five, or at least 10 tubular workpieces.

70. The apparatus of any of embodiments 49-69, wherein the conductive bus is configured to maintain electrical contact with the outer surface of the tubular workpiece.

71. The apparatus of any of embodiments 49-70, wherein the conductive bus is configured to be in electrical contact with the exterior surface of the tubular workpiece in at least two places.

72. The apparatus of any of embodiments 49-71, wherein the conductive bus is configured to be in electrical contact with the exterior surface of the tubular workpiece in at least three places.

73. The apparatus of any one of embodiments 53-61 or 65-72, wherein the conductive bus is configured to be in electrical contact with the tubular workpiece via the conductive article, which is configured to maintain physical contact with the tubular workpiece during rotation of the tubular workpiece.

74. The apparatus of any one of embodiments 53-61 or 65-73, wherein the conductive article is a flexible sheet, a brush, a rod, or a wire.

75. The apparatus of any one of embodiments 53-61 or 65-74, wherein the conductive article comprises two or more linkages.

76. The apparatus of any one of embodiments 53-61 or 65-75, wherein the conductive article comprises two or more threaded portions.

77. The apparatus of any one of embodiments 49-76, wherein the conductive bus is a bus bar that is positioned substantially parallel to the longitudinal axis 78. The apparatus of any one of embodiments 49-61 or 69-77, further comprising a guide coupled to the rack, the guide configured to maintain the interior anode in position.

79. The apparatus of any one of embodiments 49-61 or 69-78, wherein the interior anode is columnar or tubular, the interior anode having a diameter that is smaller than an inner diameter of the tubular workpiece.

80. The apparatus of any one of embodiments 49-61 or 69-79, wherein the exterior surface of the interior anode is corrugated.

81. The apparatus of any one of embodiments 49-61 or 69-80, wherein the interior anode has a hollow cavity.

82. The apparatus of any one of embodiments 49-61 or 69-81, wherein the interior anode has a plurality of holes that extend laterally through the interior anode.

83. The apparatus of embodiment 82, wherein a number of a subset of the plurality of holes that is in a predetermined area of the interior anode varies along a length of the interior anode.

84. The apparatus of embodiment 82 or 83, wherein diameters of individual holes of the plurality holes vary along a length of the interior anode.

85. The apparatus of any one of embodiments 47-84, further comprising an exterior anode having a length that is less than or equal to a length of the tubular workpiece, the exterior anode being adjacent to the tubular workpiece at a second predetermined distance from an exterior surface of the tubular workpiece 86. The apparatus of embodiment 85, wherein the exterior anode is positioned substantially parallel to the longitudinal axis at a substantially uniform distance from the exterior surface of the tubular workpiece.

87. The apparatus of any one of embodiments 49-53 or 69-86, wherein:
the tubular workpiece has an outer diameter, and the hollow cavity of the tubular workpiece has an inner diameter;
the interior anode has a third surface area; and
the third surface area is based on a ratio of the first surface area to the second surface area and a ratio of the inner diameter to the outer diameter.

88. The apparatus of any one of embodiments 48-61 or 69-87, wherein the exterior surface of the interior anode has a surface area based on:
a surface area of an inner surface of the tubular workpiece; and
a ratio of the predetermined distance to the second predetermined distance.

89. The apparatus of any one of embodiments 47-88, further comprising shielding or thieving positioned adjacent to the tubular workpiece.

90. The apparatus of embodiment 89 wherein:
the tubular workpiece has a first threaded portion;
at least a portion of the shielding or thieving is positioned adjacent to the first threaded portion between the tubular workpiece and the interior anode or the exterior anode.

91. The apparatus of embodiment 89 or 90, wherein:
the tubular workpiece has a second threaded portion; and
at least a portion of the shielding or thieving is positioned adjacent to the second threaded portion between the tubular workpiece and the interior anode or the exterior anode.

92. The apparatus of any one of embodiments 89-91, wherein at least the portion of the shielding is substantially circular, semi-circular, or rectangular.

93. The apparatus of any one of embodiments 89-92, wherein at least the portion of the shielding is substantially cuboidal, substantially cylindrical, or substantially semi-cylindrical.

94. The apparatus of any one of embodiments 89-93, wherein at least the portion of the shielding is positioned between the tubular workpiece and the interior anode.

95. The apparatus of any one of embodiments 89-94, wherein at least the portion of the shielding is positioned between the tubular workpiece and the exterior anode.

96. The apparatus of any one of embodiments 89-95, wherein the shielding comprises acrylic.

97. The apparatus of any one of embodiments 47-96, wherein the rack is configured to maintain the tubular workpiece with its longitudinal axis at an incline ranging from about 0.5 degrees to about 2.5 degrees relative to horizontal.

98. The apparatus of embodiment 97, wherein the incline ranges from about 0.5 degrees to about 1 degree; from about 1 degree to about 1.5 degrees; from about 1.5 degrees to about 2 degrees; or from about 2 degrees to about 2.5 degrees.

99. The apparatus of any one of embodiments 47-98, wherein the tubular workpiece has a length ranging from about 0.1 meters (m) to 15 m.

100. The apparatus of any one of embodiments 47-99, wherein the tubular workpiece has a length ranging from about 0.10 m to about 0.15 m; from about 0.10 m to about 0.5 m; from about 0.10 m to about 1.0 m; from about 0.10 m to about 0.4 m; from about 0.10 m to about 1.51 m; from about 0.10 m to about 10.7 m; from about 0.10 m to about 13.8 m; from about 0.15 m to about 0.4 m; from about 0.15 m to about 1.51 m; from about 0.15 m to about 10.7 m; from about 0.15 m to about 13.8 m; from about 0.3 m to about 0.7 m; from about 0.6 m to about 1.51 m; from about 1 m to about 2 m; from about 1 m to about 5 m; from about 1 m to about 14.5 m; from about 1.5 m to about 3.1 m; from about 1.5 m to about 6.1 m; from about 2 m to about 3 m; from about 3 m to about 4 m; from about 3 m to about 4.6 m; from about 4 m to about 5 m; from about 4.5 m to about 6.1 m; from about 5 m to about 6 m; from about 5 m to about 10 m; from about 5 m to about 14.5 m; from about 6 m to about 7 m; from about 6 m to about 7.7 m; from about 6 m to about 11 m; from about 7 m to about 8 m; from about 7.6 m to about 9.2 m; from about 8 m to about 9 m; from about 9 m to about 10 m; from about 9.1 m to about 10.7 m; from about 10 m to about 11 m; from about 10 m to about 14.5 m; from about 10.6 m to about 12.2 m; from about 10.6 m to about 13.8 m; from about 11 m to about 12 m; from about 12 m to about 13 m; from about 12.1 m to about 13.8 m; from about 13 m to about 13.5 m; from about 13.5 m to about 14 m; or from about 14 m to about 14.5 m.

101. The apparatus of any one of embodiments 64-100, wherein the plurality of tubular workpieces have substantially a same length, substantially a same inner diameter, a same outer diameter, or a combination thereof.

102. An electroplating system comprising:
a tubular workpiece having a substantially cylindrical shape, a hollow cavity defined by an inner surface of the tubular workpiece, and a longitudinal axis; and
an apparatus of any one of embodiments 47-101.

103. The electroplating system of embodiment 102, further comprising an electrolyte bath.

104. The electroplating system of embodiment 102 or 103, further comprising a process tank that, in operation, houses the rack and the electrolyte bath.

105. The electroplating system of any one of embodiments 102-104, wherein the electroplating system further comprises an electrolyte distribution tube positioned adjacent to the interior anode within the hollow cavity of the tubular workpiece.

106. The electroplating system of embodiment 105, wherein the electrolyte distribution tube has a plurality of holes that extend laterally through the electrolyte distribution tube.

107. The electroplating system of embodiment 106, wherein a number of a subset of the plurality of holes that is in a predetermined area of the electrolyte distribution tube varies along a length of the electrolyte distribution tube.

108. The electroplating system of embodiment 106 or 107, wherein diameters of individual holes of the plurality holes vary along a length of the electrolyte distribution tube.

109. The electroplating system of any one of embodiments 102-108, further comprising a flow control unit to distribute an electrolyte solution through a process tank.

110. The electroplating system of embodiment 109, wherein the flow control unit, in operation, introduces an electrolyte bath into the hollow cavity of the tubular workpiece.

111. The electroplating system of embodiment 109 or 110, wherein the flow control unit, in operation, transmits at least a portion of the electrolyte bath through the plurality of holes in the electrolyte distribution tube.

112. The electroplating system of any one of embodiments 109-111, wherein the flow control unit, in operation, transmits at least a portion of the electrolyte bath through the plurality of holes in the interior anode.

113. The electroplating system of any one of embodiments 102-112, further comprising: a power supply electrically coupled to the interior anode; and a power supply controller that, in operation, controls at least one of a current and a voltage applied to the tubular workpiece.

114. The electroplating system of embodiment 113, wherein the power supply controller, in operation, controls a current density applied to the tubular workpiece, wherein the current density varies over time.

115. The electroplating system of embodiment 113 or 114, further comprising an exterior anode electrically coupled to the power supply, wherein the power supply controller, in operation, controls at least one of a current and a voltage applied to the tubular workpiece.

116. The electroplating system of any one of embodiments 113-115, wherein the power supply is a single power supply and wherein the power supply controller, in operation, distributes power supplied by the power supply to the conductive bus.

117. The electroplating system of any one of embodiments 113-116, wherein the power supply comprises two or more power supply devices; and the power supply controller, in operation, distributes power supplied by the two or more power supply devices to the conductive bus.

118. The electroplating system of any one of embodiments 113-117, wherein the power supply controller, in operation, distributes power supplied by the power supply to at least one location on the conductive bus.

119. The electroplating system of any one of embodiments 113-118, wherein the power supply controller, in operation, distributes power supplied by the power supply to at least two locations, at least three locations, at least four locations, or at least five locations on the conductive bus.

120. The electroplating system of any one of embodiments 113-119, wherein the interior anode is positioned within a fabric material, the fabric material comprising polypropylene, napped poly, cotton, synel, canton flannel, mono-filament polypropylene, nylon, polypropylene microfilet, cotton duck, felt, or polyester.

121. The electroplating system of any one of embodiments 102-120, further comprising a motor coupled to the contact point assembly and configured to provide rotational motion to the contact point assembly.

122. A method for producing a nanolaminate coating on a tubular workpiece, the method comprising:
introducing a tubular workpiece that is substantially cylindrical, has a longitudinal axis, has a hollow cavity defined by an inner surface, and an outer surface, to a system comprising:
a rack that, in operation, supports the tubular workpiece;
an interior anode; and an electrolyte bath comprising an electrolyte solution having an electrodepositable species;

rotating the tubular workpiece in the rack at a rotational speed; and electrodepositing the electrodepositable species onto the tubular workpiece as a first nanolaminate coating and a second nanolaminate coating, the first nanolaminate coating being on at least a portion of the outer surface, the first nanolaminate coating having a first thickness; and the second nanolaminate coating being on at least a portion of the inner surface, the second nanolaminate coating having a second thickness.

123. The method of embodiment 122, wherein the first thickness is less than the second thickness.

124. The method of embodiment 122 or 123, wherein the tubular workpiece has a first threaded portion, and the method further comprises electrodepositing the electrodepositable species as a third nanolaminate coating on the first threaded portion, the third nanolaminate coating having a third thickness that is less than the first thickness and the second thickness.

125. The method of embodiment 124, wherein the electrodepositing the electrodepositable species as a third nanolaminate coating comprises reducing the current density at the first threaded portion.

126. The method of embodiment 125, wherein the reducing the current density comprises positioning shielding or thieving adjacent to the first threaded portion.

127. The method of any one of embodiments 122-126, wherein the tubular workpiece has a second threaded portion, and the method further comprises electrodepositing the electrodepositable species as the third nanolaminate coating on the second threaded portion.

128. The method of any one of embodiments 122-127, wherein the electrodepositing comprises applying a voltage or a current to a conductive article in contact with the tubular workpiece.

129. The method of any one of embodiments 122-128, wherein the electrodepositing comprises applying a voltage or a current to a gear or a coupler in physical contact with the tubular workpiece.

130. The method of any one of embodiments 122-128, wherein the electrodepositing comprises applying a voltage or a current to a conductive roller in electrical contact with the tubular workpiece.

131. The method of any one of embodiments 128-130, comprising varying the voltage or current over time.

132. The method of any one of embodiments 122-131, wherein the rotating the tubular workpiece comprises varying the rotational speed over time, such that a composition of the first nanolaminate coating or the second nanolaminate coating is changed.

133. The method of any one of embodiments 122-132, wherein the rotational speed ranges from about 0.5 revolutions per minute (rpm) to about 10 rpm.

134. The method of embodiment 132 or 133, wherein the varying the rotational speed over time comprises:

changing the rotational speed from a first rotational speed to a second rotational speed; and changing the rotational speed from the second rotational speed to the first rotational speed.

135. The method of embodiment 134, wherein the first rotational speed, the second rotational speed, or both, ranges from about 0.5 rpm to about 1 rpm, about 1 rpm to about 2 rpm, 2 to about 3 rpm, about 3 rpm to about 4 rpm, 4 to about 5 rpm, about 5 rpm to about 6 rpm, about 6 rpm to about 7 rpm, 7 to about 8 rpm, about 8 rpm to about 9 rpm, or about 9 to about 10 rpm.

136. The method of any one of embodiments 122-135, wherein the varying the rotational speed over time further comprises:

changing the rotational speed from the first rotational speed or the second rotational speed to a third rotational speed; and changing the rotational speed from the third rotational speed to the first rotational speed, the second rotational speed, or a fourth rotational speed.

137. The method of embodiment 136, wherein the first rotational speed, the second rotational speed, the third rotational speed, or the fourth rotational speed ranges from about 0.5 to about 10 rpm.

138. The method of any one of embodiments 122-137, wherein the tubular workpiece is rotated by a driven roller that is substantially cylindrical in shape and is in physical contact with the tubular workpiece.

139. The method of any one of embodiments 122-137, wherein the tubular workpiece is rotated by a gear or a coupler in physical contact with the tubular workpiece.

140. The method of any one of embodiments 122-139, wherein introducing the tubular workpiece to the system comprises positioning the interior anode along the longitudinal axis of the tubular workpiece or an axis substantially parallel to the longitudinal axis within the hollow cavity of the tubular workpiece such that an exterior surface of the interior anode is positioned a predetermined distance from the inner surface of the tubular workpiece.

141. The method of any one of embodiments 122-140, wherein the interior anode has a corrugated surface.

142. The method of any one of embodiments 122-141, wherein:

the inner surface of the tubular workpiece has a first surface area and the outer surface of the tubular workpiece has a second surface area the tubular workpiece has an outer diameter and the hollow cavity of the tubular workpiece has an inner diameter;

the interior anode has a third surface area; and the third surface area is based on a ratio of the first surface area to the second surface area and a ratio of the inner diameter to the outer diameter.

143. The method of any one of embodiments 122-142, wherein the electrodepositing the electrodepositable species comprises distributing a portion of the electrolyte solution into the hollow cavity of the tubular workpiece via a hollow cavity of the interior anode or a plurality of holes that extend laterally through the interior anode.

144. The method of any one of embodiments 122-143, wherein the electrodepositing the electrodepositable species comprises distributing a portion of the electrolyte solution into the hollow cavity via an electrolyte distribution tube positioned in the hollow cavity of the tubular workpiece.

145. The method of any one of embodiments 122-144, wherein the electrodepositing the electrodepositable species comprises distributing a portion of the electrolyte solution into the hollow cavity via a plurality of holes in an electrolyte distribution tube positioned in the hollow cavity of the tubular workpiece.

146. The method of any one of embodiments 122-145, wherein the electrodepositing the electrodepositable species comprises positioning an exterior anode adjacent to the tubular workpiece.

147. The method of any one of embodiments 124-146, wherein:

the first nanolaminate coating, the second nanolaminate coating, or the third nanolaminate coating comprises a number of layers ranging from about 50 to about 8,000; and each layer has a thickness ranging from about 5 nm to about 250 nm.

148. The method of any one of embodiments 122-147, wherein the first nanolaminate coating and the second nanolaminate coating each comprise a single layer.

149. The method of any one of embodiments 122-147, wherein the first nanolaminate coating and the second nanolaminate coating each comprise at least two layers.

150. The method of any one of embodiments 124-149, wherein the third nanolaminate coating comprises at least two layers.

151. The method of embodiment 147 or 149-150, wherein:

the number of layers is in a range selected independently from about 50 layers to about 100 layers, from about 100 layers to about 1,000 layers, from about 1,000 layers to about 2,000 layers, from about 2,000 layers to about 4,000 layers, or from about 4,000 layers to about 8,000 layers; and the thickness of each layer is in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, or from about 200 to about 250 nm.

152. The method of any one of embodiments 124-151, wherein the first nanolaminate coating, the second nanolaminate coating, and the third nanolaminate coating collectively cover substantially all of the inner surface and the outer surface.

153. The method of any one of embodiments 122-152, wherein the first nanolaminate coating, the second nanolaminate coating, or both comprise a series of alternating layers.

154. The method of any one of embodiments 122-147 or 149-153, wherein the first nanolaminate coating and the second nanolaminate coating each comprise a series of alternating layers.

155. The method of any one of embodiments 124-154, wherein the third nanolaminate coating comprises a series of alternating layers.

156. The method of any one of embodiments 153-155, wherein the series of alternating layers comprises:

a first layer comprising at least one electrodepositable species independently selected from Ag, Al, Au, B, Be, C, Co, (Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr; and a second layer comprising at least one electrodepositable species independently selected from Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr.

157. The method of embodiment 156, wherein the first layer or the second layer comprises Ni in a concentration ranging from about 50% (w/w) to about 99% (w/w).

158. The method embodiment 156 or 157, wherein the first layer or the second layer comprises Ni in a concentration greater than about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

159. The method of any one of embodiments 156-158, wherein the first layer or the second layer comprises Co in a concentration ranging from about 5% (w/w) to about 35% (w/w).

160. The method of any one of embodiments 156-159, wherein the first layer or the second layer comprises Co in a concentration ranging from about 5% (w/w) to about 10% (w/w), about 10% (w/w) to about 15% (w/w), about 15% (w/w) to about 20% (w/w), about 20% (w/w) to about 25% (w/w), about 25% (w/w) to about 30% (w/w), or about 30% (w/w) to about 35% (w/w).

161. The method of any one of embodiments 156-160, wherein the first layer or the second layer comprises Cr in a concentration ranging from about 5% (w/w) to about 99% (w/w).

162. The method of any one of embodiments 156-161, wherein the first layer or the second layer comprises Cr in a concentration greater than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

163. The method of any one of embodiments 156-162, wherein the first layer or the second layer comprises Cr in a concentration less than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

164. The method of any of embodiments 156-163, wherein the first layer and the second layer comprise Ni and W.

165. The method of embodiment 164, wherein the first layer and the second layer further comprise Mo.

166. The method of embodiment 164 or 165, wherein the first layer, the second, layer, or both, independently comprise Ni in a concentration ranging from about 40% (w/w) to about 70% (w/w);

wherein the first layer, the second layer, or both, independently comprise W in a concentration ranging from about 30% (w/w) to about 50% (w/w);

or both.

167. The method of embodiment 166, wherein the first layer, the second layer, or both, independently comprise Mo in a concentration of up to about 40% (w/w)

168. The method of any one of embodiments 164-167, wherein the first layer, the second layer, or both, independently comprise Ni in a concentration of about 60% (w/w), and W in a concentration of about 40% (w/w).

169. The method of any one of embodiments 122-168, wherein the first thickness or the second thickness ranges from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 to about 250 nm, from about 1 µm to about 5 centimeters (cm), from about 1 µm to about 50 µm, from about 50 µm to about 100 µm, from about 100 µm to about 200 µm, from about 200 µm to about 500 µm, from about 500 µm to about 800 µm, from about 800 µm to about 1.2 millimeters (mm), from about 500 µm to about 1 mm, from about 1 mm to about 1.5 mm, from about 1.2 mm to about 2 mm, from about 1.8 mm to about 2.5 mm, from about 2 mm to about 3 mm, from about 2.5 mm to about 5 mm, from about 1 mm to about 5 mm, from about 5 mm to about 1 cm, from about 1 cm to about 2 cm, or from about 2 cm to about 5 cm.

170. The method of any one of embodiments 122-169, wherein the tubular workpiece is formed from a steel alloy comprising:
(A) carbon and iron;
(B) carbon, iron, and molybdenum; or
(C) carbon, iron, molybdenum, and cobalt.

171. The method of any one of embodiments 127-170, wherein the system is the electroplating system of any one of embodiments 108-126.

172. The method of any one of embodiments 127-171, wherein the first nanolaminate coating is substantially the same thickness at two or more, three or more, four or more, or five or more locations; and wherein the second nanolaminate coating is substantially the same thickness at two or more, three or more, four or more, or five or more locations.

173. The method of embodiment 122 or 124-172, wherein the first thickness is substantially the same as the second thickness.

174. An article produced by the method of any one of embodiments 121-172.

175. An oil country tubular good (OCTG) produced by the method of any one of embodiments 121-172.

176. An anode comprising a substantially cylindrical metal member, the metal member having an exterior surface with a surface area feature that increases a surface area of the anode, the metal member, in use, being in electrical contact with a tubular workpiece.

177. The anode of embodiment 176, wherein the surface area of the anode is based on an inner surface area of a tubular workpiece and a ratio of a first distance and a second distance, the first distance being a length between the exterior surface and an inner surface of a tubular workpiece, and the second distance being a length between an outer surface of the tubular workpiece and an exterior anode.

178. The anode of embodiment 176 or 177, wherein the anode is tubular, such that a hollow cavity is defined by an inner surface of the anode.

179. The anode of any one of embodiments 176-178, wherein the surface area feature is a series of continuous alternating convex and concave portions, such that the exterior surface is corrugated.

180. The anode of any one of embodiments 176-178, wherein the exterior surface is configured in a polygonal or sawtooth tube configuration, the exterior surface comprising a number of interconnected sides.

181. The anode of embodiment 180, wherein the number of interconnected sides is three, four, five, or six.

182. The anode of embodiment 180 or 181, wherein the anode has a length, and the number of interconnected sides varies over the length of the anode.

183. The anode of any one of embodiments 176-182, wherein the anode has a substantially constant material thickness ranging from about 0.25 mm to about 0.60 mm, from about 0.50 mm to about 0.80 mm, from about 0.75 mm to about 1.1 mm, from about 1.0 mm to about 1.3 mm, from about 1.2 mm to about 1.6 mm, from about 1.5 mm to about 1.8 mm, from about 1.7 mm to about 2.1 mm, from about 2.0 mm to about 2.3 mm, from about 2.2 mm to about 2.6 mm, from about 2.5 mm to about 3.9 mm, from about 3.8 mm to about 5.1 mm, or from about 5.0 mm to about 6.4 mm.

184. The anode of any one of embodiments 176-183, wherein the anode is substantially solid.

185. The anode of any one of embodiments 176-184, wherein the anode material is substantially non-porous, wherein the anode comprises a plurality of holes that, in operation, distributes or causes mixing of the solution adjacent the anode.

186. The anode of any one of embodiments 176-185, wherein the anode is porous, and wherein the anode has a percentage open area ranging from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, or from about 95% to about 99%.

187. The anode of any one of embodiments 176-186, wherein the anode comprises Zn, Ni, Sn, or a combination thereof.

188. The anode of any one of embodiments 176-187, wherein the anode comprises a precious metal.

189. The anode of any one of embodiments 176-188, wherein the anode comprises a Zn—Sn alloy.

190. The anode of any one of embodiments 176-189, wherein the anode comprises a Ni—Co alloy.

191. The anode of any one of embodiments 176-190, wherein the anode is positioned within a fabric material, the fabric material comprising polypropylene, napped poly, cotton, synel, canton flannel, mono-filament polypropylene, nylon, polypropylene microfilet, cotton duck, felt, or polyester.

192. A method of configuring an anode for use in an electrodeposition process to deposit a nanolaminate coating on a tubular workpiece, the method comprising:
determining a surface area of the anode based on:
a ratio of a first surface area corresponding to an inner surface of the tubular workpiece to a second surface area corresponding to an outer surface of the tubular workpiece; and
a ratio of an inner diameter of the tubular workpiece to distance between outer surface of the tubular workpiece to the outer anode surface,
wherein the surface area of the anode provides a coating on the tubular workpiece such that a ratio of a first thickness of the nanolaminate coating on the inner surface to a second thickness of the nanolaminate coating on the outer surface is about one.

The particulars described herein are by way of example and are only for purposes of illustrative discussion of embodiments of the present disclosure. The use of any and all examples, or exemplary language (e.g., "such as") provided herein is merely intended to better illuminate the disclosure and does not pose a limitation on the scope of the disclosure as claimed. No language in the specification should be construed as indicating any non-claimed element is essential to the practice of the disclosure. Further, all methods described herein can be performed in any suitable order unless otherwise indicated herein or otherwise clearly contradicted by context.

The various embodiments described above can be combined to provide further embodiments. All of the U.S.

patents, U.S. patent application publications, U.S. patent applications, foreign patents, foreign patent applications and non-patent publications referred to in this specification and/or listed in the Application Data Sheet, including U.S. Patent Application No. 62/488,645, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Definitions used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method for producing a nanolaminate coating on a tubular workpiece, the method comprising:
   introducing a tubular workpiece that is substantially cylindrical to a system comprising:
      a rack that, in operation, supports the tubular workpiece, the rack comprising:
         at least one support structure for supporting the tubular workpiece; and
         a contact point assembly comprising a gear, wherein the gear is coupled to an end portion of the tubular workpiece;
      a conductive bus supported by the rack, the conductive bus configured to be in electrical contact with the tubular workpiece via the gear, such that the tubular workpiece is free to rotate while maintaining electrical contact with the conductive bus;
      an interior anode; and
      an electrolyte bath comprising an electrolyte solution having an electrodepositable species;
   rotating the tubular workpiece in the rack at a rotational speed; and
   electrodepositing the electrodepositable species onto at least a portion of the tubular workpiece as a first nanolaminate coating.

2. The method of claim 1, wherein the tubular workpiece has a longitudinal axis and a hollow cavity defined by an inner surface and an outer surface, the first nanolaminate coating being electrodeposited on at least a portion of the outer surface of the tubular workpiece, the method further comprising electrodepositing a second nanolaminate coating on at least a portion of the inner surface of the tubular workpiece, the first nanolaminate coating having a first thickness, the second nanolaminate coating having a second thickness, the first thickness being less than the second thickness.

3. The method of claim 2, wherein the tubular workpiece has a first threaded portion, and the method further comprises electrodepositing the electrodepositable species as a third nanolaminate coating on the first threaded portion, the third nanolaminate coating having a third thickness that is less than the first thickness and the second thickness.

4. The method of claim 3, wherein the first nanolaminate coating, the second nanolaminate coating, and the third nanolaminate coating collectively cover substantially all of the inner surface and the outer surface.

5. The method of claim 2, wherein the rotating the tubular workpiece comprises varying the rotational speed over time, such that a composition of the first nanolaminate coating or the second nanolaminate coating is changed.

6. The method of claim 5, wherein the varying the rotational speed over time comprises:
   changing the rotational speed from a first rotational speed to a second rotational speed; and
   changing the rotational speed from the second rotational speed to the first rotational speed.

7. The method of claim 2, wherein the first nanolaminate coating, the second nanolaminate coating, or both comprise a series of alternating layers.

8. The method of claim 7, wherein the series of alternating layers comprises:
   a first layer comprising at least one electrodepositable species independently selected from Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr; and
   a second layer comprising at least one electrodepositable species independently selected from Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr.

9. The method of claim 8, wherein the first layer or the second layer comprises Ni in a concentration ranging from about 50% (w/w) to about 99% (w/w).

10. The method of claim 8, wherein the first layer or the second layer comprises Co in a concentration ranging from about 5% (w/w) to about 35% (w/w).

11. The method of claim 8, wherein the first layer or the second layer comprises Cr in a concentration ranging from about 5% (w/w) to about 99% (w/w).

12. The method of claim 8, wherein the first layer and the second layer comprise Ni and W.

13. The method of claim 12, wherein the first layer and the second layer further comprise Mo.

14. The method of claim 13, wherein the first layer, the second, layer, or both, independently comprise Ni in a concentration ranging from about 40% (w/w) to about 70% (w/w);
   wherein the first layer, the second layer, or both, independently comprise W in a concentration ranging from about 30% (w/w) to about 50% (w/w);
   or both.

15. The method of claim 14, wherein the first layer, the second layer, or both, independently comprise Mo in a concentration of up to about 40% (w/w).

16. The method of claim 13, wherein the first layer, the second layer, or both, independently comprise Ni in a concentration of about 60% (w/w), and W in a concentration of about 40% (w/w).

17. The method of claim 8, wherein the first layer and the second layer independently comprise NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCOP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi or FeCrB.

18. The method of claim 2, wherein the first nanolaminate coating is substantially the same thickness at two or more locations; and wherein the second nanolaminate coating is substantially the same thickness at two or more locations.

19. A method for producing a nanolaminate coating on a tubular workpiece, the method comprising:
introducing a tubular workpiece that is substantially cylindrical to a system comprising:
a rack that, in operation, supports the tubular workpiece, the rack comprising:
at least one support structure for supporting the tubular workpiece; and
a contact point assembly comprising a gear;
a conductive bus supported by the rack, the conductive bus configured to be in electrical contact with the tubular workpiece via the gear, such that the tubular workpiece is free to rotate while maintaining electrical contact with the conductive bus;
an interior anode; and
an electrolyte bath comprising an electrolyte solution having an electrodepositable species;
rotating the tubular workpiece in the rack at a rotational speed; and
electrodepositing the electrodepositable species onto at least a portion of the tubular workpiece as a first nanolaminate coating,
wherein the tubular workpiece has a longitudinal axis and a hollow cavity defined by an inner surface and an outer surface, the first nanolaminate coating being electrodeposited on at least a portion of the outer surface of the tubular workpiece, the method further comprising electrodepositing a second nanolaminate coating on at least a portion of the inner surface of the tubular workpiece, the first nanolaminate coating having a first thickness, the second nanolaminate coating having a second thickness, the first thickness being less than the second thickness.

* * * * *